United States Patent
Hirano

(10) Patent No.: US 11,513,320 B2
(45) Date of Patent: Nov. 29, 2022

(54) IMAGING LENS INCLUDING EIGHT LENSES OF -+-++++-, -+-+++-, -+-++-+-, -+-++---, -+-+-++-, -+-+-+-, -+-+---, -+-+++-, -+--++-, -+-+-+-, -+--+---, -+---++-, -+---+-, -+----+-, OR -+-+0-+- REFRACTIVE POWERS

(71) Applicant: TOKYO VISIONARY OPTICS CO., LTD., Tokyo (JP)

(72) Inventor: Hitoshi Hirano, Tokyo (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 321 days.

(21) Appl. No.: 16/851,989

(22) Filed: Apr. 17, 2020

(65) Prior Publication Data

US 2021/0048633 A1 Feb. 18, 2021

(30) Foreign Application Priority Data

Jul. 18, 2019 (JP) .............................. JP2019-132986

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

2020/0393653 A1* 12/2020 Chen .................. G02B 13/0045

FOREIGN PATENT DOCUMENTS

| CN | 108983399 A | * 12/2018 | ......... G02B 13/0045 |
| JP | 2006-154481 A | 6/2006 | |

* cited by examiner

*Primary Examiner* — Wen Huang
(74) *Attorney, Agent, or Firm* — Hamre, Schumann, Mueller & Larson, P.C.

(57) ABSTRACT

There is provided a compact imaging lens configured to properly correct aberrations. The imaging lens includes, in order from an object side to an image side, a first lens L1 having negative refractive power, a second lens L2 having positive refractive power, a third lens L3 having negative refractive power, a fourth lens L4, a fifth lens L5, a sixth lens L6, a seventh lens L7, and an eighth lens L8 having negative refractive power. The eighth lens L8 has an aspheric image-side surface having at least one inflection point.

4 Claims, 32 Drawing Sheets

Tangential Direction  Sagittal Direction

Lateral Aberration (μm)

Example 2

Example 3

Example 4

Example 5

Example 6

Example 7

Example 8

Example 9

Example 10

Example 11

Example 12

Example 13

Example 14

Example 15

Example 16

IMAGING LENS INCLUDING EIGHT LENSES OF -+-++++-, -+-+++--, -+-++-+-, -+-++---, -+-+-++-, -+-+-+--, -+-+----, -+--+++-, -+---++--, -+--+-+-, -+--+---, -+---++-, -+----+-, -+----+-, OR -+-+0-+- REFRACTIVE POWERS

BACKGROUND OF THE INVENTION AND RELATED ART STATEMENT

The present invention relates to an imaging lens for forming an image of an object on an image sensor such as a CCD sensor and a CMOS sensor. Particularly, the present invention relates to an imaging lens suitable for mounting in a relatively small camera to be built in portable devices such as cellular phones and portable information terminals, digital still cameras, security cameras, onboard cameras and network cameras, and so on.

To take a picture of an object with high definition or acquire more information on the object, the camera has to have a high-resolution imaging lens as well as an image sensor with high pixel count. As a method for achieving higher resolution of an imaging lens, there is a method of increasing the number of lenses that compose the imaging lens in accordance with the difficulty of correcting aberrations. However, an irresponsible increase in the number of lenses is prone to cause an increase in size of the imaging lens. In development of the imaging lens, an extension of the total track length should be prevented and the resolution has to be improved.

A lens configuration including eight lenses has, due to the large number of lenses of the imaging lens, high flexibility in design and thus allows proper correction of aberrations. As the imaging lens having the eight-lens configuration, for example, an imaging lens described in Patent Document 1 has been known.

Patent Document 1 discloses an imaging lens comprising a first lens with negative refractive power having a meniscus shape with a convex object-side surface, a second lens having a biconvex shape, a third lens having a biconcave shape, a fourth lens with positive refractive power having the meniscus shape with a convex object-side surface, a fifth lens having the biconvex shape, a sixth lens having the biconcave shape, a seventh lens with the negative refractive power having the meniscus shape with a convex image-side surface, and an eighth lens having the biconvex shape.

Patent Document 1: Japanese Patent Application Publication No. 2006-154481

According to the conventional imaging lens of Patent Document 1, although the field of view is as wide as 64° at a wide-angle end, aberrations can be relatively properly corrected. However, having a long total track length relative to the focal length of the overall optical system of the imaging lens, it is unsuitable for mounting in a small camera to be built in a thin device such as a smartphone. In the case of the conventional imaging lens described in Patent Document 1, it is difficult to achieve more proper aberration correction while downsizing and achieving a low profile.

Such a problem is not specific to the imaging lens to be mounted in smartphones. Rather, it is a common problem for imaging lenses to be mounted in such as the cellular phone, the portable information terminal, the digital still camera, the security camera, the onboard cameras, and the network camera.

An object of the present invention is to provide an imaging lens that can achieve both downsizing of the imaging lens and proper correction of aberrations while achieving a wide field of view.

SUMMARY OF THE INVENTION

An imaging lens according to the present invention forms an image of an object on an image sensor and comprises, in order from an object side to an image side, a first lens with negative refractive power, a second lens with positive refractive power, a third lens with negative refractive power, a fourth lens, a fifth lens, a sixth lens, a seventh lens and an eighth lens with negative refractive power. The eighth lens has an aspheric image-side surface having at least one inflection point.

In the imaging lens according to the present invention, the first lens arranged closest to the object side has negative refractive power and can secure a back focus while preferably achieving a wide field of view of the imaging lens. The third lens with the negative refractive power is arranged on an image side of the second lens, and chromatic aberration can be properly corrected and a low profile of the imaging lens can be achieved.

Furthermore, when an image-side surface of the eighth lens closest to the image side is formed as an aspheric surface having at least one inflection point, the back focus can be secured, and field curvature and distortion at an image periphery can be properly corrected. According to such a shape of the eighth lens, it is also possible to control an incident angle of a light ray emitted from the imaging lens to the image plane of the image sensor within the range of chief ray angle (CRA), and to properly correct the aberrations in a paraxial region and at the peripheral area.

Regarding terms used in the present invention, "lens" refers to an optical element having refractive power. Therefore, the term "lens" used herein does not include the optical element such as a prism changing a traveling direction of a light, a flat filter, and the like. Those optical elements may be arranged in front of or behind the imaging lens, or between respective lenses, as necessary.

According to the imaging lens having the above-described configuration, it is preferable that the following conditional expression (1) is satisfied:

$$1.0 < R1f/R1r < 1.5 \tag{1}$$

where
R1f: a curvature radius of an object-side surface of the first lens, and
R1r: a curvature radius of an image-side surface of the first lens.

When the conditional expression (1) is satisfied, a wide field of view can be achieved while downsizing the imaging lens. In addition, the back focus can be secured.

According to the imaging lens having the above-described configuration, it is preferable that the following conditional expression (2) is satisfied:

$$-10.0 < f1/f2 < -2.0 \tag{2}$$

where
f1: a focal length of the first lens, and
f2: a focal length of the second lens.

When the conditional expression (2) is satisfied, spherical aberration and chromatic aberration can be properly corrected while downsizing the imaging lens.

According to the imaging lens having the above-described configuration, it is more preferable that the following conditional expression (2a) is satisfied.

$$-8.5 < f1/f2 < -3.5 \tag{2a}$$

According to the imaging lens having the above-described configuration, it is preferable that the following conditional expression (3) is satisfied:

$$-10.0<f3/f<-2.0 \quad (3)$$

where f: a focal length of the overall optical system of the imaging lens, and f3: a focal length of the third lens.

When the conditional expression (3) is satisfied, the chromatic aberration can be properly corrected while reducing the profile of the imaging lens.

According to the imaging lens having the above-described configuration, it is more preferable that the following conditional expression (3a) is satisfied.

$$-8.0<f3/f<-2.5 \quad (3a)$$

According to the imaging lens having the above-described configuration, it is preferable that the following conditional expression (4) is satisfied:

$$0.3<f1/f3<3.0 \quad (4)$$

where f1: a focal length of the first lens, and f3: a focal length of the third lens.

When the conditional expression (4) is satisfied, the spherical aberration and the chromatic aberration can be properly corrected in well balance while reducing the profile of the imaging lens.

According to the imaging lens having the above-described configuration, it is preferable that the third lens is formed in a shape that curvature radii of an object-side surface and an image-side surface become both positive, that is, a meniscus shape having the object-side surface being convex in the paraxial region.

When the third lens is formed in such a shape, it is possible to control an exit angle of a lower light ray within a proper range, and ghosts due to total reflection light can be preferably controlled.

According to the imaging lens having the above-described configuration, it is preferable that the following conditional expression (5) is satisfied:

$$-4.0<R4f/f<-0.4 \quad (5)$$

where f: a focal length of the overall optical system of the imaging lens, and

R4f: a curvature radius of an object-side surface of the fourth lens.

When the conditional expression (5) is satisfied, it is possible to control an exit angle of an off-axial light ray within a proper range, and aberrations can be properly corrected. Furthermore, an increase in an angle of a normal line near a maximum effective diameter of the fourth lens is preferably controlled, and the lens has a shape easy to manufacture and can suppress an increase in a manufacturing cost. When the fourth lens is made from a plastic material, it leads to improvement in molding quality.

According to the imaging lens having the above-described configuration, it is preferable that the fourth lens is formed in a shape that curvature radii of an object-side surface and an image-side surface are both negative, that is, the meniscus shape having the object-side surface being concave in the paraxial region. When the fourth lens is formed in such a shape, it is possible to preferably control occurrence of aberrations such as coma aberration and field curvature.

According to the imaging lens having the above-described configuration, it is preferable that the following conditional expression (6) is satisfied:

$$12<|f5|/f \quad (6)$$

where f: a focal length of the overall optical system of the imaging lens, and f5: a focal length of the fifth lens.

When the conditional expression (6) is satisfied, the field curvature, distortion and the chromatic aberration can be controlled within the proper range in well balance.

According to the imaging lens having the above-described configuration, it is preferable that the seventh lens is formed in a shape that curvature radii of an object-side surface and an image-side surface are both positive, that is, the meniscus shape having the object-side surface being convex in the paraxial region, When the seventh lens is formed in such a shape, it is possible to preferably suppress an increase in refractive power of the seventh lens, and the spherical aberration, the distortion and the field curvature can be properly corrected in well balance.

According to the imaging lens having the above-described configuration, it is preferable that the following conditional expression (7) is satisfied:

$$0.15<L47/f<0.40 \quad (7)$$

where f: a focal length of the overall optical system of the imaging lens, and

L47: a distance along the optical axis from the object-side surface of the fourth lens to an image-side surface of the seventh lens.

When the conditional expression (7) is satisfied, downsizing and wide field of view of the imaging lens can be achieved, and each distance along the optical axis between respective lenses and a thickness of the center of the lens can be secured. Additionally, the back focus can be secured.

According to the imaging lens having the above-described configuration, it is preferable that the following conditional expression (8) is satisfied:

$$0.40<R7r/R8f<0.90 \quad (8)$$

where

R7r: a curvature radius of an image-side surface of the seventh lens, and

R8f: a curvature radius of an object-side surface of the eighth lens.

When the conditional expression (8) is satisfied, the spherical aberration and the field curvature can be properly corrected.

According to the imaging lens having the above-described configuration, it is preferable that the following conditional expression (9) is satisfied:

$$0.4<T7/T8<2.5 \quad (9)$$

where

T7: a thickness along the optical axis of the seventh lens, and

T8: a thickness along the optical axis of the eighth lens.

When the profile of the imaging lens is reduced, a lens arranged in a position closer to the image plane tends to have a greater effective diameter. When the conditional expression (9) is satisfied, thicknesses along the optical axis of the seventh lens and the eighth lens that are likely to have relatively large effective diameters are properly maintained.

It is thus possible to properly correct aberrations while reducing the profile of the imaging lens. It is also possible to secure the back focus. When the seventh lens and the eighth lens are formed from a plastic material, it is possible to reduce the manufacturing cost of the lenses and also to secure the formability of the lenses by satisfying the conditional expression (9).

According to the imaging lens having the above-described configuration, it is preferable that the following conditional expression (10) is satisfied:

$$0.6<D78/D34<1.4 \qquad (10)$$

where

D34: a distance along the optical axis between the third lens and the fourth lens, and D78: a distance along the optical axis between the seventh lens and the eighth lens.

When the conditional expression (10) is satisfied, the spherical aberration, the field curvature and the distortion can be properly corrected in well balance.

According to the imaging lens having the above-described configuration, it is preferable that the following conditional expression (11) is satisfied:

$$-3.0<f8/f<-0.3 \qquad (11)$$

where f: a focal length of the overall optical system of the imaging lens, and f8: a focal length of the eighth lens.

When the conditional expression (11) is satisfied, the back focus can be secured and the field curvature and the distortion can be properly corrected. Furthermore, the incident angle of a light ray emitted from the imaging lens to the image plane can be preferably controlled within the range of chief ray angle (CRA).

According to the imaging lens having the above-described configuration, it is preferable that the following conditional expression (12) is satisfied:

$$0.1<R8r/f<0.5 \qquad (12)$$

where f: a focal length of the overall optical system of the imaging lens, and

R8r: a curvature radius of an image-side surface of the eighth lens.

The image-side surface of the eighth lens is located closest to the image plane in the imaging lens. The magnitude of the refractive power of this surface causes difference in the difficulty of correcting the astigmatism, the coma aberration, and the distortion. When the conditional expression (12) is satisfied, downsizing the imaging lens can be achieved and the astigmatism, the coma aberration and the distortion can be properly corrected. In addition, satisfying the conditional expression (12) is also effective from the standpoint of securing the back focus.

According to the imaging lens having the above-described configuration, it is preferable that the eighth lens is formed in a shape that curvature radii of an object-side surface and an image-side surface become both positive, that is, in the meniscus shape having the image-side surface being concave in the paraxial region. When the eighth lens is formed in such a shape, the low profile of the imaging lens can ben preferably achieved.

According to the imaging lens having the above-described configuration, it is preferable that the following conditional expressions (13) to (15) are satisfied for properly correcting the chromatic aberration:

$$10<vd1<35 \qquad (13)$$

$$35<vd2<85 \qquad (14)$$

$$10<vd3<35 \qquad (15)$$

where vd1: an abbe number at d-ray of the first lens, vd2: an abbe number at d-ray of the second lens, and vd3: an abbe number at d-ray of the third lens.

According to the imaging lens having the above-described configuration, it is preferable that the following conditional expressions (16) and (17) are satisfied for more properly correcting the chromatic aberration:

$$10<vd5<35 \qquad (16)$$

$$10<vd6<35 \qquad (17)$$

where vd5: an abbe number at d-ray of the fifth lens, and vd6: an abbe number at d-ray of the sixth lens.

According to the imaging lens having the above-described configuration, it is preferable that the following conditional expression (18) is satisfied:

$$1.0<TL/f<1.5 \qquad (18)$$

where f: a focal length of the overall optical system of the imaging lens, and

TL: a distance along the optical axis from an object-side surface of the first lens to an image plane.

When the conditional expression (18) is satisfied, downsizing the imaging lens can be preferably achieved.

Generally, an IR cut filter, a cover glass or the like are arranged between the imaging lens and the image plane, however a distance thereof along the optical axis is converted into an air-converted distance in the present specification.

In the case of an imaging lens to be built in a thin portable device, such as the smartphone, an imaging lens has to be contained in a limited space. Therefore, there is often a strict limitation in a length of the imaging lens in the direction of the optical axis relative to the size of the image sensor. That is, a low profile of the imaging lens is strongly expected. Therefore, according to the imaging lens of the present invention, it is preferable that the following conditional expression (19) is satisfied:

$$1.2<TL/H\text{max}<2.0 \qquad (19)$$

where

TL: a distance along the optical axis from an object-side surface of the first lens to an image plane, and Hmax: a maximum image height.

According to the imaging lens having the above-described configuration, when the fourth lens has the positive refractive power, it is preferable that the following conditional expression (20) is satisfied:

$$2.0<f4/f<10.0 \qquad (20)$$

where f: a focal length of the overall optical system of the imaging lens, and f4: a focal length of the fourth lens.

When the conditional expression (20) is satisfied, the chromatic aberration can be properly corrected.

According to the imaging lens having the above-described configuration, when the fourth lens has the positive refractive power, it is preferable that the following conditional expression (21) is satisfied:

$$1.5 < f45/f < 10.0 \tag{21}$$

where f: a focal length of the overall optical system of the imaging lens, and f45: a composite focal length of the fourth lens and the fifth lens.

When the conditional expression (21) is satisfied, the coma aberration and the astigmatism can be properly corrected while reducing the profile of the imaging lens.

According to the imaging lens having the above-described configuration, when the fourth lens has the negative refractive power, it is preferable that the following conditional expression (22) is satisfied for properly correcting the chromatic aberration:

$$-20.0 < f4/f < -8.0 \tag{22}$$

where f: a focal length of the overall optical system of the imaging lens, and f4: a focal length of the fourth lens.

According to the imaging lens having the above-described configuration, when the sixth lens has the positive refractive power, it is preferable that the following conditional expression (23) is satisfied:

$$5.0 < f6/f < 30.0 \tag{23}$$

where f: a focal length of the overall optical system of the imaging lens, and f6: a focal length of the sixth lens.

When the conditional expression (23) is satisfied, the spherical aberration can be properly corrected while reducing the profile of the imaging lens.

According to the imaging lens having the above-described configuration, when the fifth lens and the sixth lens have the positive refractive power, it is preferable that the following conditional expression (24) is satisfied:

$$4.0 < f56/f < 12.0 \tag{24}$$

where f: a focal length of the overall optical system of the imaging lens, and f56: a composite focal length of the fifth lens and the sixth lens.

When the conditional expression (24) is satisfied, the coma aberration and the astigmatism can be properly corrected while reducing the profile of the imaging lens.

According to the imaging lens having the above-described configuration, it is more preferable that the following conditional expression (24a) is satisfied.

$$5.0 < f56/f < 11.0 \tag{24a}$$

According to the imaging lens having the above-described configuration, when the seventh lens has the positive refractive power, it is preferable that the following conditional expression (25) is satisfied:

$$-5.0 < f7/f8 < -1.0 \tag{25}$$

where f7: a focal length of the seventh lens, and f8: a focal length of the eighth lens.

When the conditional expression (25) is satisfied, the spherical aberration, the field curvature and the chromatic aberration of magnification can be properly corrected within the proper range in well balance.

According to the imaging lens having the above-described configuration, when the seventh lens has the negative refractive power, it is preferable that the following conditional expression (26) is satisfied:

$$5.0 < f7/f8 < 20.0 \tag{26}$$

where f7: a focal length of the seventh lens, and f8: a focal length of the eighth lens.

When the conditional expression (26) is satisfied, the spherical aberration, the field curvature and the chromatic aberration of magnification can be properly corrected within the proper range in well balance.

According to the imaging lens of the present invention, it is preferable that each lens of the first to the eighth lenses is arranged with an air gap. When each lens is arranged with an air gap, the imaging lens according to the present invention has a lens configuration without any cemented lenses. According to such lens configuration, all of eight lenses composing the imaging lens can be formed from a plastic material and the manufacturing cost of the imaging lens can be preferably reduced.

According to the imaging lens of the present invention, it is preferable that both surfaces of each lens of the first to the eighth lenses are formed as aspheric surfaces. When the both surfaces of each lens are formed as aspheric surfaces, aberrations from the paraxial region to a peripheral area of the lens can be properly corrected. Particularly, the aberrations at the peripheral area of the lens can be properly corrected.

According to the imaging lens having the above-described configuration, it is preferable that at least two surfaces of the seventh lens and the eighth lens are formed as the aspheric surfaces having at least one inflection point. In addition to the image-side surface of the eighth lens, when one more aspheric surface having at least one inflection point is provided, it is also possible to control an incident angle of a light ray emitted from the imaging lens to the image plane within the range of chief ray angle (CRA), and to properly correct the aberrations at image periphery.

According to the imaging lens of the present invention, when a field of view is shown as 2ω, it is preferable that a conditional expression, 60°≤2ω is satisfied. When this conditional expression is satisfied, a wide field of view of the imaging lens can be achieved and downsizing the imaging lens and the wide field of view can be preferably co-achieved.

In an image sensor with high pixel count, a light-receiving area of each pixel decreases and thus the image to be taken tends to be dark. As a method for correcting the darkness, there is a method of improving light-receiving sensitivity of the image sensor using an electrical circuit. However, with an increase in the light-receiving sensitivity, noise components not directly contributing to formation of an image are also amplified. Therefore, in order to obtain a sufficiently bright image without providing the electrical circuit, according to the imaging lens having the above-described configuration, it is preferable that the following conditional expression (27) is satisfied:

$$f/Dep < 2.0 \tag{27}$$

where f: a focal length of the overall optical system of the imaging lens, and

Dep: an entrance pupil diameter of the imaging lens.

According to the present invention, as described above, the shapes of the lenses are specified using signs of the curvature radii. Whether the curvature radius of the lens is positive or negative is determined based on general definition.

More specifically, taking a traveling direction of the light as positive, if a center of a curvature radius is on the image side when viewed from a lens surface, the curvature radius is positive. If a center of a curvature radius is on the object side, the curvature radius is negative. Therefore, "an object-side surface having a positive curvature radius" means that the object-side surface is a convex surface. "An object-side surface having a negative curvature radius" means that the object side surface is a concave surface. In addition, "an image-side surface having a positive curvature radius" means that the image-side surface is a concave surface. "An image-side surface having a negative curvature radius" means that the image-side surface is a convex surface. Here, a curvature radius used herein refers to a paraxial curvature radius, and may not be consistent with general shapes of the lenses in their sectional views.

According to the imaging lens of the present invention, it is achievable to provide a compact imaging lens especially suitable for mounting in a small-sized camera, while having a wide field of view and high resolution with proper correction of aberrations.

DETAILED DESCRIPTION OF EMBODIMENTS

Hereunder, referring to the accompanying drawings, an embodiment of the present invention will be fully described.

FIGS. 1, 4, 7, 10, 13, 16, 19, 22, 25, 28, 31, 34, 37, 40, 43 and 46 are schematic sectional views of the imaging lenses in Examples 1 to 16 according to the embodiment, respectively. Since the imaging lenses in those Examples have the same basic configuration, the lens configuration of the embodiment will be described with reference to the illustrative sectional view of Example 1.

Figure 1:
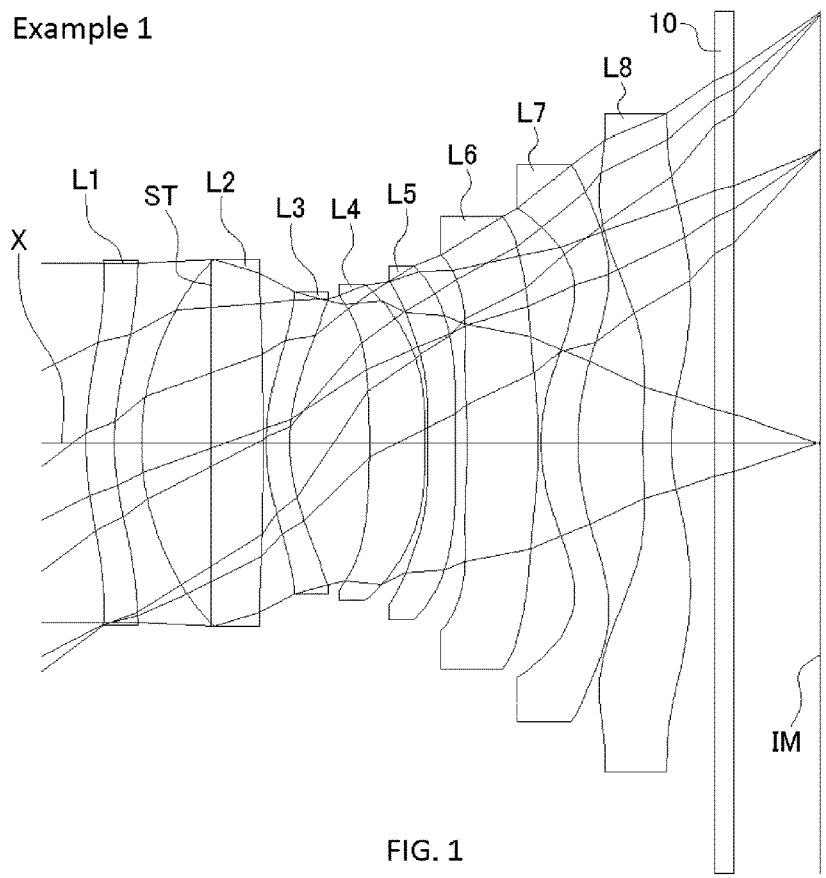
FIG. 1 is a sectional view of a schematic configuration of an imaging lens in Example 1 of the present invention.

As shown in FIG. 1, the imaging lens according to the present embodiment comprises, in order from an object side to an image side, a first lens L1 with negative refractive power, a second lens L2 with positive refractive power, a third lens L3 with negative refractive power, a fourth lens L4, a fifth lens L5, a sixth lens L6, a seventh lens L7 and an eighth lens L8 with negative refractive power.

Each lens of the first lens L1 to the eighth lens L8 is arranged with an air gap. A filter 10 is arranged between the eighth lens L8 and an image plane IM of an image sensor. The filter 10 is omissible.

The first lens L1 has a shape that a curvature radius r1 (=R1f) of an object-side surface and a curvature radius r2 (=R1r) of an image-side surface of the first lens are both positive. The first lens L1 is formed in a meniscus shape having the object-side surface being convex in the paraxial region. The shape of the first lens L1 is not limited to the one in the Example 1. The shape of the first lens L1 can be formed in any shape, as long as refractive power of the first lens L1 is negative. Other than the shape of the Example 1, the first lens L1 may be formed in a shape that the curvature radii r1 and r2 are both negative or a shape that the curvature radius r1 is negative and the curvature radius r2 is positive. The lens having the former shape is the meniscus lens having the object-side surface being concave in the paraxial region, and the lens having the latter shape is a biconcave lens in the paraxial region. It is preferable that the curvature radius r1 of the first lens L1 is positive from the standpoint of downsizing the imaging lens.

In the Example 1, an aperture stop ST is disposed between the first lens L1 and the second lens L2. A location of the aperture stop ST is not limited to the one of the Example 1. The aperture stop ST may be disposed on the object side relative to the first lens L1. Otherwise, the aperture stop ST may be disposed between the second lens L2 and the third lens L3, between the third lens L3 and the fourth lens L4, between the fourth lens L4 and the fifth lens L5 or the like.

The second lens L2 has a shape that a curvature radius r4 of an object-side surface is positive and a curvature radius r5 of an image-side surface is negative. The second lens L2 is formed in a biconvex shape in the paraxial region. The shape of the second lens L2 is not limited to the one in the Example 1. The shape of the second lens L2 can be formed in any shape, as long as refractive power of the second lens L2 is positive. Other than the shape of the Example 1, the second lens L2 may be formed in a shape that the curvature radii r4 and r5 are both positive or a shape that the curvature radii r4 and r5 are both negative. The lens having the former shape is the meniscus lens having the object-side surface being convex in the paraxial region, and the lens having the latter shape is the meniscus lens having the object-side surface being concave in the paraxial region. It is preferable that the curvature radius r4 of the second lens L2 is positive from the standpoint of downsizing the imaging lens.

The third lens L3 has a shape that a curvature radius r6 of an object-side surface and a curvature radius r7 of an image-side surface are both positive. The third lens L3 is formed in the meniscus shape having the object-side surface being convex in the paraxial region. In addition, the third lens L3 is formed in a shape having a concave surface facing the fourth lens at a peripheral area of the lens. The shape of the third lens L3 is not limited to the one in the Example 1. The shape of the third lens L3 can be formed in any shape, as long as refractive power of the third lens L3 is negative. Other than the shape of the Example 1, the third lens L3 may be formed in a shape that the curvature radii r6 and r7 are both negative or a shape that the curvature radius r6 is negative and the curvature radius r7 is positive. The lens having the former shape is the meniscus lens having the object-side surface being concave in the paraxial region, and the lens having the latter shape is the biconcave lens in the paraxial region. It is preferable that the curvature radius r6 of the third lens L3 is positive from the standpoint of downsizing the imaging lens.

The fourth lens L4 has positive refractive power. The refractive power of the fourth lens L4 is not limited to the positive refractive power. Examples of the lens configuration that the refractive power of the fourth lens L4 is negative are shown in Examples 9 to 15. The fourth lens L4 is formed in a shape that a curvature radius r8 (=R4r) of an object-side surface and a curvature radius r9 of an image-side surface are both negative. The fourth lens L4 is formed in the meniscus shape having the object-side surface being concave in the paraxial region. In addition, the fourth lens L4 is formed in a shape having a concave surface facing the third lens at a peripheral area of the lens. Therefore, the above-mentioned third lens L3 and the fourth lens L4 are arranged in a manner that the concave surfaces of the third lens L3 and the fourth lens L4 are faced each other at the peripheral area of the lens, and the field curvature and the astigmatism can be properly corrected.

The shape of the fourth lens L4 is not limited to the one in the Example 1. Other than the shape of the Example 1, the fourth lens L4 may be formed in a shape that the curvature radii r8 and r9 are both positive or a shape that the curvature radius r8 is positive and the curvature radius r9 is negative. The lens having the former shape is the meniscus lens having the object-side surface being convex in the paraxial region, and the lens having the latter shape is the biconvex lens in the paraxial region. Furthermore, the fourth lens L4 may be the biconcave lens in the paraxial region that the curvature radius r8 is negative and the curvature radius r9 is positive.

The fifth lens L5 has positive refractive power. The refractive power of the fifth lens L5 is not limited to the positive refractive power. Examples of the lens configuration that the refractive power of the fifth lens L5 is negative are shown in Examples 5 to 8, and 13 to 15. In addition, an example of the fifth lens L5 that the refractive power becomes zero in the paraxial region is shown in the Example 16.

The fifth lens L5 is formed in a shape that a curvature radius r10 of an object-side surface and a curvature radius r11 of an image-side surface are both negative. The fifth lens L5 is formed in the meniscus shape having the object-side surface being concave in the paraxial region. The shape of the fifth lens L5 is not limited to the one in the Example 1. Examples 2 to 4, and 9 to 12 show a shape that the curvature radius r10 is positive and the curvature radius r11 is negative, that is, a shape of the biconvex lens in the paraxial region. Examples 6, 13 and 15 show a shape that the curvature radii r10 and r11 are both positive, that is, a shape of the meniscus lens having an object-side surface being convex in the paraxial region. Examples 8 and 14 show a shape that the curvature radius r10 is negative and the curvature radius r11 is positive, that is, a shape of the biconcave lens in the paraxial region. Furthermore, Example 16 is an example of a shape having both curvature radii r10 and r11 of infinity and having refractive power at a peripheral area of the lens.

The sixth lens L6 has positive refractive power. The refractive power of the sixth lens L6 is not limited to the positive refractive power. Examples of the lens configuration that the refractive power of the sixth lens L6 is negative are shown in Examples 3, 4, 7, 8, 11, 12, 15 and 16.

The sixth lens L6 is formed in a shape that a curvature radius r12 of an object-side surface and a curvature radius r13 of an image-side surface are both negative. The sixth lens L6 is formed in a shape of the meniscus lens having the object-side surface being concave in the paraxial region. In addition, the shape of the sixth lens L6 is not limited to the one in the Example 1. Other than the shape of the Example 1, the sixth lens L6 may be formed in a shape that the curvature radii r12 and r13 are both positive or a shape that the curvature radius r12 is positive and the curvature radius r13 is negative. The lens having the former shape is the meniscus lens having the object-side surface being convex in the paraxial region, and the lens having the latter shape is the biconvex lens in the paraxial region. Furthermore, the sixth lens L6 may be formed in a shape that the curvature radius r12 is negative and the curvature radius r13 is positive, that is, a shape of the biconcave lens in the paraxial region. Furthermore, the sixth lens L6 is formed in a shape having the curvature radii r12 and r13 of infinity in the paraxial region and having refractive power at a peripheral area of the lens.

The seventh lens L7 has positive refractive power. The refractive power of the seventh lens L7 is not limited to the positive refractive power. Examples of the lens configuration that the refractive power of the seventh lens L7 is negative are shown in Examples 2, 4, 6, 8, 10, 12 and 14.

The seventh lens L7 is formed in a shape that a curvature radius r14 of an object-side surface and a curvature radius r15 (=R7r) of an image-side surface are both positive. The seventh lens L7 is formed in a shape of the meniscus lens having the object-side surface being convex in the paraxial region. The shape of the seventh lens L7 is not limited to the one in the Example 1. Other than the shape of the Example 1, the seventh lens L7 may be formed in a shape that the curvature radii r14 and r15 are both negative or a shape that the curvature radius r14 is positive and the curvature radius r15 is negative. The lens having the former shape is the meniscus lens having the object-side surface being concave in the paraxial region, and the lens having the latter shape is the biconvex lens in the paraxial region. Furthermore, the seventh lens L7 may be formed in a shape that the curvature radius r14 is negative and the curvature radius r15 is positive, that is, a shape of the biconcave lens in the paraxial region.

The eighth lens L8 is formed in a shape that a curvature radius r16 (=R8f) of an object-side surface and a curvature radius r17 (=R8r) of an image-side surface are both positive. The eighth lens L8 is formed in a shape of the meniscus lens having the object-side surface being convex in the paraxial region. The shape of the eighth lens L8 is not limited to the one in the Example 1. The shape of the eighth lens L8 may be a shape that the curvature radius r16 is negative and the curvature radius r17 is positive, that is, a shape of the biconcave lens in the paraxial region. Other than such shapes, the eighth lens L8 may be formed in a shape that the curvature radii r16 and r17 are both negative. Furthermore, the eighth lens L8 may be formed in a shape that refractive power of the eighth lens L8 is negative.

Regarding the eighth lens L8, the image-side surface is formed as an aspheric surface having at least one inflection point. Here, the "inflection point" means a point where the positive/negative sign of a curvature changes on the curve, i.e., a point where a direction of curving of the curve on the lens surface changes. The image-side surface of the eighth lens L8 of the imaging lens according to the present embodiment is the aspheric surface having at least one pole. With such shape of the eighth lens L8, an off-axial chromatic aberration of magnification as well as an axial chromatic aberration can be properly corrected, and an incident angle of a light ray emitted from the imaging lens to the image plane IM can be preferably controlled within the range of chief ray angle (CRA). According to the imaging lens in the Example 1, both surfaces of the seventh lens L7 and the eighth lens L8 are formed as aspheric surfaces having at least one inflection point. Therefore, aberrations at image periphery can be properly corrected. Depending on the required optical performance and extent of downsizing of the imaging lens, among lens surfaces of the seventh lens L7 and the eighth lens L8, lens surfaces other than the image-side surface of the eighth lens L8 may be formed as an aspheric surface without the inflection point.

According to the embodiment, the imaging lens satisfies the following conditional expressions (1) to (19):

$$1.0 < R1f/R1r < 1.5 \tag{1}$$

$$-10.0 < f1/f2 < -2.0 \tag{2}$$

$$-8.5 < f1/f2 < -3.5 \tag{2a}$$

$$-10.0 < f3/f < -2.0 \tag{3}$$

$$-8.0 < f3/f < -2.5 \tag{3a}$$

$$0.3 < f1/f3 < 3.0 \tag{4}$$

$$-4.0 < R4f/f < -0.4 \tag{5}$$

$$12 < |f5|/f \tag{6}$$

$$0.15 < L47/f < 0.40 \tag{7}$$

$$0.40 < R7r/R8f < 0.90 \tag{8}$$

$$0.4 < T7/T8 < 2.5 \tag{9}$$

$$0.6 < D78/D34 < 1.4 \tag{10}$$

$$-3.0 < f8/f < -0.3 \tag{11}$$

$$0.1 < R8r/f < 0.5 \tag{12}$$

$$10 < vd1 < 35 \tag{13}$$

$$35 < vd2 < 85 \tag{14}$$

$$10 < vd3 < 35 \tag{15}$$

$$10 < vd5 < 35 \tag{16}$$

$$10 < vd6 < 35 \tag{17}$$

$$1.0 < TL/f < 1.5 \tag{18}$$

$$1.2 < TL/H\text{max} < 2.0 \tag{19}$$

where
f: a focal length of the overall optical system of the imaging lens,
 f1: a focal length of the first lens L1,
 f2: a focal length of the second lens L2,
 f3: a focal length of the third lens L3,
 f4: a focal length of the fourth lens L4,
 f5: a focal length of the fifth lens L5,
 f8: a focal length of the eighth lens L8,
 T7: a thickness along the optical axis X of the seventh lens L7,
 T8: a thickness along the optical axis X of the eighth lens L8,
 vd1: an abbe number at d-ray of the first lens L1,
 vd2: an abbe number at d-ray of the second lens L2,
 vd3: an abbe number at d-ray of the third lens L3,
 vd5: an abbe number at d-ray of the fifth lens L5,
 vd6: an abbe number at d-ray of the sixth lens L6,
 R1f: a curvature radius of an object-side surface of the first lens L1,
 R1r: a curvature radius of an image-side surface of the first lens L1,
 R4f: a curvature radius of an object-side surface of the fourth lens L4,
 R7r: a curvature radius of an image-side surface of the seventh lens L7,
 R8f: a curvature radius of an object-side surface of the eighth lens L8,
 R8r: a curvature radius of an image-side surface of the eighth lens L8,
 D34: a distance along the optical axis X between the third lens L3 and the fourth lens L4,
 D78: a distance along the optical axis X between the seventh lens L7 and the eighth lens L8,
 Hmax: a maximum image height,
 L47: a distance along the optical axis X from an object-side surface of the fourth lens L4 to an image-side surface of the seventh lens L7, and
 TL: a distance along the optical axis X from an object-side surface of the first lens L1 to an image plane IM. (Filter 10 is an air-converted distance)

When the fourth lens L4 has positive refractive power as in the lens configurations in Examples 1 to 8, and 16, the following conditional expression (20) is further satisfied.

$$2.0 < f4/f < 10.0 \tag{20}$$

When the fourth lens L4 has the positive refractive power as in the lens configurations in Examples 1 to 8, and 16, the following conditional expression (21) is still further satisfied:

$$1.5 < f45/f < 10.0 \tag{21}$$

where
 f45: a composite focal length of the fourth lens L4 and the fifth lens L5.

When the fourth lens L4 has negative refractive power as in the lens configurations in Examples 9 to 15, the following conditional expression (22) is further satisfied.

$$-20.0 < f4/f < -8.0 \tag{22}$$

When the sixth lens L6 has positive refractive power as in the lens configurations in Examples 1, 2, 5, 6, 9, 10, 13 and 14, the following conditional expression (23) is further satisfied:

$$5.0 < f6/f < 30.0 \tag{23}$$

where
 f6: a focal length of the sixth lens.

When the fifth lens L5 and the sixth lens L6 have positive refractive power as in the lens configurations in Examples 1, 2, 9 and 10, the following conditional expressions (24) and (24a) are further satisfied:

$$4.0 < f6/f < 12.0 \tag{24}$$

$$5.0 < f6/f < 11.0 \tag{24a}$$

where
 f56: a composite focal length of the fifth lens L5 and the sixth lens L6.

When the seventh lens L7 has positive refractive power as in the lens configurations in Examples 1, 3, 5, 7, 9, 11, 13, 15 and 16, the following conditional expression (25) is further satisfied:

$$-5.0 < f7/f8 < -1.0 \tag{25}$$

where
 f7: a focal length of the seventh lens.

When the seventh lens L7 has negative refractive power as in the lens configurations in Examples 2, 4, 6, 8, 10, 12 and 14, the following conditional expression (26) is further satisfied.

$$5.0 < f7/f8 < 20.0 \tag{26}$$

The imaging lens according to the present embodiment satisfies the following conditional expression.

$$60° \leq 2\omega$$

Furthermore, the imaging lens according to the present embodiment satisfies the following conditional expression (27).

$$f/\text{Dep} < 2.0 \tag{27}$$

where
 Dep: an entrance pupil diameter of the imaging lens.

It is not necessary to satisfy the above all conditional expressions, and when any one of the conditional expressions is individually satisfied, operational advantage corresponding to each conditional expression can be obtained. According to the present embodiment, lens surfaces of the respective lenses are formed as aspheric surfaces. An equation that expresses these aspheric surfaces is shown below:

$$Z = \frac{C \cdot H^2}{1 + \sqrt{1 - (1+k) \cdot C^2 \cdot H^2}} + \sum (An \cdot H^n) \quad \text{[Equation 1]}$$

where
 Z: a distance in a direction of the optical axis,
 H: a distance from the optical axis in a direction perpendicular to the optical axis,
 C: a paraxial curvature (=1/r, r: paraxial curvature radius),
 k: conic constant, and
 An: the nth aspheric coefficient.

Next, examples of the imaging lens according to the present embodiment will be described. In each example, f represents a focal length of the overall optical system of the imaging lens, Fno represents a F-number, w represents a half field of view. Additionally, i represents a surface number counted from the object side, r represents a paraxial curvature radius, d represents a distance of lenses along the optical axis (surface distance), nd represents a refractive index at a reference wavelength of 588 nm, and vd represents an abbe number at the reference wavelength, respectively. Here, surfaces indicated with surface numbers i affixed with an asterisk (*) are aspheric surfaces.

Example 1

The basic lens data is shown below in Table 1.

TABLE 1 f = 6.06 mm  Fno = 1.5  ω = 37.2°

|  | i | r | d | nd | vd | [mm] |
|---|---|---|---|---|---|---|
|  |  | ∞ | ∞ |  |  |  |
| L1 | 1* | 3.679 | 0.312 | 1.6707 | 19.2 | f1 = −34.903 |
|  | 2* | 3.071 | 1.055 |  |  |  |
|  | 3 (ST) | ∞ | −0.759 |  |  |  |
| L2 | 4* | 3.019 | 1.332 | 1.5348 | 55.7 | f2 = 4.885 |
|  | 5* | −16.411 | 0.030 |  |  |  |
| L3 | 6* | 2.520 | 0.250 | 1.6707 | 19.2 | f3 = −19.844 |
|  | 7* | 2.034 | 0.871 |  |  |  |
| L4 | 8* | −12.443 | 0.611 | 1.5348 | 55.7 | f4 = 36.805 |
|  | 9* | −7.754 | 0.026 |  |  |  |
| L5 | 10* | −904.287 | 0.304 | 1.6707 | 19.2 | f5 = 100.926 |
|  | 11* | −62.989 | 0.130 |  |  |  |
| L6 | 12* | −4.720 | 0.777 | 1.6707 | 19.2 | f6 = 101.456 |
|  | 13* | −4.706 | 0.028 |  |  |  |
| L7 | 14* | 2.107 | 0.395 | 1.5445 | 56.4 | f7 = 10.090 |
|  | 15* | 3.193 | 0.711 |  |  |  |
| L8 | 16* | 5.881 | 0.306 | 1.5348 | 55.7 | f8 = −5.146 |
|  | 17* | 1.841 | 0.475 |  |  |  |
|  | 18 | ∞ | 0.210 | 1.5168 | 64.2 |  |
|  | 19 | ∞ | 0.946 |  |  |  |
| (IM) |  | ∞ |  |  |  |  | f45=26.890 mm
f56=52.365 mm
R1f=3.679 mm
R1r=3.071 mm
R4f=−12.443 mm
R7r=3.193 mm
R8f=5.881 mm
R8r=1.841 mm
D34=0.871 mm
D78=0.711 mm
T7=0.395 mm
T8=0.306 mm
L47=2.270 mm
TL=7.938 mm
Hmax=4.6 mm
Dep=4.015 mm

TABLE 2

Aspheric Surface Data

| i | k | A4 | A6 | A8 | A10 |
|---|---|---|---|---|---|
| 1 | 0.000E+00 | −1.739E−02 | −1.227E−02 | 6.255E−03 | −1.562E−03 |
| 2 | 0.000E+00 | −1.266E−02 | −2.807E−02 | 1.613E−02 | −5.251E−03 |
| 4 | −2.347E+00 | 3.035E−02 | −2.522E−02 | 1.874E−02 | −1.042E−02 |
| 5 | 0.000E+00 | 3.590E−02 | −3.841E−02 | 2.580E−02 | −1.164E−02 |
| 6 | −2.233E+01 | 1.383E−01 | −2.005E−01 | 1.953E−01 | −1.416E−01 |
| 7 | −2.330E+00 | −2.807E−02 | 4.026E−02 | −6.236E−02 | 5.890E−02 |
| 8 | 5.114E+01 | −2.100E−02 | 2.313E−02 | −4.758E−02 | 3.760E−02 |
| 9 | 0.000E+00 | −6.344E−02 | −4.690E−02 | 4.250E−02 | 9.775E−03 |
| 10 | 0.000E+00 | −8.775E−02 | −8.322E−02 | 1.138E−01 | −2.224E−02 |
| 11 | 0.000E+00 | 2.464E−02 | −1.320E−01 | 1.318E−01 | −6.730E−02 |
| 12 | 0.000E+00 | 1.600E−01 | −1.299E−01 | 7.138E−02 | −2.616E−02 |
| 13 | 0.000E+00 | 4.186E−02 | −9.199E−03 | 6.372E−03 | −5.828E−03 |
| 14 | −8.574E−01 | −3.057E−02 | 7.208E−03 | −1.352E−02 | 7.310E−03 |
| 15 | 0.000E+00 | 3.494E−02 | −3.911E−02 | 1.162E−02 | −2.229E−03 |
| 16 | 2.315E+00 | −1.181E−01 | 3.752E−02 | −8.123E−03 | 1.341E−03 |
| 17 | −6.568E+00 | −6.559E−02 | 2.141E−02 | −4.908E−03 | 8.150E−04 |

| i | A12 | A14 | A16 | A18 | A20 |
|---|---|---|---|---|---|
| 1 | 1.347E−04 | 4.492E−05 | −1.597E−05 | 1.948E−06 | −8.407E−08 |
| 2 | 1.062E−03 | −1.038E−04 | −3.511E−06 | 1.758E−06 | −1.123E−07 |
| 4 | 4.174E−03 | −1.100E−03 | 1.765E−04 | −1.500E−05 | 4.758E−07 |
| 5 | 3.522E−03 | −7.689E−04 | 1.474E−04 | −2.273E−05 | 1.655E−06 |
| 6 | 7.084E−02 | −2.297E−02 | 4.407E−03 | −4.017E−04 | 6.302E−06 |
| 7 | −3.718E−02 | 1.599E−02 | −4.551E−03 | 7.770E−04 | −5.940E−05 |
| 8 | −1.542E−02 | 3.035E−03 | −1.708E−04 | −3.083E−05 | 8.070E−06 |
| 9 | −2.520E−02 | 1.255E−02 | −2.927E−03 | 3.296E−04 | −1.379E−05 |
| 10 | −2.775E−02 | 2.003E−02 | −5.830E−03 | 8.333E−04 | −4.907E−05 |
| 11 | 1.812E−02 | −2.172E−03 | −4.102E−05 | 3.741E−05 | −2.898E−06 |
| 12 | 4.906E−03 | −1.698E−04 | −7.763E−05 | 9.710E−06 | −2.856E−07 |
| 13 | 2.492E−03 | −5.861E−04 | 8.232E−05 | −6.664E−06 | 2.410E−07 |
| 14 | −2.310E−03 | 4.645E−04 | −5.740E−05 | 3.930E−06 | −1.134E−07 |
| 15 | 3.030E−04 | −2.656E−05 | 1.050E−06 | 2.107E−08 | −2.409E−09 |
| 16 | −1.558E−04 | 1.194E−05 | −5.722E−07 | 1.573E−08 | −1.955E−10 |
| 17 | −9.773E−05 | 8.089E−06 | −4.195E−07 | 1.170E−08 | −1.257E−10 |

The values of the respective conditional expressions are as follows:

R1f/R1r=1.20 f1/f2=−7.14 f3/f=−3.27 f1/f3=1.76

R4f/f=−2.05

|f5|/f=16.65

L47/f=0.37

R7r/R8f=0.54

T7/T8=1.29

D78/D34=0.82 f8/f=−0.85

R8r/f=0.30

TL/f=1.31

TL/Hmax=1.73 f4/f=6.07 f45/f=4.44 f6/f=16.74 f56/f=8.64 f7/f8=−1.96 f/Dep=1.51

Accordingly, the imaging lens according to the Example 1 satisfies the above-described conditional expressions.

Figure 2:
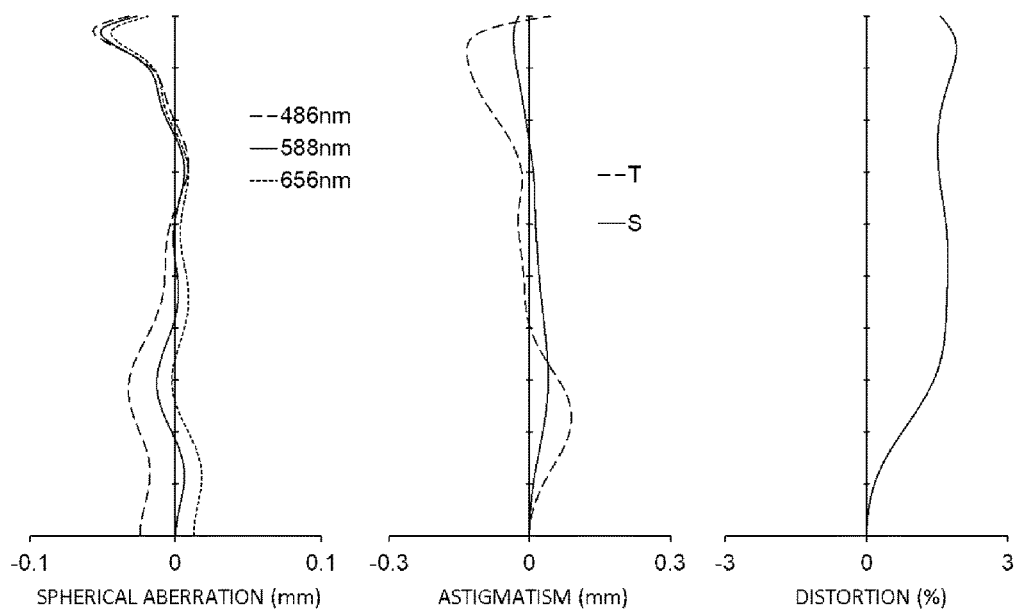
FIG. 2 is an aberration diagram showing spherical aberration, astigmatism, and distortion of the imaging lens of FIG. 1.
Figure 3:
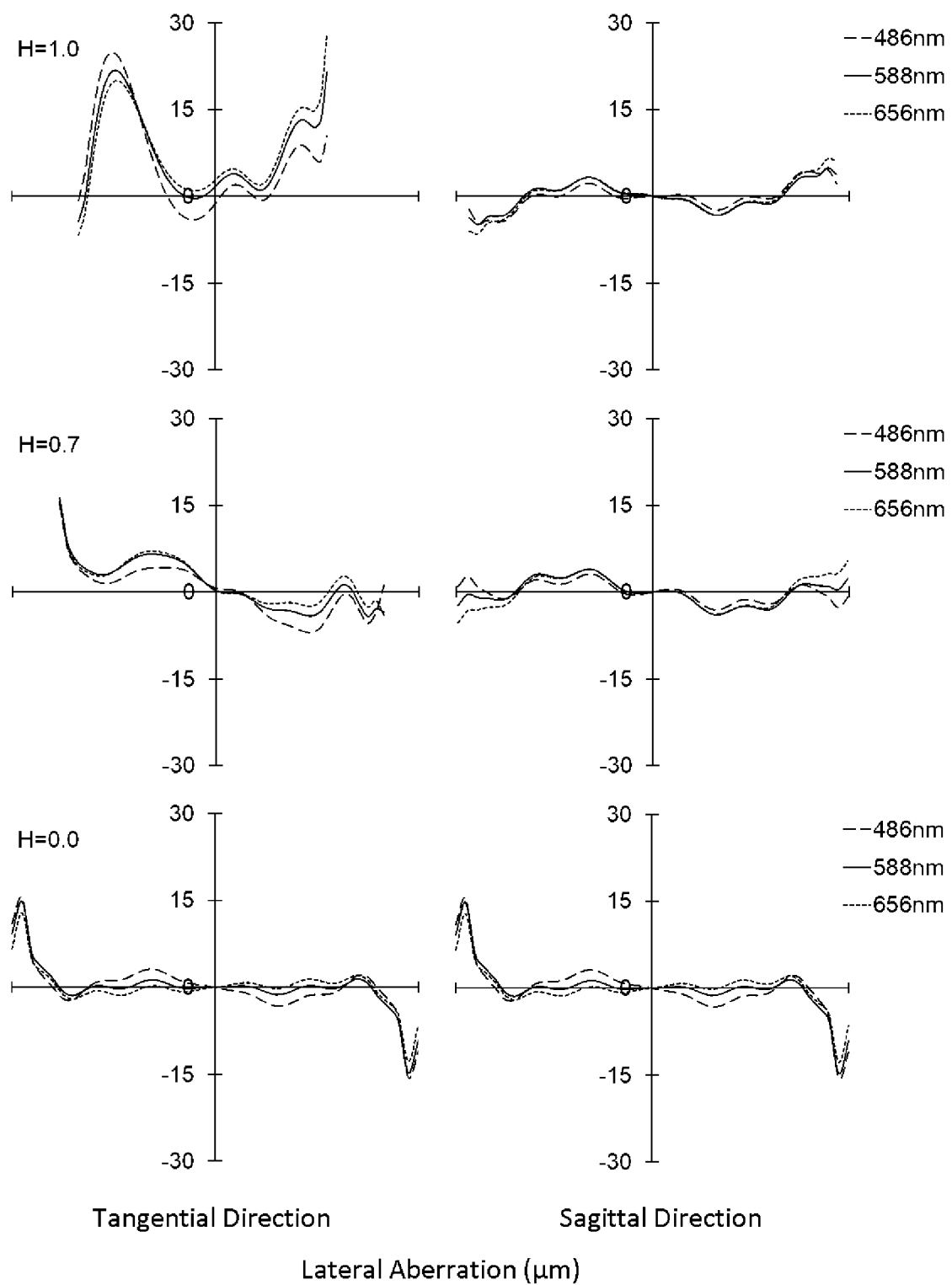
FIG. 3 is an aberration diagram showing a lateral aberration of the imaging lens of FIG. 1.
Figure 4:
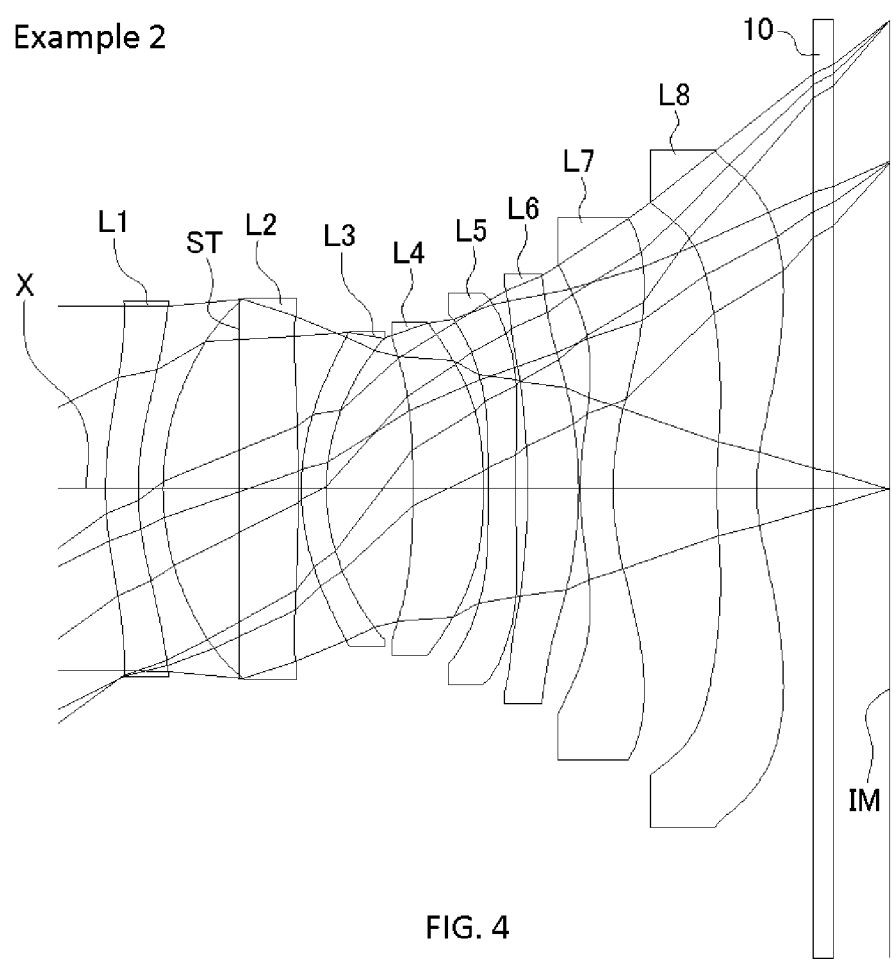
FIG. 4 is a sectional view of a schematic configuration of an imaging lens in Example 2 of the present invention.

FIG. 2 shows spherical aberration (mm), astigmatism (mm), and distortion (%) of the imaging lens in Example 1, respectively. The astigmatism diagram and distortion diagram show aberrations at the reference wavelength (588 nm). Furthermore, in the astigmatism diagram, a sagittal image surface (S) and a tangential image surface (T) are shown respectively (same for FIGS. 5, 8, 11, 14, 17, 20, 23, 26, 29, 32, 35, 38, 41, 44 and 47). FIG. 3 shows a lateral aberration corresponding to a ratio H of each image height to the maximum image height Hmax (hereinafter referred to as "image height ratio H"), which is divided into a tangential direction and a sagittal direction (same for FIGS. 6, 9, 12, 15, 18, 21, 24, 27, 30, 33, 36, 39, 42, 45 and 48). As shown in FIGS. 2 and 3, according to the imaging lens of the Example 1, aberrations can be properly corrected.

Example 2

The basic lens data is shown below in Table 3.

TABLE 3

| | i | r | d | nd | vd | [mm] |
|---|---|---|---|---|---|---|
| | | | | $f = 6.38$ mm Fno $= 1.7$ $\omega = 35.8°$ | | |
| | | ∞ | ∞ | | | |
| L1 | 1* | 3.735 | 0.326 | 1.6707 | 19.2 | f1 = −25.365 |
| | 2* | 2.955 | 1.015 | | | |
| | 3 (ST) | ∞ | −0.764 | | | |
| L2 | 4* | 2.824 | 1.355 | 1.5348 | 55.7 | f2 = 4.609 |
| | 5* | −16.134 | 0.030 | | | |
| L3 | 6* | 2.397 | 0.250 | 1.6707 | 19.2 | f3 = −28.576 |
| | 7* | 2.041 | 0.868 | | | |
| L4 | 8* | −13.470 | 0.706 | 1.5348 | 55.7 | f4 = 21.457 |
| | 9* | −6.310 | 0.047 | | | |
| L5 | 10* | 114.798 | 0.281 | 1.6707 | 19.2 | f5 = 116.346 |
| | 11* | −243.472 | 0.123 | | | |
| L6 | 12* | −4.423 | 0.504 | 1.6707 | 19.2 | f6 = 102.826 |
| | 13* | −4.347 | 0.018 | | | |
| L7 | 14* | 3.124 | 0.327 | 1.5445 | 56.4 | f7 = −85.035 |
| | 15* | 2.819 | 1.042 | | | |
| L8 | 16* | 4.646 | 0.400 | 1.5348 | 55.7 | f8 = −7.169 |
| | 17* | 2.038 | 0.564 | | | |
| | 18 | ∞ | 0.210 | 1.5168 | 64.2 | |
| | 19 | ∞ | 0.561 | | | |
| (1M) | | ∞ | | | | | f45=18.078 mm f56=55.865 mm

R1f=3.735 mm

R1r=2.955 mm

R4f=−13.470 mm

R7r=2.819 mm

R8f=4.646 mm

R8r=2.038 mm

D34=0.868 mm

D78=1.042 mm

T7=0.327 mm

T8=0.400 mm

L47=2.004 mm

TL=7.788 mm

Hmax=4.6 mm

Dep=3.781 mm

TABLE 4

Aspheric Surface Data

| i | k | A4 | A6 | A8 | A10 |
|---|---|---|---|---|---|
| 1 | 0.000E+00 | −1.896E−02 | −1.160E−02 | 6.103E−03 | −1.536E−03 |
| 2 | 0.000E+00 | −1.176E−02 | −2.772E−02 | 1.617E−02 | −5.266E−03 |
| 4 | −4.385E+00 | 4.243E−02 | −2.578E−02 | 1.703E−02 | −8.897E−03 |
| 5 | 0.000E+00 | 1.996E−02 | −2.516E−02 | 2.078E−02 | −1.116E−02 |
| 6 | −1.805E+01 | 1.494E−01 | −1.812E−01 | 1.832E−01 | −1.359E−01 |
| 7 | −1.071E+00 | −1.081E−02 | 2.643E−02 | −4.383E−02 | 5.279E−02 |
| 8 | 6.677E+01 | −3.612E−02 | 3.272E−02 | −5.527E−02 | 4.824E−02 |
| 9 | 0.000E+00 | −1.062E−01 | 2.432E−02 | −8.839E−03 | 2.949E−02 |
| 10 | 0.000E+00 | −1.895E−02 | −1.256E−01 | 1.171E−01 | −1.792E−02 |
| 11 | 0.000E+00 | 1.186E−01 | −2.219E−01 | 1.728E−01 | −7.778E−02 |
| 12 | 0.000E+00 | 1.202E−01 | −1.306E−01 | 7.363E−02 | −2.416E−02 |
| 13 | 0.000E+00 | 6.088E−03 | −2.298E−02 | 2.023E−02 | −8.205E−03 |
| 14 | 4.767E−01 | −7.499E−02 | −7.655E−03 | −7.440E−03 | 6.267E−03 |
| 15 | 0.000E+00 | −1.702E−02 | −1.995E−02 | 9.585E−03 | −2.340E−03 |
| 16 | 1.792E−01 | −1.061E−01 | 4.399E−02 | −1.123E−02 | 1.682E−03 |
| 17 | −5.466E+00 | −6.136E−02 | 2.379E−02 | −5.953E−03 | 9.573E−04 |

| i | A12 | A14 | A16 | A18 | A20 |
|---|---|---|---|---|---|
| 1 | 1.288E−04 | 4.542E−05 | −1.580E−05 | 1.936E−06 | −9.040E−08 |
| 2 | 1.060E−03 | −1.046E−04 | −3.205E−06 | 1.764E−06 | −1.227E−07 |
| 4 | 3.667E−03 | −1.063E−03 | 1.990E−04 | −2.144E−05 | 1.060E−06 |
| 5 | 4.019E−03 | −9.074E−04 | 1.101E−04 | −2.385E−06 | −4.482E−07 |
| 6 | 6.948E−02 | −2.319E−02 | 4.561E−03 | −4.215E−04 | 6.954E−06 |
| 7 | −3.836E−02 | 1.691E−02 | −4.497E−03 | 6.846E−04 | −4.769E−05 |
| 8 | −2.078E−02 | 4.049E−03 | −5.807E−05 | −6.952E−05 | 4.760E−06 |
| 9 | −2.772E−02 | 1.177E−02 | −2.610E−03 | 3.143E−04 | −1.911E−05 |
| 10 | −2.982E−02 | 2.041E−02 | −5.833E−03 | 8.361E−04 | −5.160E−05 |
| 11 | 1.948E−02 | −2.020E−03 | −1.341E−04 | 4.782E−05 | −2.953E−06 |
| 12 | 4.982E−03 | −4.656E−04 | −6.336E−05 | 2.129E−05 | −1.549E−06 |
| 13 | 2.462E−03 | −5.787E−04 | 8.464E−05 | −5.780E−06 | 9.509E−08 |
| 14 | −2.416E−03 | 4.831E−04 | −5.279E−05 | 3.458E−06 | −1.454E−07 |
| 15 | 3.283E−04 | −2.672E−05 | 8.811E−07 | 5.434E−08 | −5.516E−09 |
| 16 | −1.541E−04 | 1.085E−05 | −7.143E−07 | 9.848E−09 | 1.741E−09 |
| 17 | −1.044E−04 | 7.886E−06 | −3.983E−07 | 1.125E−08 | −1.036E−10 |

The values of the respective conditional expressions are as follows:

$R1f/R1r=1.26$ $f1/f2=-5.50$ $f3/f=-4.48$ $f1/f3=0.89$ $R4f/f=-2.11$ $|f5|/f=18.24$ $L47/f=0.31$ $R7r/R8f=0.61$ $T7/T8=0.82$ $D78/D34=1.20$ $f8/f=-1.12$ $R8r/f=0.32$ $TL/f=1.22$ $TL/Hmax=1.69$ $f4/f=3.36$ $f45/f=2.83$ $f6/f=16.12$ $f56/f=8.76$ $f7/f8=11.86$ $f/\text{Dep}=1.69$ Accordingly, the imaging lens according to the Example 2 satisfies the above-described conditional expressions.

Figure 5:
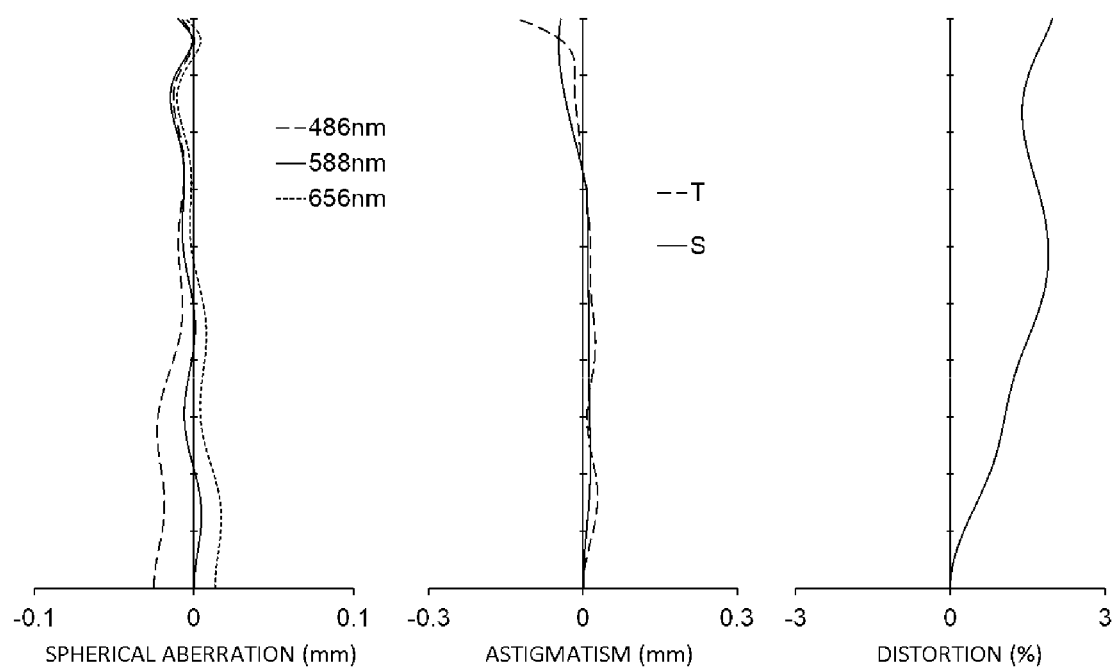
FIG. 5 is an aberration diagram showing spherical aberration, astigmatism, and distortion of the imaging lens of FIG. 4.
Figure 6:
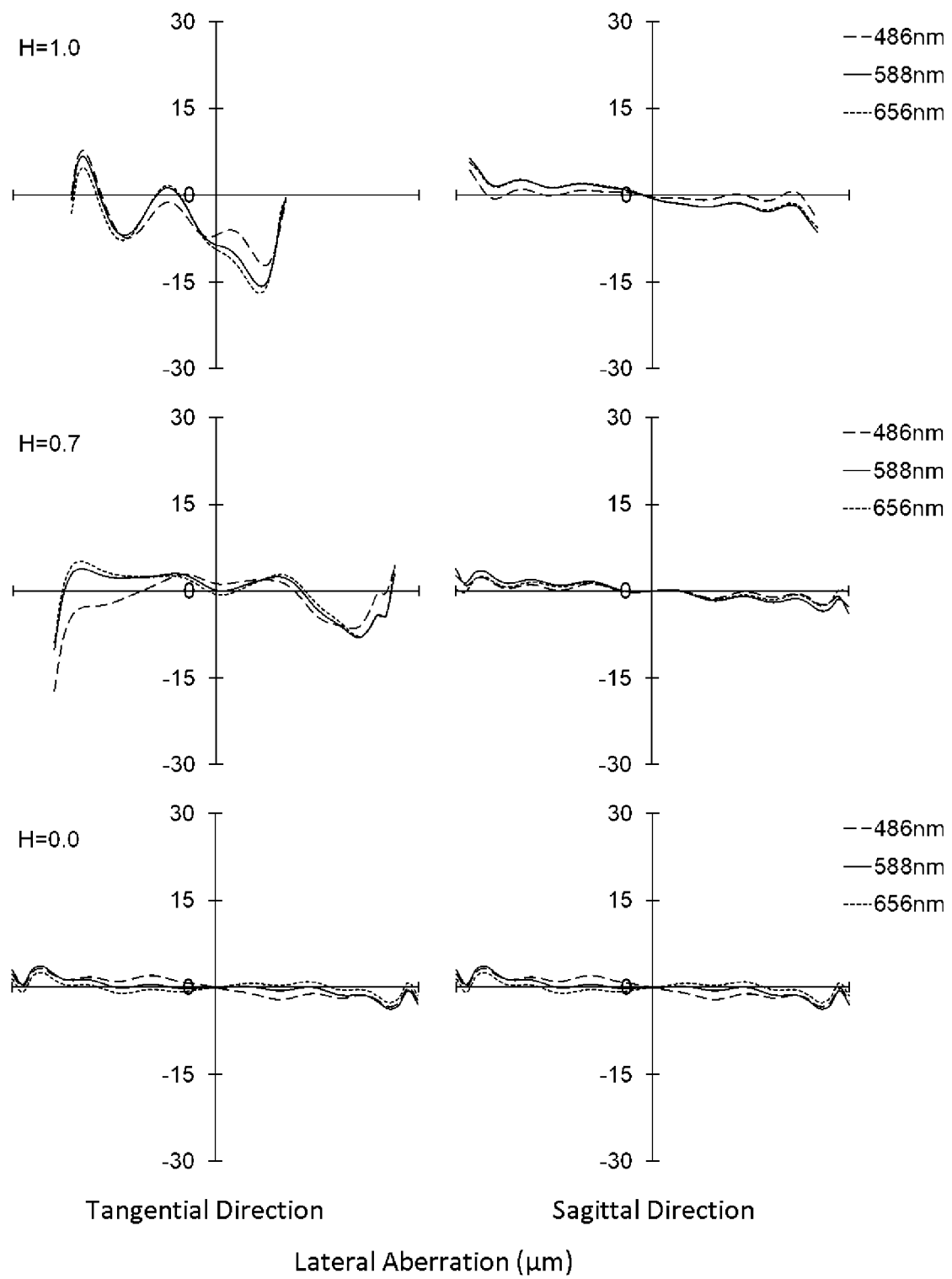
FIG. 6 is an aberration diagram showing a lateral aberration of the imaging lens of FIG. 4.
Figure 7:
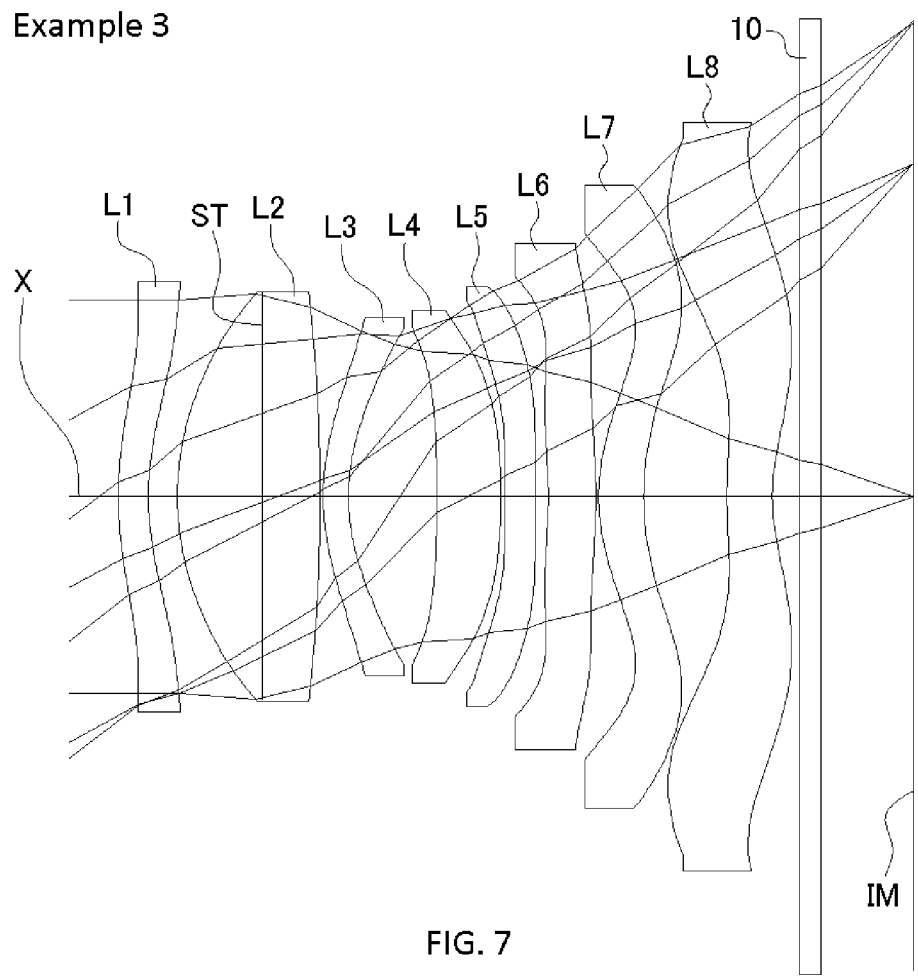
FIG. 7 is a sectional view of a schematic configuration of an imaging lens in Example 3 of the present invention.

FIG. 5 shows spherical aberration (mm), astigmatism (mm), and distortion (%), respectively. FIG. 6 shows a lateral aberration corresponding to the image height ratio H. As shown in FIGS. 5 and 6, according to the imaging lens of the Example 2, aberrations can be properly corrected.

Example 3

The basic lens data is shown below in Table 5.

TABLE 5 f = 5.95 mm Fno = 1.5 ω = 37.7°

| | i | r | d | nd | υd | [mm] |
|---|---|---|---|---|---|---|
| | | ∞ | ∞ | | | |
| L1 | 1* | 3.744 | 0.296 | 1.6707 | 19.2 | f1 = −25.575 |
| | 2* | 2.976 | 1.118 | | | |
| | 3 (ST) | ∞ | −0.834 | | | |
| L2 | 4* | 2.877 | 1.402 | 1.5348 | 55.7 | f2 = 4.703 |
| | 5* | −16.624 | 0.030 | | | |
| L3 | 6* | 2.433 | 0.250 | 1.6707 | 19.2 | f3 = −24.259 |
| | 7* | 2.029 | 0.870 | | | |
| L4 | 8* | −13.649 | 0.626 | 1.5348 | 55.7 | f4 = 28.488 |
| | 9* | −7.314 | 0.039 | | | |
| L5 | 10* | 150.846 | 0.300 | 1.6707 | 19.2 | f5 = 103.544 |
| | 11* | −128.609 | 0.132 | | | |
| L6 | 12* | −4.079 | 0.465 | 1.6707 | 19.2 | f6 = −15.542 |
| | 13* | −7.007 | 0.028 | | | |
| L7 | 14* | 2.001 | 0.445 | 1.5445 | 56.4 | f7 = 8.330 |
| | 15* | 3.299 | 0.817 | | | |
| L8 | 16* | 5.018 | 0.445 | 1.5348 | 55.7 | f8 = −6.343 |
| | 17* | 1.961 | 0.265 | | | |
| | 18 | ∞ | 0.210 | 1.5168 | 64.2 | |
| | 19 | ∞ | 0.907 | | | |
| (IM) | | ∞ | | | | | f45=22.287 mm
f56=−18.245 mm
R1f=3.744 mm
R1r=2.976 mm
R4f=−13.649 mm
R7r=3.299 mm
R8f=5.018 mm
R8r=1.961 mm
D34=0.870 mm
D78=0.817 mm
T7=0.445 mm
T8=0.445 mm
L47=2.034 mm
TL=7.740 mm
Hmax=4.6 mm
Dep=3.953 mm

TABLE 6

Aspheric Surface Data

| i | k | A4 | A6 | A8 | A10 |
|---|---|---|---|---|---|
| 1 | 0.000E+00 | −1.817E−02 | −1.142E−02 | 6.101E−03 | −1.540E−03 |
| 2 | 0.000E+00 | −1.183E−02 | −2.811E−02 | 1.617E−02 | −5.251E−03 |
| 4 | −2.807E+00 | 3.164E−02 | −2.373E−02 | 1.660E−02 | −9.274E−03 |
| 5 | 0.000E+00 | 1.771E−02 | −2.408E−02 | 1.840E−02 | −9.682E−03 |
| 6 | −2.094E+01 | 1.442E−01 | −2.054E−01 | 1.999E−01 | −1.412E−01 |
| 7 | −9.079E−01 | −3.173E−02 | 2.544E−02 | −4.632E−02 | 5.209E−02 |
| 8 | 1.868E+01 | −1.178E−02 | 1.681E−02 | −3.508E−02 | 3.033E−02 |
| 9 | 0.000E+00 | −2.362E−02 | −3.476E−02 | 1.068E−02 | 2.695E−02 |
| 10 | 0.000E+00 | −1.926E−02 | −1.392E−01 | 1.287E−01 | −2.184E−02 |
| 11 | 0.000E+00 | 5.537E−02 | −1.775E−01 | 1.612E−01 | −7.661E−02 |
| 12 | 0.000E+00 | 1.665E−01 | −1.217E−01 | 6.531E−02 | −2.363E−02 |
| 13 | 0.000E+00 | 3.101E−02 | −4.176E−03 | 6.026E−03 | −6.201E−03 |
| 14 | −9.371E−01 | −4.374E−02 | 1.211E−02 | −1.358E−02 | 6.939E−03 |
| 15 | 0.000E+00 | 4.044E−02 | −4.019E−02 | 1.230E−02 | −2.416E−03 |
| 16 | 3.460E−02 | −1.239E−01 | 3.741E−02 | −8.048E−03 | 1.337E−03 |
| 17 | −6.316E+00 | −6.619E−02 | 2.102E−02 | −5.168E−03 | 8.979E−04 |

| i | A12 | A14 | A16 | A18 | A20 |
|---|---|---|---|---|---|
| 1 | 1.294E−04 | 4.551E−05 | −1.586E−05 | 1.940E−06 | −8.698E−08 |
| 2 | 1.060E−03 | −1.037E−04 | −3.442E−06 | 1.751E−06 | −1.137E−07 |
| 4 | 3.863E−03 | −1.089E−03 | 1.932E−04 | −1.933E−05 | 8.240E−07 |
| 5 | 3.548E−03 | −8.885E−04 | 1.488E−04 | −1.533E−05 | 7.292E−07 |
| 6 | 6.916E−02 | −2.249E−02 | 4.613E−03 | −5.366E−04 | 2.658E−05 |
| 7 | −3.679E−02 | 1.666E−02 | −4.631E−03 | 7.126E−04 | −4.573E−05 |
| 8 | −1.460E−02 | 3.571E−03 | −2.488E−04 | −6.288E−05 | 1.191E−05 |
| 9 | −2.812E−02 | 1.206E−02 | −2.655E−03 | 2.905E−04 | −1.191E−05 |
| 10 | −2.795E−02 | 1.991E−02 | −5.839E−03 | 8.418E−04 | −4.926E−05 |
| 11 | 1.952E−02 | −2.083E−03 | −1.311E−04 | 5.347E−05 | −3.793E−06 |
| 12 | 4.550E−03 | −2.555E−04 | −5.307E−05 | 8.910E−06 | −3.524E−07 |
| 13 | 2.564E−03 | −5.851E−04 | 8.071E−05 | −6.404E−06 | 2.246E−07 |
| 14 | −2.205E−03 | 4.557E−04 | −5.840E−05 | 4.172E−06 | −1.261E−07 |
| 15 | 3.173E−04 | −2.544E−05 | 8.826E−07 | 1.873E−08 | −1.777E−09 |
| 16 | −1.559E−04 | 1.193E−05 | −5.674E−07 | 1.526E−08 | −1.774E−10 |
| 17 | −1.049E−04 | 8.083E−06 | −3.924E−07 | 1.076E−08 | −1.251E−10 |

The values of the respective conditional expressions are as follows:

$R1f/R1r=1.26$ $f1/f2=-5.44$ $f3/f=-4.08$ $f1/f3=1.05$ $R4f/f=-2.30$ $|f5|/f=17.41$ $L47/f=0.34$ $R7r/R8f=0.66$ $T7/T8=1.00$ $D78/D34=0.94$ $f8/f=-1.07$ $R8r/f=0.33$ $TL/f=1.30$ $TL/H\text{max}=1.69$ $f4/f=4.79$ $f45/f=3.75$ $f7/f8=-1.31$ $f/\text{Dep}=1.50$ Accordingly, the imaging lens according to the Example 3 satisfies the above-described conditional expressions.

Figure 8:
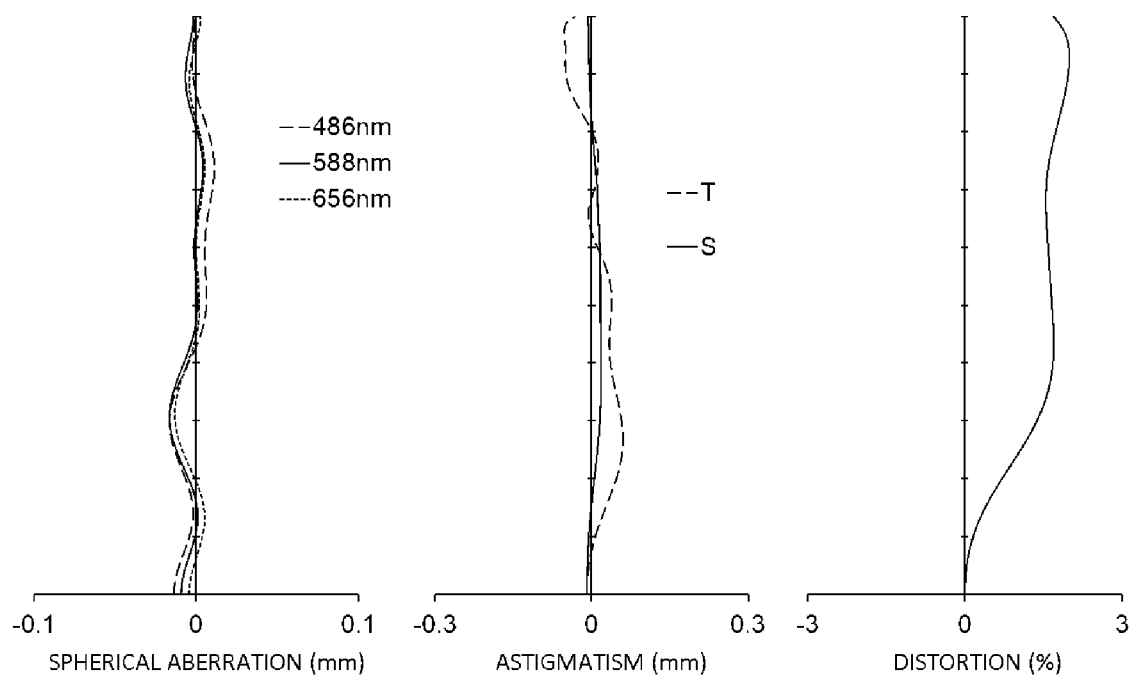
FIG. 8 is an aberration diagram showing spherical aberration, astigmatism, and distortion of the imaging lens of FIG. 7.
Figure 9:
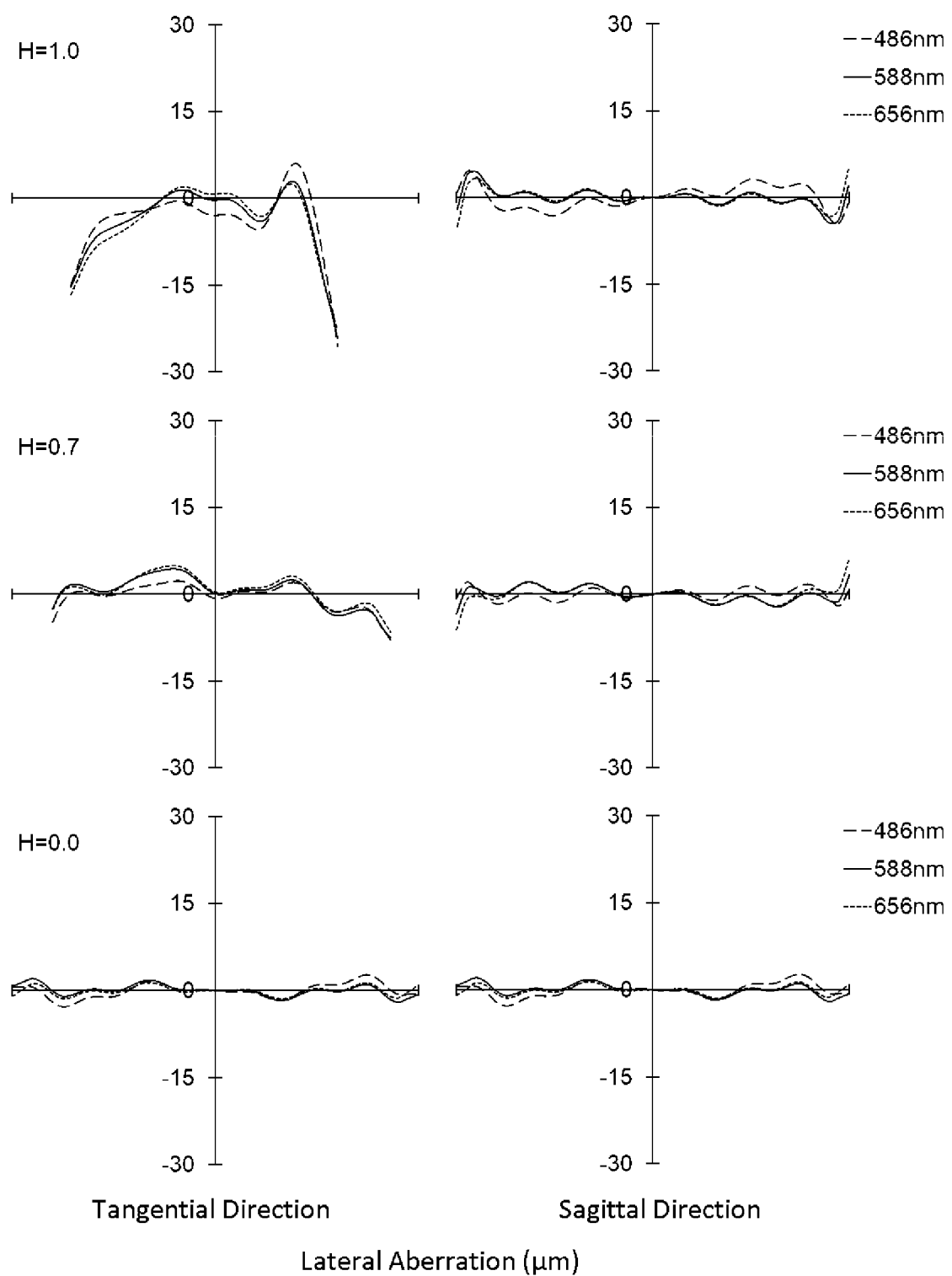
FIG. 9 is an aberration diagram showing a lateral aberration of the imaging lens of FIG. 7.
Figure 10:
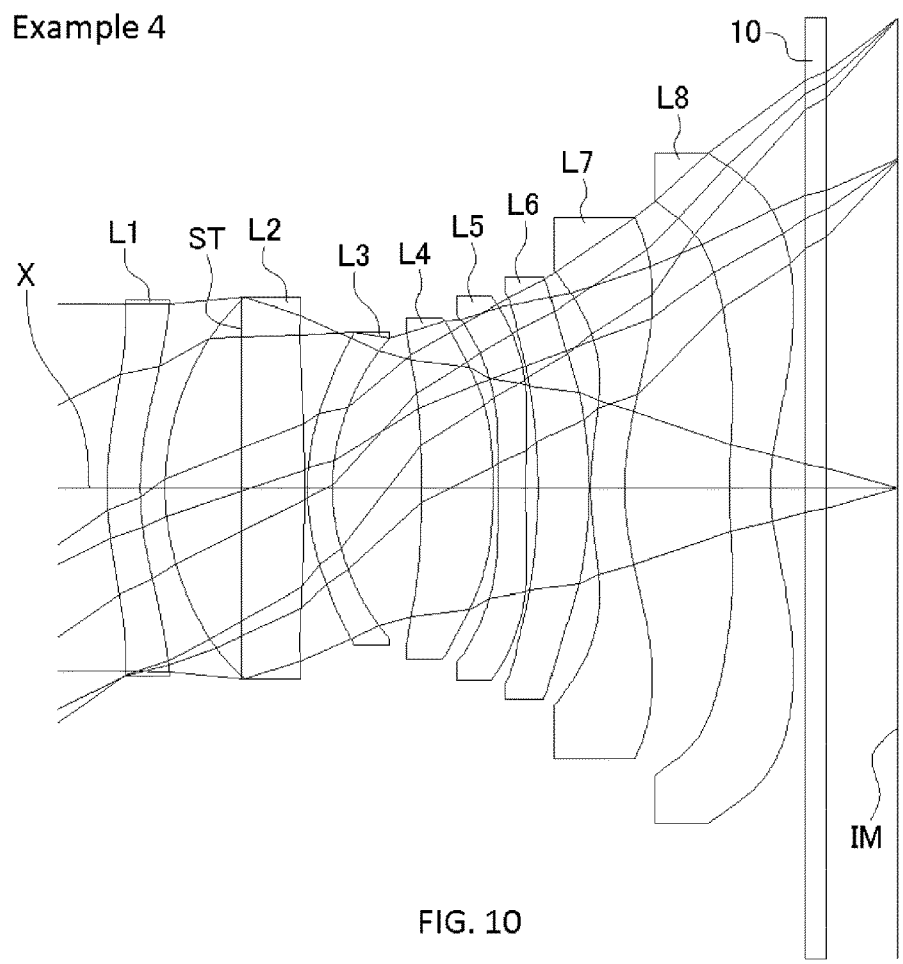
FIG. 10 is a sectional view of a schematic configuration of an imaging lens in Example 4 of the present invention.

FIG. 8 shows spherical aberration (mm), astigmatism (mm), and distortion (%), respectively. FIG. 9 shows a lateral aberration corresponding to the image height ratio H. As shown in FIGS. 8 and 9, according to the imaging lens of the Example 3, aberrations can be properly corrected.

Example 4

The basic lens data is shown below in Table 7.

TABLE 7

| | | | | | | |
|---|---|---|---|---|---|---|
| f = 6.57 mm Fno = 1.7 ω = 35.0° | | | | | | |
| | i | r | d | nd | νd | [mm] |
| | | ∞ | ∞ | | | |
| L1 | 1* | 3.712 | 0.329 | 1.6707 | 19.2 | f1 = −27.629 |
| | 2* | 2.982 | 1.013 | | | |
| | 3 (ST) | ∞ | −0.762 | | | |
| L2 | 4* | 2.801 | 1.388 | 1.5348 | 55.7 | f2 = 4.584 |
| | 5* | −16.273 | 0.030 | | | |
| L3 | 6* | 2.397 | 0.250 | 1.6707 | 19.2 | f3 = −29.908 |
| | 7* | 2.052 | 0.891 | | | |
| L4 | 8* | −13.553 | 0.715 | 1.5348 | 55.7 | f4 = 20.438 |
| | 9* | −6.162 | 0.047 | | | |
| L5 | 10* | 116.812 | 0.282 | 1.6707 | 19.2 | f5 = 117.946 |
| | 11* | −244.882 | 0.123 | | | |
| L6 | 12* | −4.249 | 0.503 | 1.6707 | 19.2 | f6 = −49.588 |
| | 13* | −5.103 | 0.018 | | | |
| L7 | 14* | 3.102 | 0.338 | 1.5445 | 56.4 | f7 = −98.997 |
| | 15* | 2.821 | 1.048 | | | |
| L8 | 16* | 4.639 | 0.413 | 1.5348 | 55.7 | f8 = −7.361 |
| | 17* | 2.064 | 0.347 | | | |
| | 18 | ∞ | 0.210 | 1.5168 | 64.2 | |
| | 19 | ∞ | 0.706 | | | |
| (IM) | | ∞ | | | | | f45=17.385 mm
f56=−83.453 mm
R1f=3.712 mm
R1r=2.982 mm
R4f=−13.553 mm
R7r=2.821 mm
R8f=4.639 mm
R8r=2.064 mm
D34=0.891 mm
D78=1.048 mm
T7=0.338 mm
T8=0.413 mm
L47=2.026 mm
TL=7.817 mm
Hmax=4.6 mm
Dep=3.796 mm

TABLE 8

| | | | | | |
|---|---|---|---|---|---|
| Aspheric Surface Data | | | | | |
| i | k | A4 | A6 | A8 | A10 |
| 1 | 0.000E+00 | −1.902E−02 | −1.160E−02 | 6.102E−03 | −1.536E−03 |
| 2 | 0.000E+00 | −1.176E−02 | −2.772E−02 | 1.617E−02 | −5.266E−03 |
| 4 | −5.572E+00 | 4.837E−02 | −2.702E−02 | 1.673E−02 | −8.740E−03 |
| 5 | 0.000E+00 | 1.612E−02 | −2.168E−02 | 1.866E−02 | −1.035E−02 |
| 6 | −1.804E+01 | 1.450E−01 | −1.812E−01 | 1.829E−01 | −1.356E−01 |
| 7 | −1.125E+00 | −1.136E−02 | 2.478E−02 | −4.343E−02 | 5.260E−02 |
| 8 | 7.133E+01 | −2.119E−02 | 2.601E−02 | −4.376E−02 | 3.878E−02 |
| 9 | 0.000E+00 | −7.292E−02 | 5.781E−04 | −2.429E−03 | 3.069E−02 |
| 10 | 0.000E+00 | −1.056E−02 | −1.371E−01 | 1.188E−01 | −1.923E−02 |
| 11 | 0.000E+00 | 1.060E−01 | −2.164E−01 | 1.699E−01 | −7.708E−02 |
| 12 | 0.000E+00 | 1.175E−01 | −1.372E−01 | 7.718E−02 | −2.440E−02 |
| 13 | 0.000E+00 | −1.866E−03 | −2.422E−02 | 1.895E−02 | −7.334E−03 |
| 14 | 1.176E−01 | −8.206E−02 | 6.218E−03 | −6.709E−03 | 5.930E−03 |
| 15 | 0.000E+00 | −2.421E−02 | −1.724E−02 | 8.940E−03 | −2.263E−03 |
| 16 | −4.660E−01 | −1.133E−01 | 4.628E−02 | −1.147E−02 | 1.686E−03 |
| 17 | −6.672E+00 | −5.926E−02 | 2.218E−02 | −5.504E−03 | 9.034E−04 |

| i | A12 | A14 | A16 | A18 | A20 |
|---|---|---|---|---|---|
| 1 | 1.287E−04 | 4.543E−05 | −1.580E−05 | 1.934E−06 | −9.021E−08 |
| 2 | 1.060E−03 | −1.046E−04 | −3.205E−06 | 1.762E−06 | −1.228E−07 |
| 4 | 3.669E−03 | −1.071E−03 | 1.985E−04 | −2.084E−05 | 9.693E−07 |
| 5 | 3.909E−03 | −9.266E−04 | 1.157E−04 | −2.307E−05 | −6.377E−07 |
| 6 | 6.973E−02 | −2.317E−02 | 4.522E−03 | −4.388E−04 | 1.306E−05 |
| 7 | −3.802E−02 | 1.715E−02 | −4.515E−03 | 5.761E−04 | −2.210E−05 |
| 8 | −1.740E−02 | 3.757E−03 | −4.421E−05 | −1.015E−04 | 6.838E−06 |
| 9 | −2.846E−02 | 1.171E−02 | −2.548E−03 | 3.380E−04 | −2.921E−05 |
| 10 | −2.801E−02 | 1.972E−02 | −5.787E−03 | 8.749E−04 | −5.998E−05 |
| 11 | 1.943E−02 | −2.010E−03 | −1.341E−04 | 4.631E−05 | −2.757E−06 |
| 12 | 4.777E−03 | −4.310E−04 | −5.671E−05 | 1.848E−05 | −1.303E−06 |
| 13 | 2.393E−03 | −6.015E−04 | 8.502E−05 | −5.006E−06 | 3.303E−08 |
| 14 | −2.283E−03 | 4.629E−04 | −5.316E−05 | 3.968E−06 | −2.013E−07 |
| 15 | 3.287E−04 | −2.738E−05 | 8.427E−07 | 6.298E−08 | −5.571E−09 |
| 16 | −1.536E−04 | 1.086E−05 | −7.163E−07 | 9.748E−09 | 1.753E−09 |
| 17 | −1.035E−04 | 8.197E−06 | −4.041E−07 | 8.667E−09 | 3.197E−11 |

The values of the respective conditional expressions are as follows:

$R1f/R1r=1.24$ $f1/f2=-6.03$ $f3/f=-4.55$ $f1/f3=0.92$ $R4f/f=-2.06$ $|f5|/f=17.94$ $L47/f=0.31$ $R7r/R8f=0.61$ $T7/T8=0.82$ $D78/D34=1.18$ $f8/f=-1.12$ $R8r/f=0.31$ $TL/f=1.19$ $TL/H\max=1.70$ $f4/f=3.11$ $f45/f=2.64$ $f7/f8=13.45$ $f/\text{Dep}=1.73$ Accordingly, the imaging lens according to the Example 4 satisfies the above-described conditional expressions.

Figure 11:
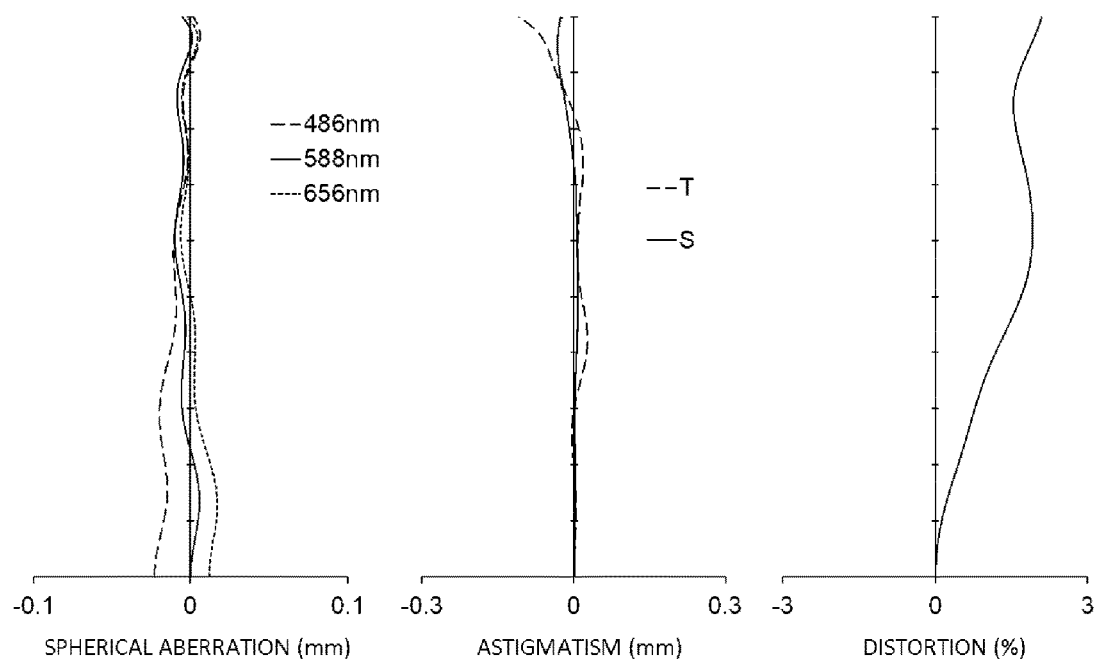
FIG. 11 is an aberration diagram showing spherical aberration, astigmatism, and distortion of the imaging lens of FIG. 10.
Figure 12:
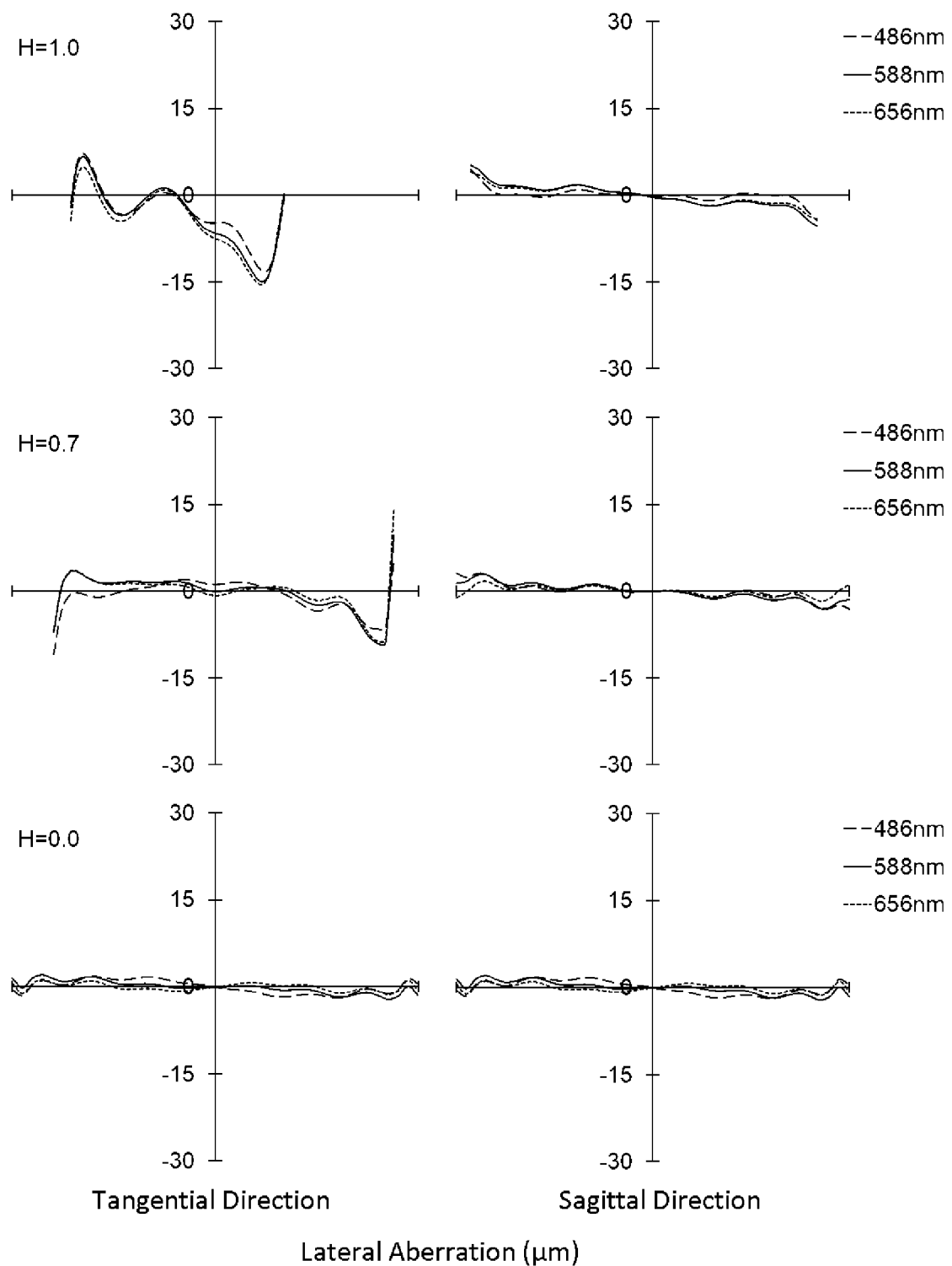
FIG. 12 is an aberration diagram showing a lateral aberration of the imaging lens of FIG. 10.
Figure 13:
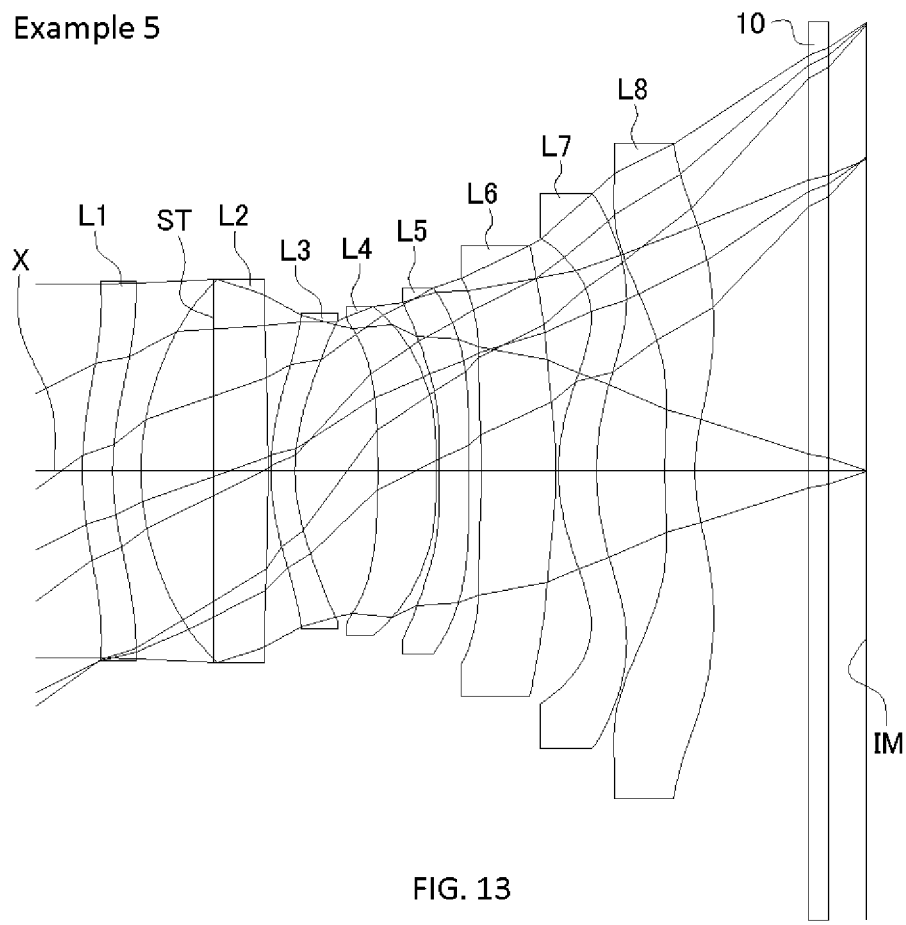
FIG. 13 is a sectional view of a schematic configuration of an imaging lens in Example 5 of the present invention.

FIG. 11 shows spherical aberration (mm), astigmatism (mm), and distortion (%), respectively. FIG. 12 shows a lateral aberration corresponding to the image height ratio H. As shown in FIGS. 11 and 12, according to the imaging lens of the Example 4, aberrations can be properly corrected.

Example 5

The basic lens data is shown below in Table 9.

TABLE 9

| | | f = 6.39 mm Fno = 1.6 ω = 35.7° | | | | |
|---|---|---|---|---|---|---|
| | i | r | d | nd | νd | [mm] |
| L1 | 1* | 3.687 | 0.316 | 1.6707 | 19.2 | f1 = −36.061 |
| | 2* | 3.089 | 1.059 | | | |
| | 3 (ST) | ∞ | −0.761 | | | |
| L2 | 4* | 3.061 | 1.331 | 1.5348 | 55.7 | f2 = 4.919 |
| | 5* | −15.861 | 0.030 | | | |
| L3 | 6* | 2.517 | 0.250 | 1.6707 | 19.2 | f3 = −19.775 |
| | 7* | 2.031 | 0.870 | | | |
| L4 | 8* | −12.403 | 0.613 | 1.5348 | 55.7 | f4 = 36.091 |
| | 9* | −7.681 | 0.029 | | | |
| L5 | 10* | −48.649 | 0.309 | 1.6707 | 19.2 | f5 = −106.365 |
| | 11* | −153.323 | 0.136 | | | |
| L6 | 12* | −4.865 | 0.777 | 1.6707 | 19.2 | f6 = 77.110 |
| | 13* | −4.732 | 0.028 | | | |
| L7 | 14* | 2.100 | 0.397 | 1.5445 | 56.4 | f7 = 9.592 |
| | 15* | 3.278 | 0.717 | | | |
| L8 | 16* | 5.850 | 0.311 | 1.5348 | 55.7 | f8 = −5.200 |
| | 17* | 1.850 | 1.194 | | | |
| | 18 | ∞ | 0.210 | 1.5168 | 64.2 | |
| | 19 | ∞ | 0.396 | | | |
| (IM) | | ∞ | | | | | f45=55.159 mm
f56=236.038 mm
R1f=3.687 mm
R1r=3.089 mm
R4f=−12.403 mm
R7r=3.278 mm
R8f=5.850 mm
R8r=1.850 mm
D34=0.870 mm
D78=0.717 mm
T7=0.397 mm
T8=0.311 mm
L47=2.290 mm
TL=8.141 mm
Hmax=4.6 mm
Dep=4.020 mm

TABLE 10

Aspheric Surface Data

| i | k | A4 | A6 | A8 | A10 |
|---|---|---|---|---|---|
| 1 | 0.000E+00 | −1.744E−02 | −1.228E−02 | 6.257E−03 | −1.568E−03 |
| 2 | 0.000E+00 | −1.289E−02 | −2.808E−02 | 1.615E−02 | −5.251E−03 |
| 4 | −2.197E+00 | 2.901E−02 | −2.495E−02 | 1.869E−02 | −1.043E−02 |
| 5 | 0.000E+00 | 3.768E−02 | −4.260E−02 | 2.969E−02 | −1.340E−02 |
| 6 | −2.268E+01 | 1.390E−01 | −2.019E−01 | 1.963E−01 | −1.413E−01 |
| 7 | −2.312E+00 | −3.134E−02 | 4.669E−02 | −7.159E−02 | 6.801E−02 |
| 8 | 4.851E+01 | −2.500E−02 | 2.109E−02 | −4.631E−02 | 3.787E−02 |
| 9 | 0.000E+00 | −6.558E−02 | −4.395E−02 | 3.954E−02 | 1.153E−02 |
| 10 | 0.000E+00 | −7.846E−02 | −8.436E−02 | 1.133E−01 | −2.226E−02 |
| 11 | 0.000E+00 | 2.489E−02 | −1.307E−01 | 1.305E−01 | −6.685E−02 |
| 12 | 0.000E+00 | 1.540E−01 | −1.285E−01 | 7.148E−02 | −2.620E−02 |
| 13 | 0.000E+00 | 3.855E−02 | −8.830E−03 | 6.439E−03 | −5.842E−03 |
| 14 | −8.802E−01 | −3.563E−02 | 8.374E−03 | −1.392E−02 | 7.591E−03 |
| 15 | 0.000E+00 | 3.077E−02 | −3.794E−02 | 1.159E−02 | −2.232E−03 |
| 16 | −2.335E−01 | −1.189E−01 | 3.751E−02 | −8.145E−03 | 1.347E−03 |
| 17 | −7.107E+00 | −6.583E−02 | 2.156E−02 | −4.943E−03 | 8.144E−04 |

| i | A12 | A14 | A16 | A18 | A20 |
|---|---|---|---|---|---|
| 1 | 1.364E−04 | 4.496E−05 | −1.604E−05 | 1.942E−06 | −8.123E−08 |
| 2 | 1.061E−03 | −1.038E−04 | −3.482E−06 | 1.771E−06 | −1.159E−07 |
| 4 | 4.181E−03 | −1.100E−03 | 1.770E−04 | −1.522E−05 | 4.911E−07 |
| 5 | 3.817E−03 | −6.862E−04 | 1.066E−04 | −1.784E−05 | 1.541E−06 |
| 6 | 7.067E−02 | −2.304E−02 | 4.423E−03 | −3.864E−04 | 1.749E−06 |
| 7 | −4.132E−02 | 1.615E−02 | −3.903E−03 | 5.256E−04 | −2.833E−05 |
| 8 | −1.556E−02 | 2.979E−03 | −1.672E−04 | −2.339E−05 | 8.639E−06 |
| 9 | −2.555E−02 | 1.248E−02 | −2.914E−03 | 3.381E−04 | −1.545E−05 |
| 10 | −2.771E−02 | 2.004E−02 | −5.816E−03 | 8.254E−04 | −4.815E−05 |
| 11 | 1.812E−02 | −2.177E−03 | −4.207E−05 | 3.725E−05 | −2.854E−06 |
| 12 | 4.837E−03 | −9.548E−05 | −9.512E−05 | 9.760E−06 | −4.978E−08 |
| 13 | 2.505E−03 | −5.900E−04 | 8.336E−05 | −6.886E−06 | 2.591E−07 |
| 14 | −2.411E−03 | 4.781E−04 | −5.671E−05 | 3.602E−06 | −9.244E−08 |
| 15 | 3.019E−04 | −2.641E−05 | 1.023E−06 | 2.512E−08 | −2.613E−09 |
| 16 | −1.559E−04 | 1.188E−05 | −5.718E−07 | 1.645E−08 | −2.347E−10 |
| 17 | −9.773E−05 | 8.133E−06 | −4.225E−07 | 1.174E−08 | −1.265E−10 |

The values of the respective conditional expressions are as follows:

$R1f/R1r=1.19$ $f1/f2=-7.33$ $f3/f=-3.09$ $f1/f3=1.82$ $R4f/f=-1.94$ $|f5|/f=16.64$ $L47/f=0.36$ $R7r/R8f=0.56$ $T7/T8=1.27$ $D78/D34=0.82$ $f8/f=-0.81$ $R8r/f=0.29$ $TL/f=1.27$ $TL/H\max=1.77$ $f4/f=5.65$ $f45/f=8.63$ $f6/f=12.07$ $f7/f8=-1.84$ $f/\text{Dep}=1.59$ Accordingly, the imaging lens according to the Example 5 satisfies the above-described conditional expressions.

Figure 14:
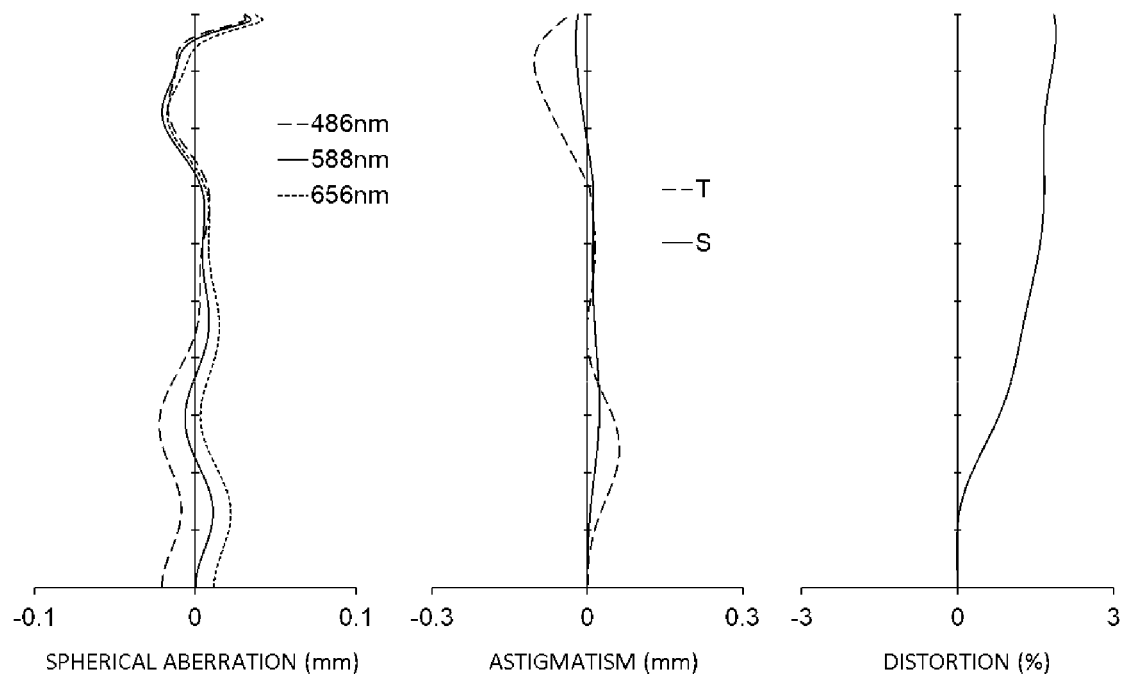
FIG. 14 is an aberration diagram showing spherical aberration, astigmatism, and distortion of the imaging lens of FIG. 13.
Figure 15:
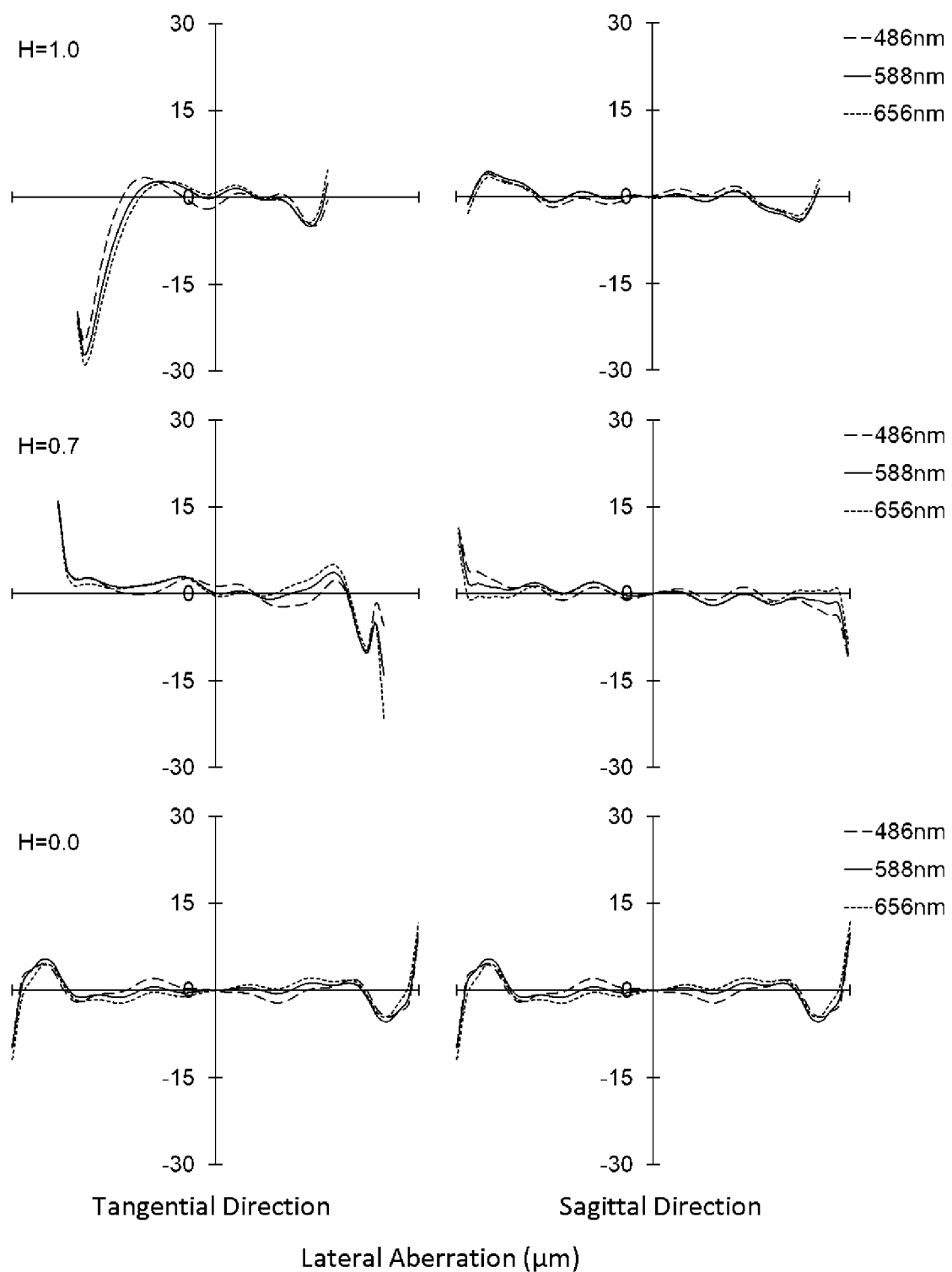
FIG. 15 is an aberration diagram showing a lateral aberration of the imaging lens of FIG. 13.
Figure 16:
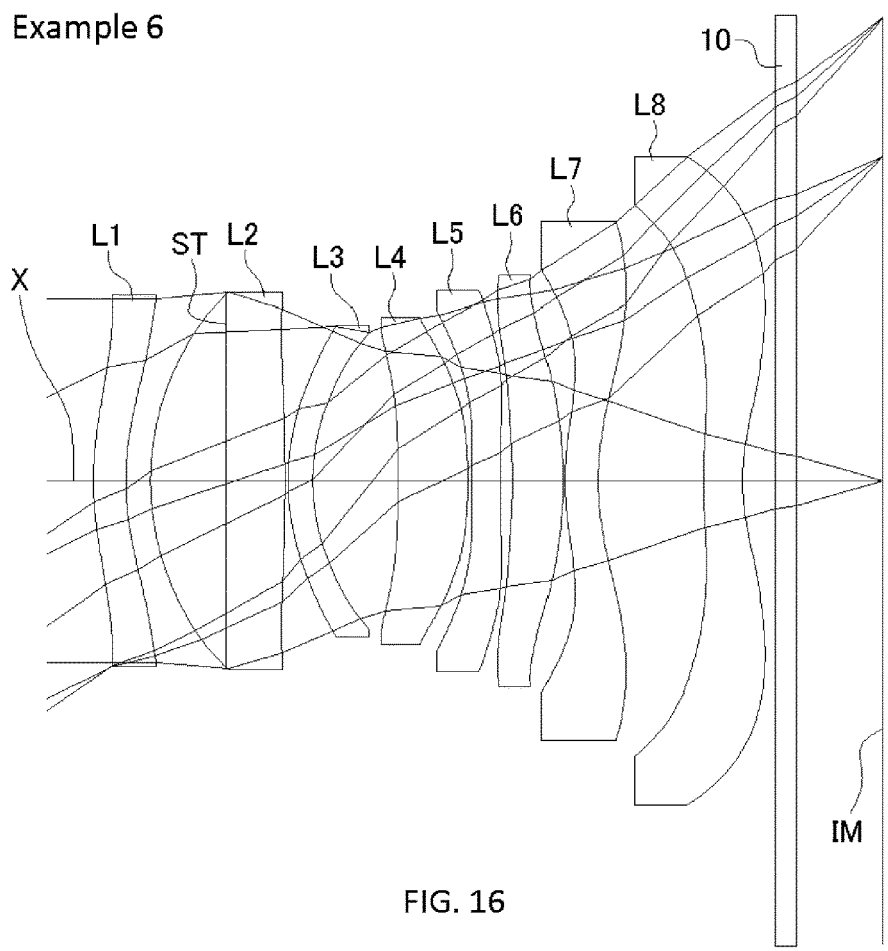
FIG. 16 is a sectional view of a schematic configuration of an imaging lens in Example 6 of the present invention.

FIG. 14 shows spherical aberration (mm), astigmatism (mm), and distortion (%), respectively. FIG. 15 shows a lateral aberration corresponding to the image height ratio H. As shown in FIGS. 14 and 15, according to the imaging lens of the Example 5, aberrations can be properly corrected.

Example 6

The basic lens data is shown below in Table 11.

TABLE 11 f = 6.68 mm Fno = 1.8 ω = 34. 6°

| | i | r | d | n d | ν d | [mm] |
|---|---|---|---|---|---|---|
| | | ∞ | ∞ | | | |
| L1 | 1* | 3.681 | 0.328 | 1.6707 | 19.2 | f1 = −26.540 |
| | 2* | 2.942 | 1.014 | | | |
| | 3 (ST) | ∞ | −0.763 | | | |
| L2 | 4* | 2.829 | 1.353 | 1.5348 | 55.7 | f2 = 4.614 |
| | 5* | −16.10 | 0.030 | | | |
| L3 | 6* | 2.404 | 0.250 | 1.6707 | 19.2 | f3 = −28.960 |
| | 7* | 2.050 | 0.866 | | | |
| L4 | 8* | −13.581 | 0.703 | 1.5348 | 55.7 | f4 = 20.775 |
| | 9* | −6.221 | 0.046 | | | |
| L5 | 10* | 1454.618 | 0.287 | 1.6707 | 19.2 | f5 = −126.072 |
| | 11* | 79.910 | 0.122 | | | |
| L6 | 12* | −4.416 | 0.506 | 1.6707 | 19.2 | f6 = 98.191 |
| | 13* | −4.329 | 0.021 | | | |
| L7 | 14* | 3.123 | 0.334 | 1.5445 | 56.4 | f7 = −85.660 |
| | 15* | 2.81 | 1.062 | | | |
| L8 | 16* | 4.637 | 0.398 | 1.5348 | 55.7 | f8 = −7.173 |
| | 17* | 2.037 | 0.338 | | | |
| | 18 | ∞ | 0.210 | 1.5168 | 64.2 | |
| | 19 | ∞ | 0.867 | | | |
| (IM) | | ∞ | | | | | f45=24.909 mm
f56=379.686 mm
R1f=3.681 mm
R1r=2.942 mm
R4f=−13.581 mm
R7r=2.817 mm
R8f=4.637 mm
R8r=2.037 mm
D34=0.866 mm
D78=1.062 mm
T7=0.334 mm
T8=0.398 mm
L47=2.018 mm
TL=7.900 mm
Hmax=4.6 mm
Dep=3.791 mm

TABLE 12

Aspheric Surface Data

| i | k | A4 | A6 | A8 | A10 |
|---|---|---|---|---|---|
| 1 | 0.000E+00 | −1.885E−02 | −1.156E−02 | 6.104E−03 | −1.537E−03 |
| 2 | 0.000E+00 | −1.156E−02 | −2.778E−02 | 1.616E−02 | −5.262E−03 |
| 4 | −5.739E+00 | 4.912E−02 | −2.785E−02 | 1.719E−02 | −8.847E−03 |
| 5 | 0.000E+00 | 2.258E−02 | −2.791E−02 | 2.341E−02 | −1.276E−02 |
| 6 | −1.807E+01 | 1.456E−01 | −1.772E−01 | 1.808E−01 | −1.347E−01 |
| 7 | −8.483E−01 | −1.981E−02 | 3.025E−02 | −4.088E−02 | 4.487E−02 |
| 8 | −1.804E+01 | −3.698E−02 | 4.383E−02 | −7.304E−02 | 6.249E−02 |
| 9 | 0.000E+00 | −9.701E−02 | 3.782E−02 | −2.947E−02 | 3.968E−02 |
| 10 | 0.000E+00 | −4.676E−02 | −9.523E−02 | 1.038E−01 | −1.860E−02 |
| 11 | 0.000E+00 | 1.032E−01 | −2.105E−01 | 1.652E−01 | −7.463E−02 |
| 12 | 0.000E+00 | 1.571E−01 | −1.607E−01 | 8.275E−02 | −2.489E−02 |
| 13 | 0.000E+00 | 2.382E−02 | −2.989E−02 | 1.869E−02 | −7.456E−03 |
| 14 | 9.131E−01 | −7.291E−02 | 6.809E−04 | −4.259E−03 | 4.894E−03 |
| 15 | 0.000E+00 | −2.289E−02 | −1.793E−02 | 9.180E−03 | −2.326E−03 |
| 16 | −2.193E−01 | −1.093E−01 | 4.184E−02 | −1.042E−02 | 1.575E−03 |
| 17 | −6.575E+00 | −5.736E−02 | 2.080E−02 | −5.312E−03 | 9.033E−04 |

TABLE 12-continued

Aspheric Surface Data

| i | A12 | A14 | A16 | A18 | A20 |
|---|---|---|---|---|---|
| 1 | 1.285E−04 | 4.536E−05 | −1.579E−05 | 1.945E−06 | −9.139E−08 |
| 2 | 1.055E−03 | −1.034E−04 | −2.975E−06 | 1.737E−06 | −1.329E−07 |
| 4 | 3.665E−03 | −1.075E−03 | 2.046E−04 | −2.226E−05 | 1.063E−06 |
| 5 | 4.457E−03 | −9.184E−04 | 9.572E−05 | −6.999E−07 | −5.883E−07 |
| 6 | 6.926E−02 | −2.333E−02 | 4.629E−03 | −4.118E−04 | 9.221E−07 |
| 7 | −3.245E−02 | 1.589E−02 | −5.466E−03 | 1.243E−03 | −1.343E−04 |
| 8 | −2.639E−02 | 4.017E−03 | 6.925E−04 | −2.847E−04 | 2.472E−05 |
| 9 | −2.860E−02 | 1.062E−02 | −2.112E−03 | 2.407E−04 | −1.567E−05 |
| 10 | −2.819E−02 | 2.070E−02 | −6.173E−03 | 9.049E−04 | −5.561E−05 |
| 11 | 1.904E−02 | −2.056E−03 | −1.232E−04 | 4.774E−05 | −2.950E−06 |
| 12 | 4.885E−03 | −4.649E−04 | −6.561E−05 | 2.415E−05 | −1.925E−06 |
| 13 | 2.478E−03 | −5.884E−04 | 8.265E−05 | −6.215E−06 | 2.345E−07 |
| 14 | −2.122E−03 | 4.782E−04 | −5.891E−05 | 3.978E−06 | −1.523E−07 |
| 15 | 3.341E−04 | −2.630E−05 | 7.496E−07 | 3.911E−08 | −3.187E−09 |
| 16 | −1.406E−04 | 8.574E−06 | −7.632E−07 | 6.561E−08 | −1.988E−09 |
| 17 | −1.044E−04 | 8.076E−06 | −3.969E−07 | 1.066E−08 | −9.919E−11 |

The values of the respective conditional expressions are as follows:

$R1f/R1r=1.25$ $f1/f2=-5.75$ $f3/f=-4.34$ $f1/f3=0.92$ $R4f/f=-2.03$ $|f5|/f=18.87$ $L47/f=0.30$ $R7r/R8f=0.61$ $T7/T8=0.84$ $D78/D34=1.23$ $f8/f=-1.07$ $R8r/f=0.30$ $TL/f=1.18$ $TL/Hmax=1.72$ $f4/f=3.11$ $f45/f=3.73$ $f6/f=14.70$ $f7/f8=11.94$ $f/Dep=1.76$ Accordingly, the imaging lens according to the Example 6 satisfies the above-described conditional expressions.

Figure 17:
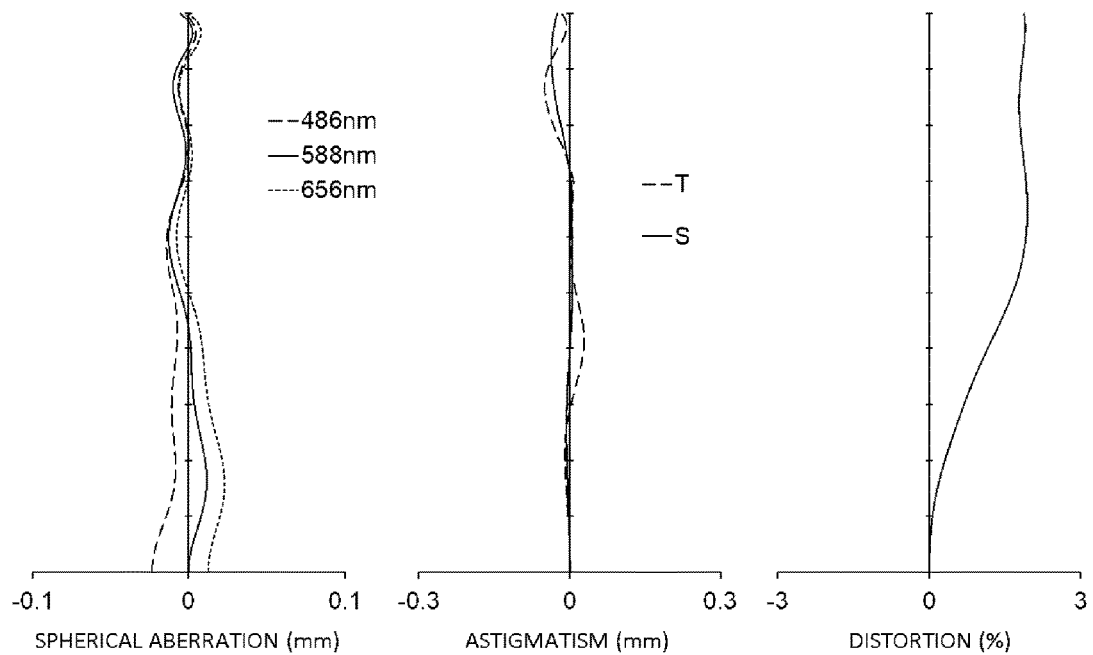
FIG. 17 is an aberration diagram showing spherical aberration, astigmatism, and distortion of the imaging lens of FIG. 16.
Figure 18:
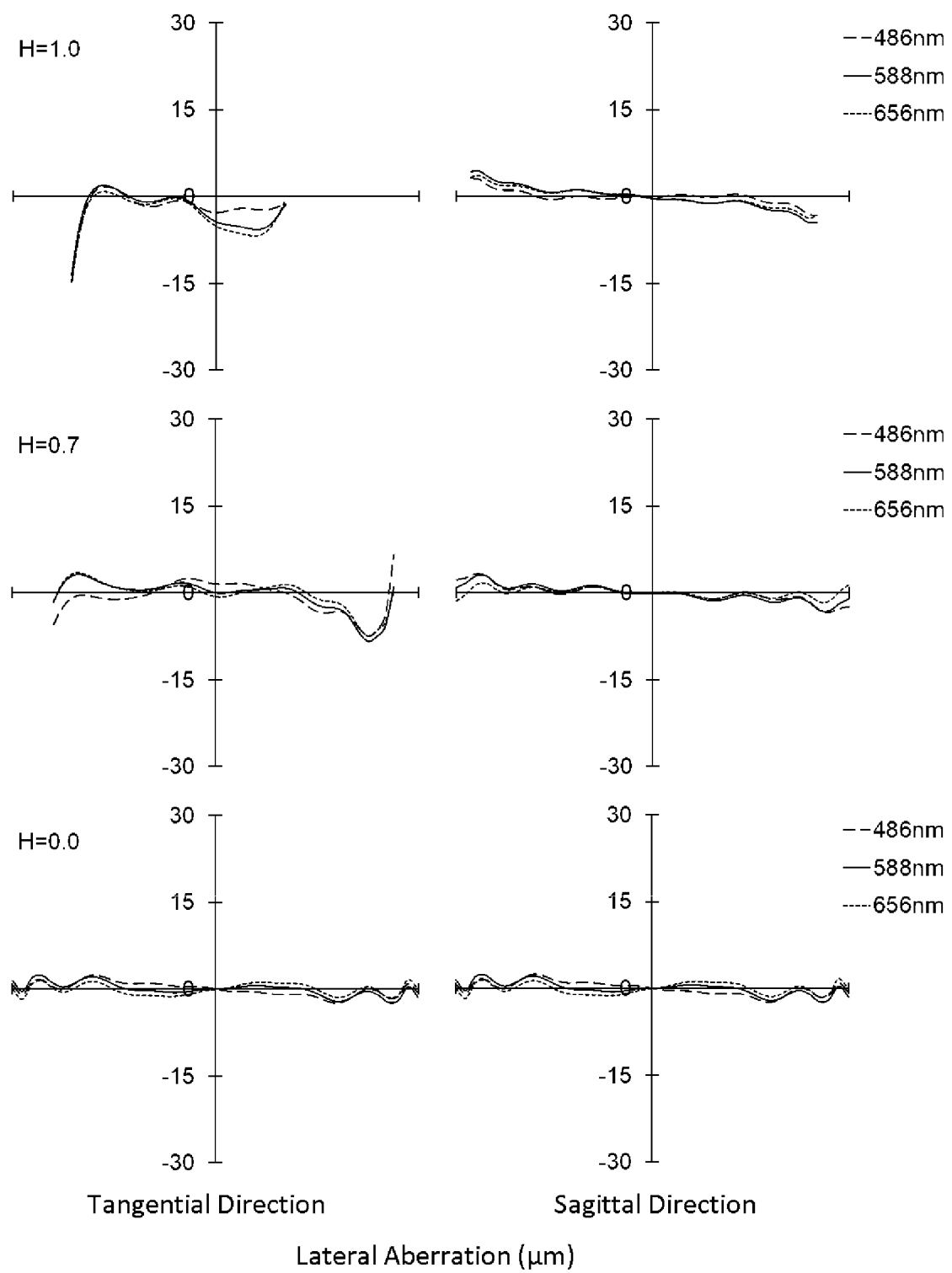
FIG. 18 is an aberration diagram showing a lateral aberration of the imaging lens of FIG. 16.
Figure 19:
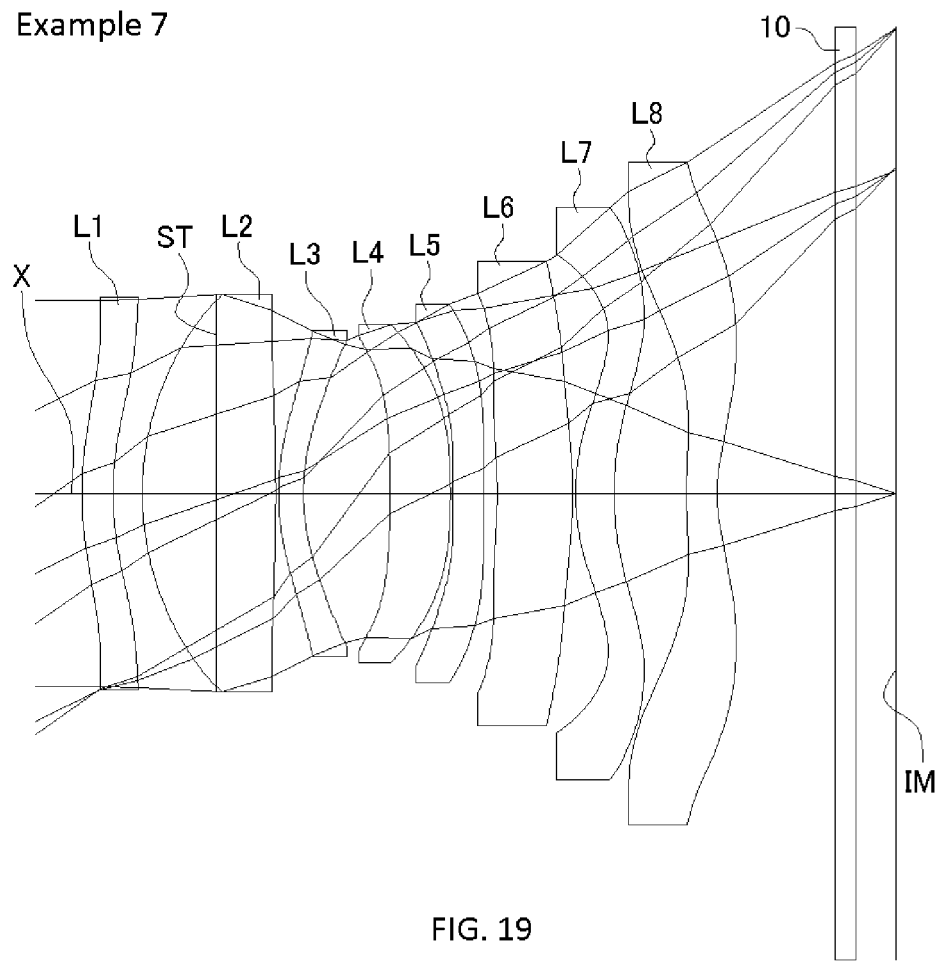
FIG. 19 is a sectional view of a schematic configuration of an imaging lens in Example 7 of the present invention.

FIG. 17 shows spherical aberration (mm), astigmatism (mm), and distortion (%), respectively. FIG. 18 shows a lateral aberration corresponding to the image height ratio H. As shown in FIGS. 17 and 18, according to the imaging lens of the Example 6, aberrations can be properly corrected.

Example 7

The basic lens data is shown below in Table 13.

TABLE 13

| | i | r | d | n d | v d | [mm] |
|---|---|---|---|---|---|---|
| | | ∞ | ∞ | | | |
| L1 | 1* | 3.688 | 0.314 | 1.6707 | 19.2 | f1 = −36.420 |
| | 2* | 3.095 | 1.044 | | | |
| | 3 (ST) | ∞ | −0.748 | | | |
| L2 | 4* | 3.039 | 1.348 | 1.5348 | 55.7 | f2 = 4.874 |
| | 5* | −15.487 | 0.030 | | | |
| L3 | 6* | 2.506 | 0.250 | 1.6707 | 19.2 | f3 = −20.979 |
| | 7* | 2.042 | 0.877 | | | |
| L4 | 8* | −12.598 | 0.609 | 1.5348 | 55.7 | f4 = 33.958 |
| | 9* | −7.563 | 0.029 | | | |
| L5 | 10* | −48.491 | 0.308 | 1.6707 | 19.2 | f5 = −106.631 |
| | 11* | −150.971 | 0.137 | | | |
| L6 | 12* | −4.422 | 0.762 | 1.6707 | 19.2 | f6 = −109.598 |
| | 13* | −5.030 | 0.028 | | | |
| L7 | 14* | 2.083 | 0.391 | 1.5445 | 56.4 | f7 = 9.187 |
| | 15* | 3.334 | 0.732 | | | |
| L8 | 16* | 5.826 | 0.312 | 1.5348 | 55.7 | f8 = −5.308 |
| | 17* | 1.873 | 1.192 | | | |
| | 18 | ∞ | 0.210 | 1.5168 | 64.2 | |
| | 19 | ∞ | 0.402 | | | |
| (IM) | | ∞ | | | | | f45=50.261 mm
f56=−55.656 mm
R1f=3.688 mm
R1r=3.095 mm
R4f=−12.598 mm
R7r=3.334 mm
R8f=5.826 mm
R8r=1.873 mm
D34=0.877 mm
D78=0.732 mm
T7=0.391 mm
T8=0.312 mm
L47=2.265 mm
TL=8.155 mm
Hmax=4.6 mm
Dep=4.022 mm

TABLE 14

Aspheric Surface Data

| i | k | A4 | A6 | A8 | A10 |
|---|---|---|---|---|---|
| 1 | 0.000E+00 | −1.830E−02 | −1.224E−02 | 6.272E−03 | −1.564E−03 |
| 2 | 0.000E+00 | −1.268E−02 | −2.808E−02 | 1.616E−02 | −5.251E−03 |
| 4 | −2.186E+00 | 2.939E−02 | −2.397E−02 | 1.818E−02 | −1.034E−02 |
| 5 | 0.000E+00 | 3.708E−02 | −4.238E−02 | 2.969E−02 | −1.340E−02 |
| 6 | −2.199E+01 | 1.395E−01 | −2.010E−01 | 1.966E−01 | −1.417E−01 |
| 7 | −2.333E+00 | −3.051E−02 | 4.675E−02 | −7.155E−02 | 6.802E−02 |
| 8 | 5.365E+01 | −2.792E−02 | 2.283E−02 | −4.673E−02 | 3.781E−02 |
| 9 | 0.000E+00 | −6.368E−02 | −4.335E−02 | 3.955E−02 | 1.149E−02 |
| 10 | 0.000E+00 | −7.662E−02 | −8.644E−02 | 1.143E−01 | −2.234E−02 |
| 11 | 0.000E+00 | 2.539E−02 | −1.303E−01 | 1.305E−01 | −6.685E−02 |
| 12 | 0.000E+00 | 1.591E−01 | −1.299E−01 | 7.187E−02 | −2.622E−02 |
| 13 | 0.000E+00 | 3.674E−02 | −8.753E−03 | 6.540E−03 | −5.861E−03 |
| 14 | −9.264E−01 | −3.784E−02 | 8.596E−03 | −1.385E−02 | 7.564E−03 |
| 15 | 0.000E+00 | 3.030E−02 | −3.792E−02 | 1.165E−02 | −2.232E−03 |
| 16 | −5.896E−01 | −1.207E−01 | 3.848E−02 | −8.308E−03 | 1.348E−03 |
| 17 | −7.424E+00 | −6.558E−02 | 2.153E−02 | −4.963E−03 | 8.150E−04 |

| i | A12 | A14 | A16 | A18 | A20 |
|---|---|---|---|---|---|
| 1 | 1.362E−04 | 4.500E−05 | −1.612E−05 | 1.942E−06 | −7.886E−08 |
| 2 | 1.061E−03 | −1.038E−04 | −3.499E−06 | 1.773E−06 | −1.171E−07 |
| 4 | 4.189E−03 | −1.103E−03 | 1.765E−04 | −1.498E−05 | 4.671E−07 |
| 5 | 3.817E−03 | −6.864E−04 | 1.064E−04 | −1.784E−05 | 1.555E−06 |
| 6 | 7.075E−02 | −2.300E−02 | 4.419E−03 | −3.906E−04 | 2.739E−06 |
| 7 | −4.132E−02 | 1.615E−02 | −3.903E−03 | 5.265E−04 | −2.794E−05 |
| 8 | −1.551E−02 | 3.000E−03 | −1.570E−04 | −3.234E−05 | 1.091E−05 |
| 9 | −2.555E−02 | 1.249E−02 | −2.912E−03 | 3.386E−04 | −1.551E−05 |
| 10 | −2.779E−02 | 2.004E−02 | −5.810E−03 | 8.276E−04 | −4.886E−05 |
| 11 | 1.811E−02 | −2.177E−03 | −4.205E−05 | 3.726E−05 | −2.846E−06 |
| 12 | 4.839E−03 | −9.714E−05 | −9.569E−05 | 9.806E−06 | −2.468E−08 |
| 13 | 2.503E−03 | −5.899E−04 | 8.340E−05 | −6.885E−06 | 2.593E−07 |
| 14 | −2.412E−03 | 4.778E−04 | −5.640E−05 | 3.581E−06 | −9.419E−08 |
| 15 | 3.008E−04 | −2.643E−05 | 1.033E−06 | 2.609E−08 | −2.735E−09 |
| 16 | −1.550E−04 | 1.193E−05 | −5.758E−07 | 1.547E−08 | −1.742E−10 |
| 17 | −9.770E−05 | 8.134E−06 | −4.221E−07 | 1.178E−08 | −1.315E−10 |

The values of the respective conditional expressions are as follows:

$R1f/R1r=1.19$ $f1/f2=-7.47$ $f3/f=-3.21$ $f1/f3=1.74$ $R4f/f=-1.92$ $|f5|/f=16.29$ $L47/f=0.35$ $R7r/R8f=0.57$ $T7/T8=1.25$ $D78/D34=0.84$ $f8/f=-0.81$ $R8r/f=0.29$ $TL/f=1.25$ $TL/H\max=1.77$ $f4/f=5.19$ $f45/f=7.68$ $f7/f8=-1.73$ $f/\text{Dep}=1.63$ Accordingly, the imaging lens according to the Example 7 satisfies the above-described conditional expressions.

Figure 20:
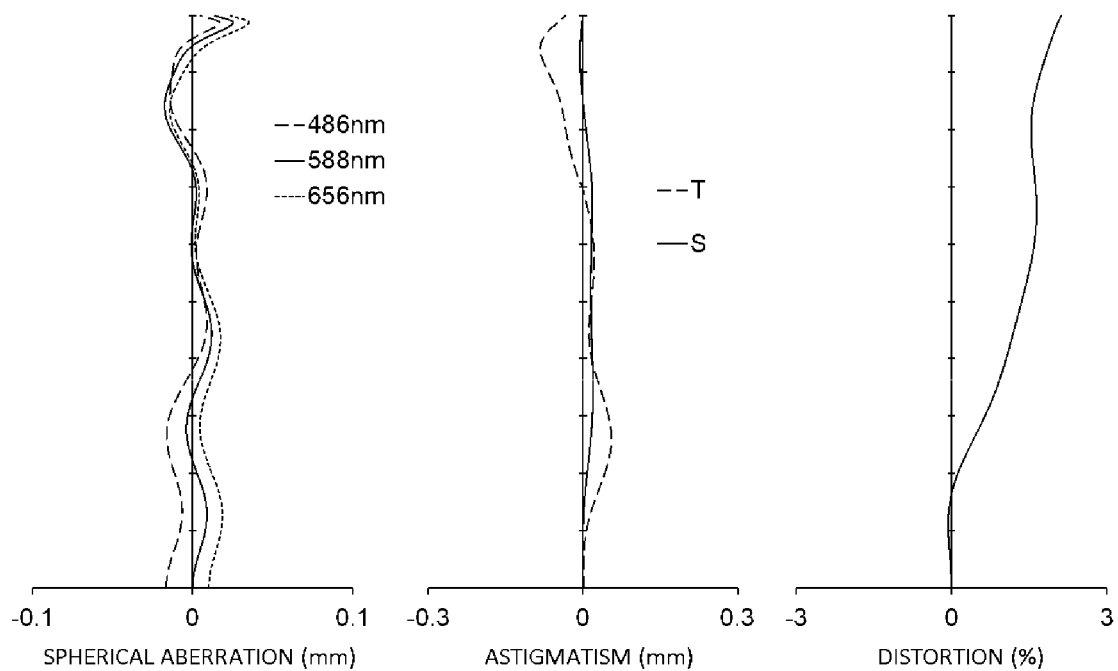
FIG. 20 is an aberration diagram showing spherical aberration, astigmatism, and distortion of the imaging lens of FIG. 19.
Figure 21:
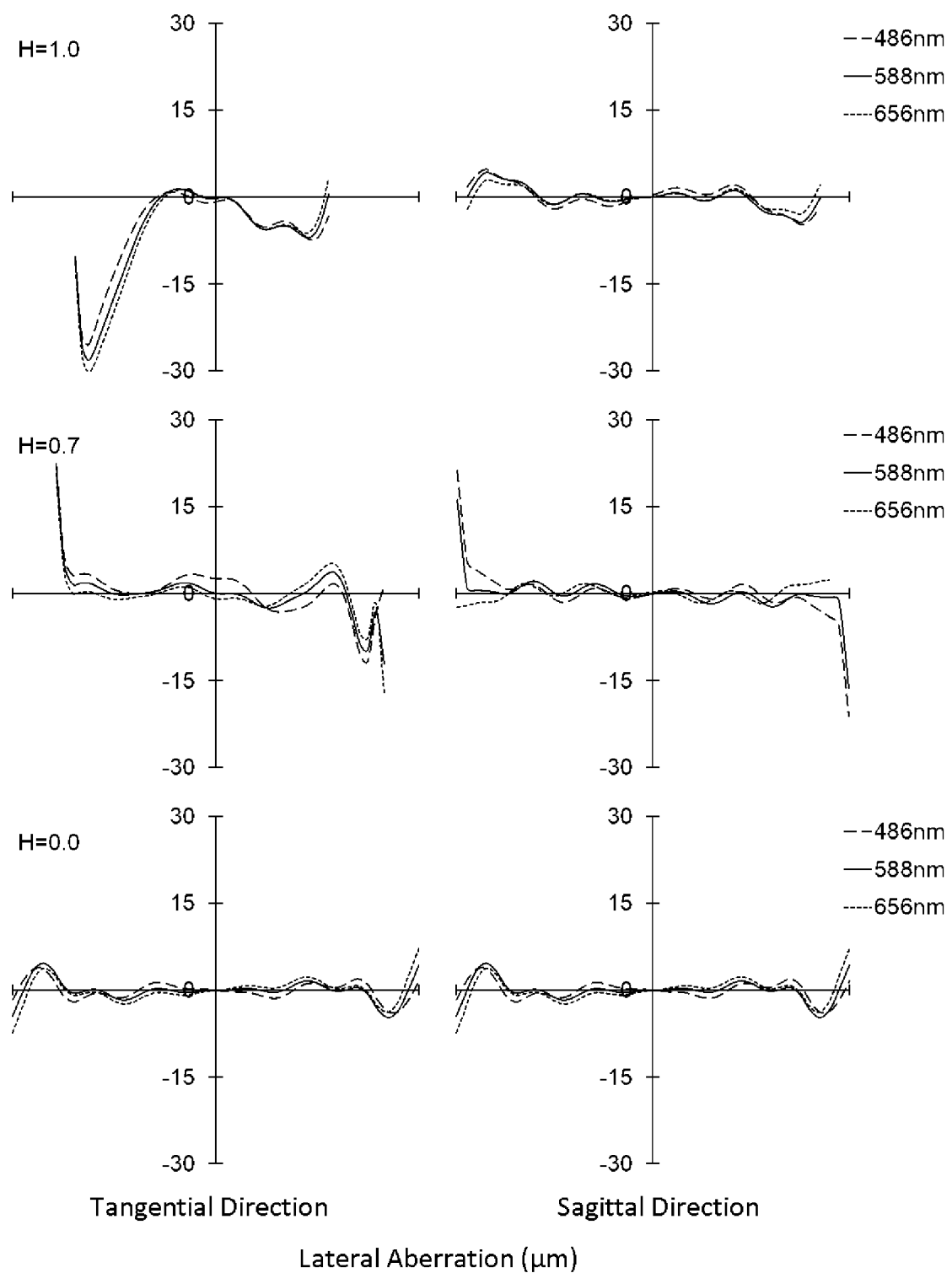
FIG. 21 is an aberration diagram showing a lateral aberration of the imaging lens of FIG. 19.
Figure 22:
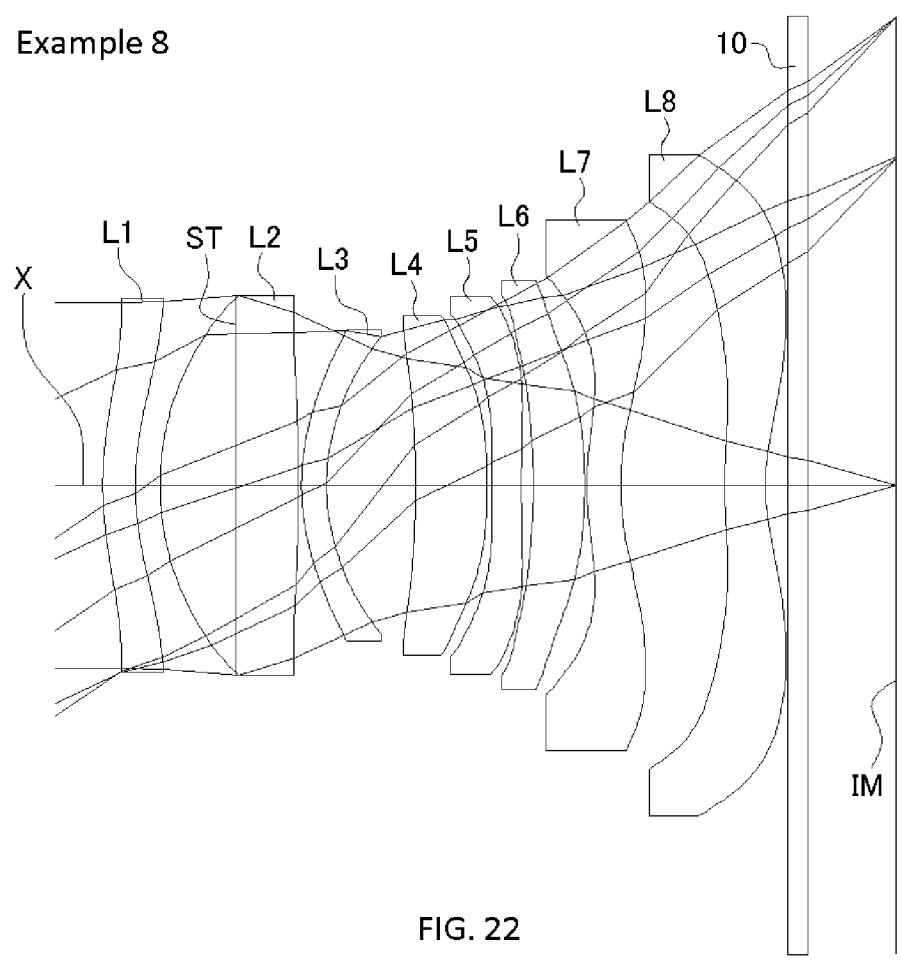
FIG. 22 is a sectional view of a schematic configuration of an imaging lens in Example 8 of the present invention.

FIG. 20 shows spherical aberration (mm), astigmatism (mm), and distortion (%), respectively. FIG. 21 shows a lateral aberration corresponding to the image height ratio H. As shown in FIGS. 20 and 21, according to the imaging lens of the Example 7, aberrations can be properly corrected.

Example 8

The basic lens data is shown below in Table 15.

TABLE 15

| | | f = 6.76 mm Fno = 1.8 ω = 34.2° | | | | |
|---|---|---|---|---|---|---|
| | i | r | d | n d | ν d | [mm] |
| | | ∞ | ∞ | | | |
| L1 | 1* | 3.704 | 0.327 | 1.6707 | 19.2 | f1 = −28.911 |
| | 2* | 3.000 | 1.012 | | | |
| | 3 (ST) | ∞ | −0.763 | | | |
| L2 | 4* | 2.802 | 1.388 | 1.5348 | 55.7 | f2 = 4.580 |
| | 5* | −16.093 | 0.030 | | | |
| L3 | 6* | 2.391 | 0.250 | 1.6707 | 19.2 | f3 = −30.521 |
| | 7* | 2.051 | 0.893 | | | |
| L4 | 8* | −13.582 | 0.719 | 1.5348 | 55.7 | f4 = 20.420 |
| | 9* | −6.165 | 0.049 | | | |
| L5 | 10* | −112.069 | 0.295 | 1.6707 | 19.2 | f5 = −123.715 |
| | 11* | 320.039 | 0.124 | | | |
| L6 | 12* | −4.265 | 0.512 | 1.6707 | 19.2 | f6 = −67.202 |
| | 13* | −4.938 | 0.023 | | | |
| L7 | 14* | 3.074 | 0.339 | 1.5445 | 56.4 | f7 = −100.258 |
| | 15* | 2.797 | 1.041 | | | |
| L8 | 16* | 4.639 | 0.411 | 1.5348 | 55.7 | f8 = −7.507 |
| | 17* | 2.086 | 0.219 | | | |
| | 18 | ∞ | 0.210 | 1.5168 | 64.2 | |
| | 19 | ∞ | 0.880 | | | |
| (IM) | | ∞ | | | | | f45=24.524 mm
f56=−44.135 mm
R1f=3.704 mm
R1r=3.000 mm
R4f=−13.582 mm
R7r=2.797 mm
R8f=4.639 mm
R8r=2.086 mm
D34=0.893 mm
D78=1.041 mm
T7=0.339 mm
T8=0.411 mm
L47=2.061 mm
TL=7.888 mm
Hmax=4.6 mm
Dep=3.802 mm

TABLE 16

| | Aspheric Surface Data | | | | |
|---|---|---|---|---|---|
| i | k | A4 | A6 | A8 | A10 |
| 1 | 0.000E+00 | −1.935E−02 | −1.161E−02 | 6.098E−03 | −1.534E−03 |
| 2 | 0.000E+00 | −1.200E−02 | −2.777E−02 | 1.616E−02 | −5.267E−03 |
| 4 | −7.922E+00 | 6.140E−02 | −3.426E−02 | 1.918E−02 | −9.076E−03 |
| 5 | 0.000E+00 | 1.304E−02 | −1.786E−02 | 1.678E−02 | −9.796E−03 |
| 6 | −1.718E+01 | 1.324E−01 | −1.686E−01 | 1.736E−01 | −1.313E−01 |
| 7 | −1.235E+00 | −1.430E−02 | 2.310E−02 | −3.736E−02 | 4.593E−02 |
| 8 | 7.327E+01 | −1.964E−02 | 3.829E−02 | −6.452E−02 | 5.977E−02 |
| 9 | 0.000E+00 | −6.555E−02 | 3.961E−03 | −1.107E−02 | 3.708E−02 |
| 10 | 0.000E+00 | −1.674E−02 | −1.284E−02 | 1.118E−01 | −1.798E−02 |
| 11 | 0.000E+00 | 1.088E−01 | −2.136E−01 | 1.650E−01 | −7.447E−02 |
| 12 | 0.000E+00 | 1.354E−01 | −1.547E−01 | 8.402E−02 | −2.493E−02 |
| 13 | 0.000E+00 | −3.956E−03 | −2.739E−02 | 2.014E−02 | −7.412E−03 |
| 14 | −2.873E−01 | −9.214E−02 | 8.532E−03 | −6.382E−03 | 5.805E−03 |
| 15 | 0.000E+00 | −3.393E−02 | −1.316E−02 | 8.075E−03 | −2.195E−03 |
| 16 | −2.789E−01 | −1.180E−01 | 4.822E−02 | −1.201E−02 | 1.781E−03 |
| 17 | −7.323E+00 | −6.029E−02 | 2.237E−02 | −5.573E−03 | 9.255E−04 |

| i | A12 | A14 | A16 | A18 | A20 |
|---|---|---|---|---|---|
| 1 | 1.283E−04 | 4.546E−05 | −1.579E−05 | 1.938E−06 | −8.987E−08 |
| 2 | 1.061E−03 | −1.046E−04 | −3.269E−06 | 1.762E−06 | −1.190E−07 |
| 4 | 3.616E−03 | −1.054E−03 | 2.004E−04 | −2.165E−05 | 1.008E−06 |
| 5 | 3.801E−03 | −9.281E−04 | 1.247E−04 | −4.669E−06 | −5.016E−07 |
| 6 | 6.940E−02 | −2.369E−02 | 4.646E−03 | −4.140E−04 | 4.901E−06 |
| 7 | −3.395E−02 | 1.680E−02 | −5.529E−03 | 1.086E−03 | −9.908E−05 |
| 8 | −2.781E−02 | 4.601E−03 | 1.498E−03 | −7.825E−04 | 9.748E−05 |
| 9 | −3.049E−02 | 1.178E−02 | −2.358E−03 | 2.769E−04 | −2.411E−05 |
| 10 | −2.732E−02 | 1.966E−02 | −5.857E−03 | 8.819E−04 | −5.924E−05 |
| 11 | 1.907E−02 | −2.076E−03 | −1.147E−04 | 4.393E−05 | −2.477E−06 |
| 12 | 4.512E−03 | −4.142E−04 | −5.263E−05 | 2.236E−05 | −2.219E−06 |
| 13 | 2.453E−03 | −6.260E−04 | 8.152E−05 | −2.900E−06 | −1.612E−07 |
| 14 | −2.316E−03 | 4.777E−04 | −5.533E−05 | 4.314E−06 | −2.402E−07 |
| 15 | 3.315E−04 | −2.788E−05 | 8.291E−07 | 6.251E−08 | −5.334E−09 |
| 16 | −1.604E−04 | 1.031E−05 | −6.288E−07 | 1.139E−08 | 1.367E−09 |
| 17 | −1.070E−04 | 8.445E−06 | −4.033E−07 | 7.567E−09 | 7.689E−11 |

The values of the respective conditional expressions are as follows:

$R1f/R1r=1.23$ $f1/f2=-6.31$ $f3/f=-4.51$ $f1/f3=0.95$ $R4f/f=-2.01$ $|f5|/f=18.30$ $L47/f=0.30$ $R7r/R8f=0.60$ $T7/T8=0.83$ $D78/D34=1.17$ $f8/f=-1.11$ $R8r/f=0.31$ $TL/f=1.17$ $TL/H\max=1.71$ $f4/f=3.02$ $f45/f=3.63$ $f7/f8=13.35$ $f/\text{Dep}=1.78$ Accordingly, the imaging lens according to the Example 8 satisfies the above-described conditional expressions.

Figure 23:
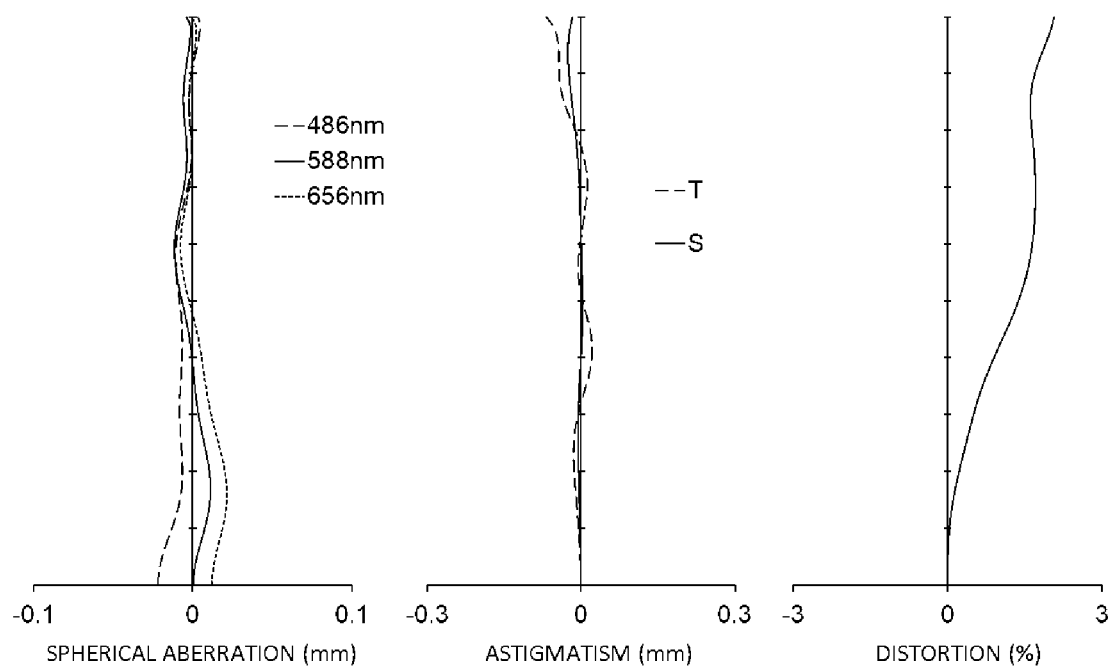
FIG. 23 is an aberration diagram showing spherical aberration, astigmatism, and distortion of the imaging lens of FIG. 22.
Figure 24:
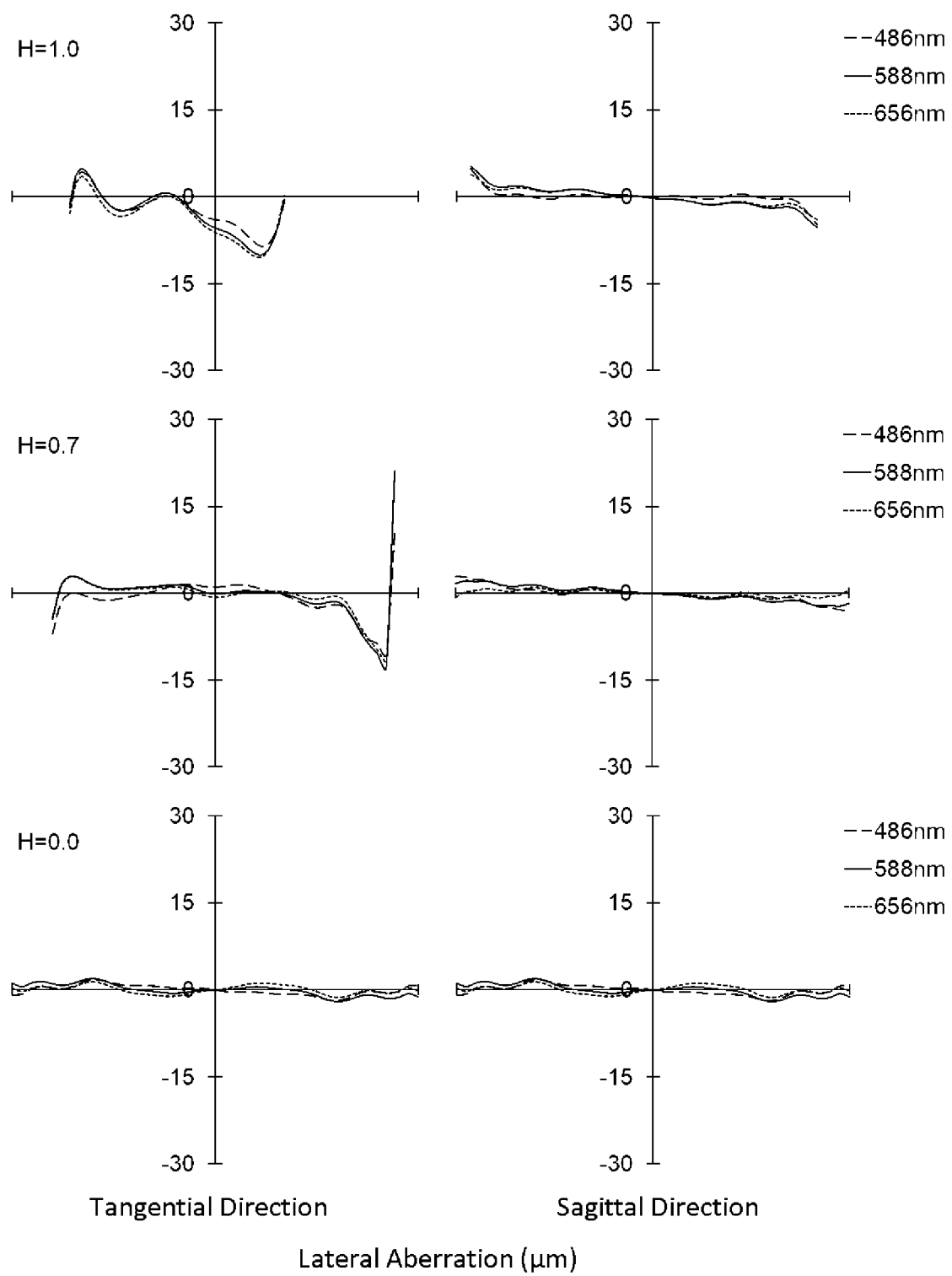
FIG. 24 is an aberration diagram showing a lateral aberration of the imaging lens of FIG. 22.
Figure 25:
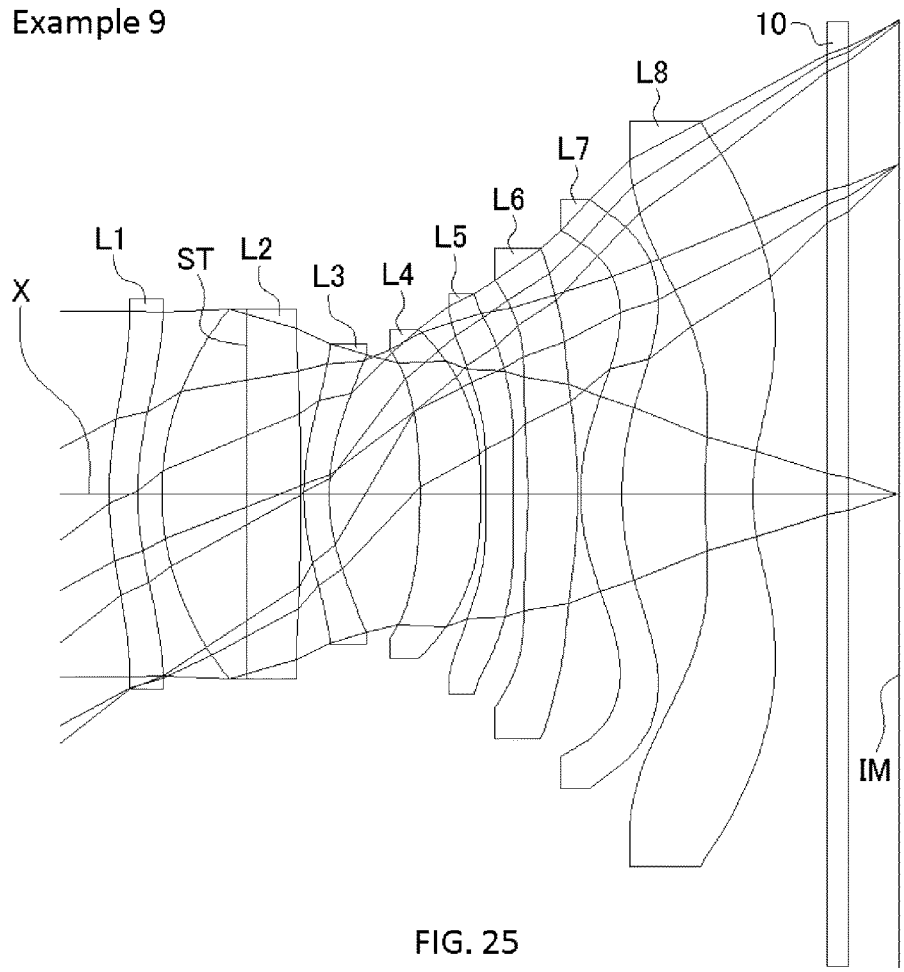
FIG. 25 is a sectional view of a schematic configuration of an imaging lens in Example 9 of the present invention.

FIG. 23 shows spherical aberration (mm), astigmatism (mm), and distortion (%), respectively. FIG. 24 shows a lateral aberration corresponding to the image height ratio H. As shown in FIGS. 23 and 24, according to the imaging lens of the Example 8, aberrations can be properly corrected.

Example 9

The basic lens data is shown below in Table 17.

TABLE 17

| | | | f = 5.89 mm Fno = 1.6 ω = 38.0° | | | |
|---|---|---|---|---|---|---|
| | i | r | d | n d | ν d | [mm] |
| | | ∞ | ∞ | | | |
| L1 | 1* | 3.740 | 0.282 | 1.670 | 19.2 | f1 = |
| | 2* | 3.105 | 1.083 | | | −33.171 |
| | 3 (ST) | ∞ | −0.843 | | | |
| L2 | 4* | 2.864 | 1.381 | 1.5348 | 55.7 | f2 = |
| | 5* | −17.161 | 0.030 | | | 4.702 |
| L3 | 6* | 2.495 | 0.250 | 1.6707 | 19.2 | f3 = |
| | 7* | 1.969 | 0.903 | | | −17.206 |
| L4 | 8* | −7.408 | 0.600 | 1.5348 | 55.7 | f4 = |
| | 9* | −9.221 | 0.050 | | | −79.667 |
| L5 | 10* | 76.282 | 0.276 | 1.670 | 19.2 | f5 = |
| | 11* | −2547.405 | 0.146 | | | 110.425 |
| L6 | 12* | −4.872 | 0.498 | 1.6707 | 19.2 | f6 = |
| | 13* | −4.721 | 0.027 | | | 97.777 |

TABLE 17-continued

| | | | f = 5.89 mm Fno = 1.6 ω = 38.0° | | | |
|---|---|---|---|---|---|---|
| | i | r | d | n d | ν d | [mm] |
| | | ∞ | ∞ | | | |
| L7 | 14* | 2.028 | 0.410 | 1.5445 | 56.4 | f7 = |
| | 15* | 3.272 | 0.822 | | | 8.784 |
| L8 | 16* | 4.952 | 0.475 | 1.5348 | 55.7 | f8 = |
| | 17* | 1.933 | 0.745 | | | −6.272 |
| | 18 | ∞ | 0.210 | 1.5168 | 64.2 | |
| | 19 | ∞ | 0.485 | | | |
| (IM) | | ∞ | | | | |

$f45 = -309.145$ mm
$f56 = 52.991$ mm
$R1f = 3.740$ mm
$R1r = 3.105$ mm
$R4f = -7.408$ mm
$R7r = 3.272$ mm
$R8f = 4.952$ mm
$R8r = 1.933$ mm
$D34 = 0.903$ mm
$D78 = 0.822$ mm
$T7 = 0.410$ mm
$T8 = 0.475$ mm
$L47 = 2.007$ mm
$TL = 7.759$ mm
$Hmax = 4.6$ mm
$Dep = 3.671$ mm

TABLE 18

| Aspheric Surface Data | | | | | |
|---|---|---|---|---|---|
| i | k | A4 | A6 | A8 | A10 |
| 1 | 0.000E+00 | −1.637E−02 | −1.176E−02 | 6.081E−03 | −1.529E−03 |
| 2 | 0.000E+00 | −1.185E−02 | −2.798E−02 | 1.612E−02 | −5.241E−03 |
| 4 | −3.468E+00 | 3.744E−02 | −2.862E−02 | 2.085E−02 | −1.152E−02 |
| 5 | 0.000E+00 | 3.131E−02 | −3.830E−02 | 2.661E−02 | −1.272E−02 |
| 6 | −2.018E+01 | 1.286E−01 | −1.928E−01 | 1.813E−01 | −1.321E−01 |
| 7 | −6.681E−01 | −4.748E−02 | 3.469E−02 | −6.618E−02 | 6.796E−02 |
| 8 | 9.780E+00 | −5.341E−02 | 1.012E−01 | −1.642E−01 | 1.343E−01 |
| 9 | 0.000E+00 | −1.425E−01 | 4.356E−02 | −1.806E−02 | 3.283E−02 |
| 10 | 0.000E+00 | −1.143E−01 | −7.191E−02 | 1.165E−01 | −2.365E−02 |
| 11 | 0.000E+00 | 2.464E−02 | −1.641E−01 | 1.615E−01 | −7.818E−02 |
| 12 | 0.000E+00 | 1.436E−01 | −1.282E−01 | 7.576E−02 | −2.767E−02 |
| 13 | 0.000E+00 | 2.346E−02 | 5.260E−04 | 5.310E−03 | −6.394E−03 |
| 14 | −9.230E−01 | −4.839E−02 | 2.019E−02 | −1.783E−02 | 8.523E−03 |
| 15 | 0.000E+00 | 3.106E−02 | −3.504E−02 | 1.111E−02 | −2.306E−03 |
| 16 | 6.619E−01 | −1.127E−01 | 3.527E−02 | −8.247E−03 | 1.385E−03 |
| 17 | −5.534E+00 | −6.206E−02 | 2.041E−02 | −5.110E−03 | 8.925E−04 |

| i | A12 | A14 | A16 | A18 | A20 |
|---|---|---|---|---|---|
| 1 | 1.292E−04 | 4.543E−05 | −1.586E−05 | 1.945E−06 | −8.784E−08 |
| 2 | 1.061E−03 | −1.034E−04 | −3.509E−06 | 1.767E−06 | −1.179E−07 |
| 4 | 4.640E−03 | −1.243E−03 | 2.060E−04 | −1.841E−05 | 6.600E−07 |
| 5 | 4.232E−03 | −8.674E−04 | 7.012E−05 | 1.151E−05 | −2.412E−06 |
| 6 | 6.874E−02 | −2.331E−02 | 4.602E−03 | −3.976E−04 | −1.717E−06 |
| 7 | −4.154E−02 | 1.596E−02 | −3.836E−03 | 5.666E−04 | −4.349E−05 |
| 8 | −5.606E−02 | 7.192E−03 | 2.873E−03 | −1.170E−03 | 1.306E−04 |
| 9 | −2.818E−02 | 1.161E−02 | −2.637E−03 | 3.430E−04 | −2.105E−05 |
| 10 | −2.824E−02 | 2.036E−02 | −5.853E−03 | 8.178E−04 | −4.603E−05 |
| 11 | 1.984E−02 | −2.103E−03 | −1.394E−04 | 5.949E−05 | −4.585E−06 |
| 12 | 5.034E−03 | −1.973E−04 | −7.073E−05 | 1.065E−05 | −4.862E−07 |
| 13 | 2.684E−03 | −6.021E−04 | 7.974E−05 | −5.987E−06 | 1.973E−07 |
| 14 | −2.528E−03 | 4.808E−04 | −5.597E−05 | 3.513E−06 | −8.725E−08 |
| 15 | 3.178E−04 | −2.596E−05 | 8.447E−07 | 1.887E−08 | −1.261E−09 |
| 16 | −1.567E−04 | 1.171E−05 | −5.692E−07 | 1.687E−08 | −2.377E−10 |
| 17 | −1.050E−04 | 8.112E−06 | −3.926E−07 | 1.068E−08 | −1.225E−10 |

The values of the respective conditional expressions are as follows:

$R1f/R1r=1.20$ $f1/f2=-7.06$ $f3/f=-2.92$ $f1/f3=1.93$ $R4f/f=-1.26$ $|f5|/f=18.76$ $L47/f=0.34$ $R7r/R8f=0.66$ $T7/T8=0.86$ $D78/D34=0.91$ $f8/f=-1.07$ $R8r/f=0.33$ $TL/f=1.32$ $TL/H\mathrm{max}=1.69$ $f4/f=-13.53$ $f6/f=16.61$ $f56/f=9.00$ $f7/f8=-1.40$ $f/\mathrm{Dep}=1.60$ Accordingly, the imaging lens according to the Example 9 satisfies the above-described conditional expressions.

Figure 26:
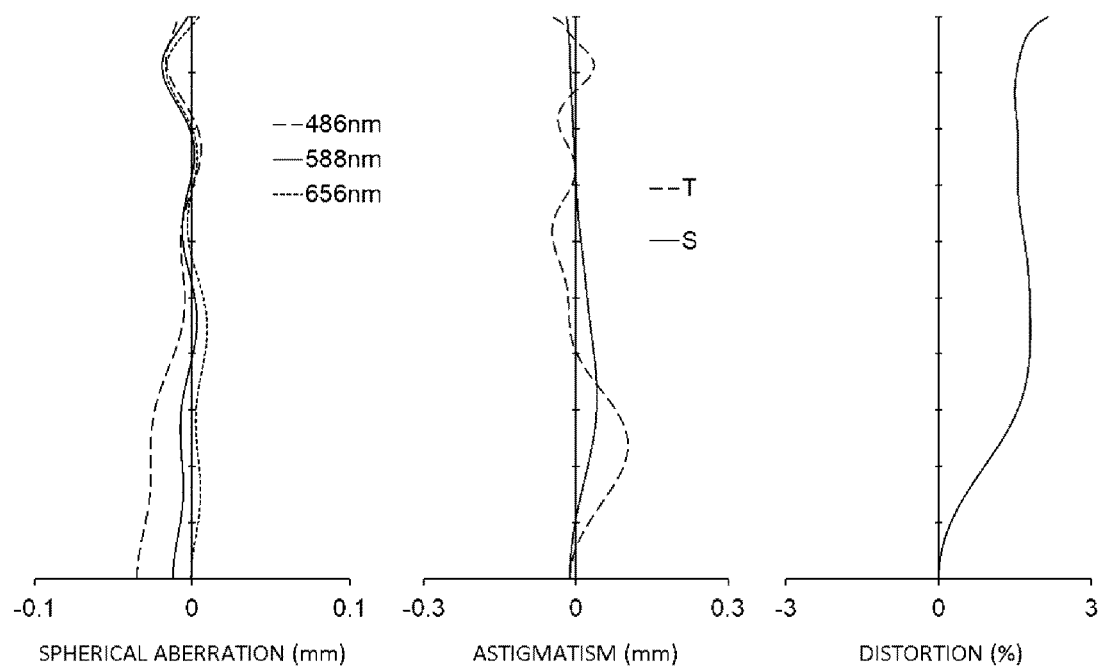
FIG. 26 is an aberration diagram showing spherical aberration, astigmatism, and distortion of the imaging lens of FIG. 25.
Figure 27:
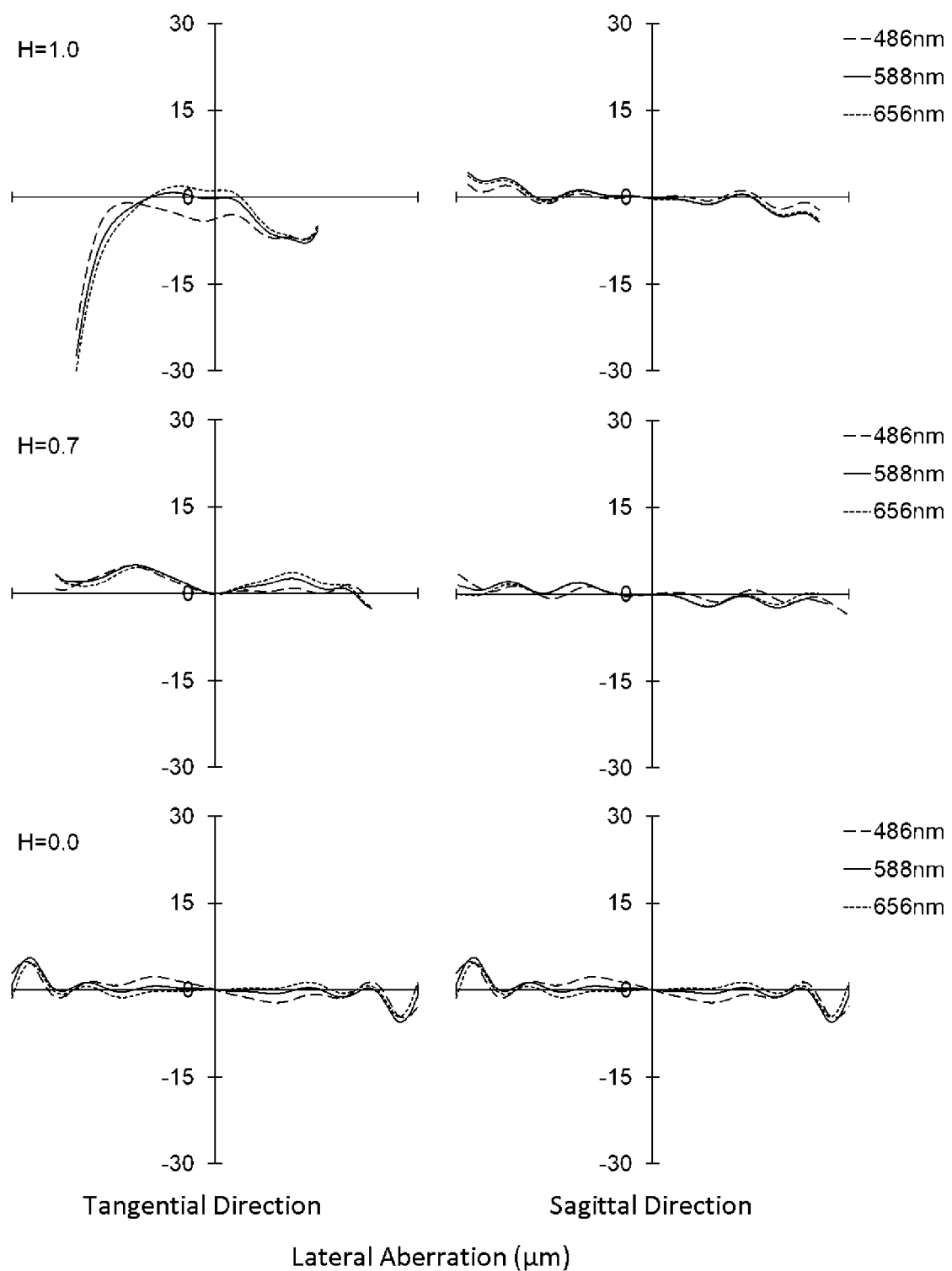
FIG. 27 is an aberration diagram showing a lateral aberration of the imaging lens of FIG. 25.
Figure 28:
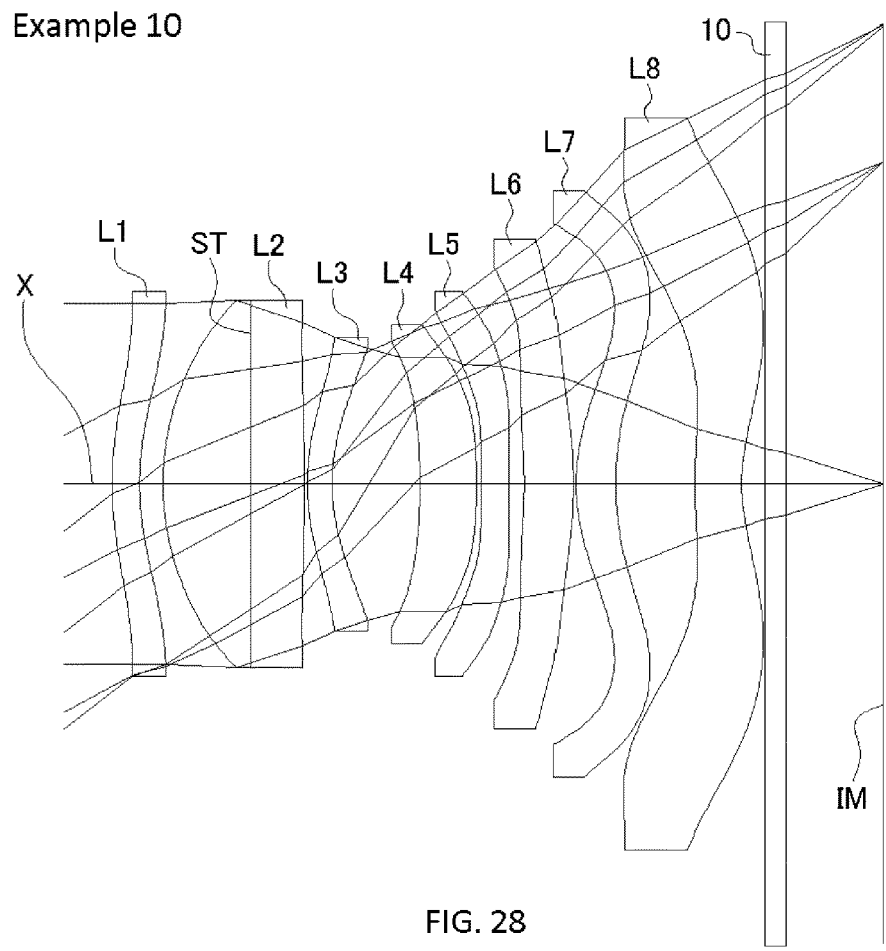
FIG. 28 is a sectional view of a schematic configuration of an imaging lens in Example 10 of the present invention.

FIG. 26 shows spherical aberration (mm), astigmatism (mm), and distortion (%), respectively. FIG. 27 shows a lateral aberration corresponding to the image height ratio H. As shown in FIGS. 26 and 27, according to the imaging lens of the Example 9, aberrations can be properly corrected.

Example 10

The basic lens data is shown below in Table 19.

TABLE 19 f = 6.96 mm Fno = 1.8 ω = 33.5°

|  | i | r | d | n d | v d | [mm] |
|---|---|---|---|---|---|---|
|  |  | ∞ | ∞ |  |  |  |
| L1 | 1* | 3.746 | 0.324 | 1.6707 | 19.2 | f1 = −28.902 |
|  | 2* | 3.030 | 1.029 |  |  |  |
|  | 3 (ST) | ∞ | −0.760 |  |  |  |
| L2 | 4* | 2.810 | 1.399 | 1.5348 | 55.7 | f2 = 4.513 |
|  | 5* | −14.143 | 0.030 |  |  |  |
| L3 | 6* | 2.373 | 0.250 | 1.6707 | 19.2 | f3 = −40.656 |
|  | 7* | 2.091 | 0.954 |  |  |  |
| L4 | 8* | −5.974 | 0.361 | 1.5348 | 55.7 | f4 = −99.978 |
|  | 9* | −6.866 | 0.042 |  |  |  |
| L5 | 10* | 148.893 | 0.272 | 1.6707 | 19.2 | f5 = 109.266 |
|  | 11* | −144.229 | 0.126 |  |  |  |
| L6 | 12* | −4.542 | 0.514 | 1.6707 | 19.2 | f6 = 98.493 |
|  | 13* | −4.443 | 0.091 |  |  |  |
| L7 | 14* | 3.172 | 0.352 | 1.5445 | 56.4 | f7 = −63.766 |
|  | 15* | 2.793 | 1.045 |  |  |  |

TABLE 19-continued f = 6.96 mm Fno = 1.8 ω = 33.5°

|  | i | r | d | n d | v d | [mm] |
|---|---|---|---|---|---|---|
| L8 | 16* | 4.341 | 0.393 | 1.5348 | 55.7 | f8 = −8.161 |
|  | 17* | 2.108 | 0.876 |  |  |  |
|  | 18 | ∞ | 0.210 | 1.5168 | 64.2 |  |
|  | 19 | ∞ | 0.405 |  |  |  |
| (IM) |  | ∞ |  |  |  |  | f45=−1547.795 mm
f56=53.021 mm
R1f=3.746 mm
R1r=3.030 mm
R4f=−5.974 mm
R7r=2.793 mm
R8f=4.341 mm
R8r=2.108 mm
D34=0.954 mm
D78=1.045 mm
T7=0.352 mm
T8=0.393 mm
L47=1.759 mm
TL=7.843 mm
Hmax=4.6 mm
Dep=3.797 mm

TABLE 20

Aspheric Surface Data

| i | k | A4 | A6 | A8 | A10 |
|---|---|---|---|---|---|
| 1 | 0.000E+00 | −1.967E−02 | −1.179E−02 | 6.054E−03 | −1.547E−03 |
| 2 | 0.000E+00 | −1.077E−02 | −2.822E−02 | 1.611E−02 | −5.263E−03 |
| 4 | −1.716E+00 | 2.759E−02 | −1.982E−02 | 1.442E−02 | −8.509E−03 |
| 5 | 0.000E+00 | −6.334E−03 | −4.042E−03 | 1.109E−02 | −8.306E−03 |
| 6 | −1.646E+01 | 1.174E−01 | −1.595E−01 | 1.601E−01 | −1.215E−01 |
| 7 | −6.055E−01 | −1.763E−02 | 8.971E−03 | −3.567E−02 | 5.062E−02 |
| 8 | 1.411E+01 | −1.126E−02 | 3.281E−02 | −5.422E−02 | 3.196E−02 |
| 9 | 0.000E+00 | −5.560E−02 | −3.403E−02 | 6.253E−03 | 3.597E−02 |
| 10 | 0.000E+00 | −1.943E−02 | −1.641E−01 | 1.509E−01 | −2.942E−02 |
| 11 | 0.000E+00 | 7.385E−02 | −2.035E−01 | 1.679E−01 | −7.829E−02 |
| 12 | 0.000E+00 | 1.164E−01 | −1.300E−01 | 6.267E−02 | −2.028E−02 |
| 13 | 0.000E+00 | 1.941E−02 | −2.239E−02 | 9.357E−03 | −3.956E−03 |
| 14 | −1.150E−01 | −8.556E−02 | −2.833E−03 | 2.029E−03 | 1.368E−03 |
| 15 | 0.000E+00 | −6.135E−02 | −3.313E−03 | 6.307E−03 | −2.160E−03 |
| 16 | 5.092E−01 | −1.326E−01 | 4.669E−02 | −1.099E−02 | 1.598E−03 |
| 17 | −7.880E+00 | −6.851E−02 | 2.301E−02 | −5.517E−03 | 8.983E−04 |

| i | A12 | A14 | A16 | A18 | A20 |
|---|---|---|---|---|---|
| 1 | 1.318E−04 | 4.469E−05 | −1.565E−05 | 1.969E−06 | −9.875E−08 |
| 2 | 1.061E−03 | −1.053E−04 | −3.162E−06 | 1.761E−06 | −1.200E−07 |
| 4 | 3.873E−03 | −1.120E−03 | 1.773E−04 | −1.070E−05 | −2.204E−07 |
| 5 | 3.682E−03 | −9.654E−04 | 1.421E−04 | −9.614E−06 | −6.624E−08 |
| 6 | 6.726E−02 | −2.409E−02 | 4.759E−03 | −3.564E−04 | −1.334E−05 |
| 7 | −3.649E−02 | 1.671E−02 | −4.695E−03 | 6.601E−04 | −3.822E−05 |
| 8 | −3.880E−03 | 2.355E−04 | −1.114E−03 | 4.388E−04 | −4.854E−05 |
| 9 | −2.771E−02 | 1.017E−02 | −2.206E−03 | 3.131E−04 | −3.413E−05 |
| 10 | −2.536E−02 | 1.918E−02 | −6.104E−03 | 1.057E−03 | −8.708E−05 |
| 11 | 2.058E−02 | −2.200E−03 | −1.022E−04 | 2.605E−05 | −8.107E−07 |
| 12 | 4.560E−02 | −2.810E−02 | −4.754E−03 | −3.392E−05 | 5.772E−06 |
| 13 | 2.203E−03 | −6.722E−04 | 8.538E−05 | −8.130E−07 | −4.760E−07 |
| 14 | −7.475E−04 | 2.193E−04 | −6.245E−05 | 1.192E−05 | −9.623E−07 |
| 15 | 3.821E−04 | −3.495E−05 | 4.394E−07 | 2.008E−07 | −1.329E−08 |
| 16 | −1.558E−04 | 1.200E−05 | −7.062E−07 | 1.201E−08 | 9.180E−10 |
| 17 | −1.034E−04 | 8.129E−06 | −3.922E−07 | 8.671E−09 | 2.399E−12 |

The values of the respective conditional expressions are as follows:

$R1f/R1r=1.24$ $f1/f2=-6.40$ $f3/f=-5.84$ $f1/f3=0.71$ $R4f/f=-0.86$ $|f5|/f=15.69$ $L47/f=0.25$ $R7r/R8f=0.64$ $T7/T8=0.90$ $D78/D34=1.09$ $f8/f=-1.17$ $R8r/f=0.30$ $TL/f=1.13$ $TL/Hmax=1.70$ $f4/f=-14.36$ $f6/f=14.15$ $f56/f=7.61$ $f7/f8=7.81$ $f/Dep=1.83$ Accordingly, the imaging lens according to the Example 10 satisfies the above-described conditional expressions.

Figure 29:
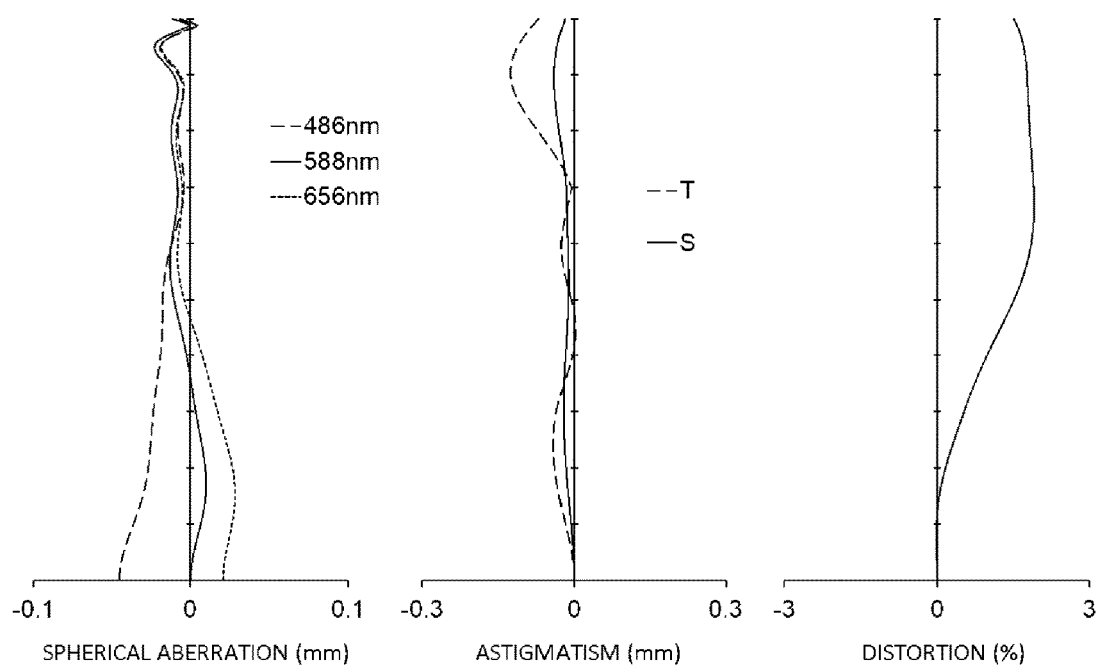
FIG. 29 is an aberration diagram showing spherical aberration, astigmatism, and distortion of the imaging lens of FIG. 28.
Figure 30:
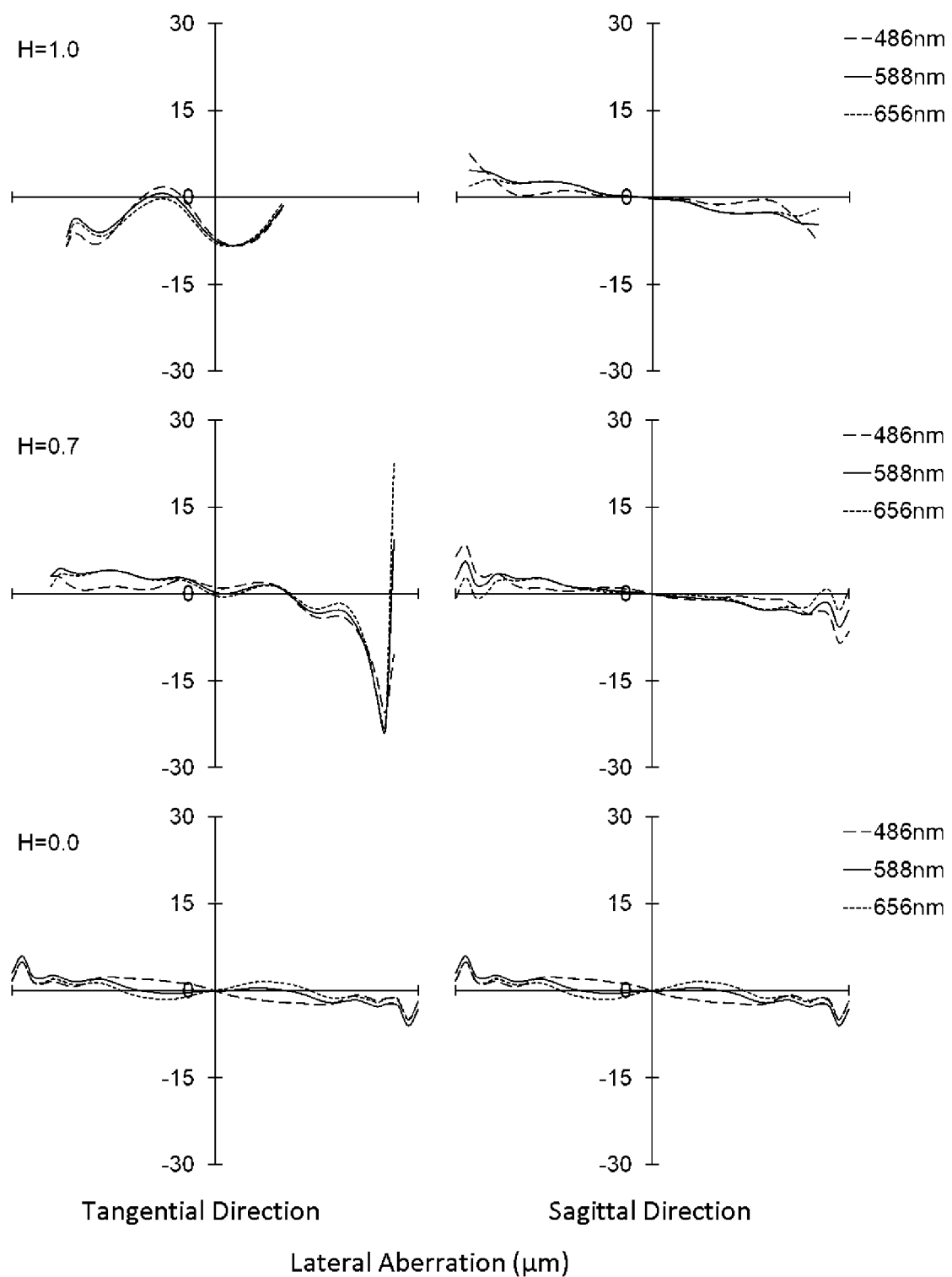
FIG. 30 is an aberration diagram showing a lateral aberration of the imaging lens of FIG. 28.
Figure 31:
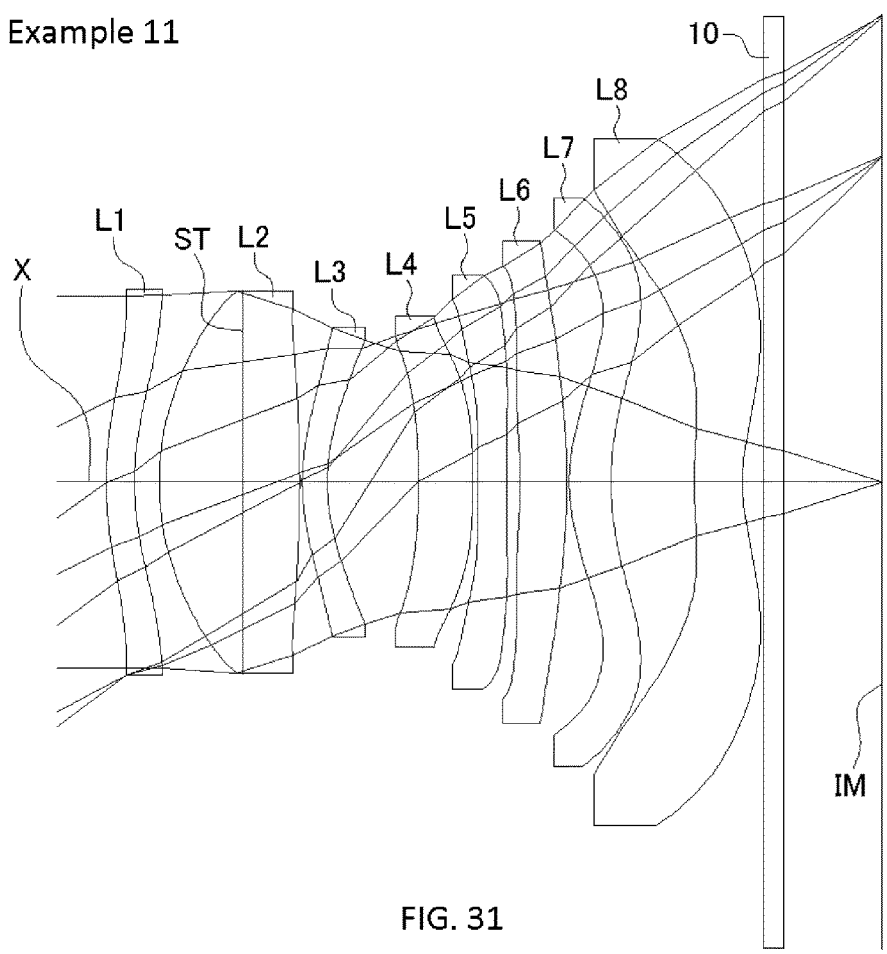
FIG. 31 is a sectional view of a schematic configuration of an imaging lens in Example 11 of the present invention.

FIG. 29 shows spherical aberration (mm), astigmatism (mm), and distortion (%), respectively. FIG. 30 shows a lateral aberration corresponding to the image height ratio H. As shown in FIGS. 29 and 30, according to the imaging lens of the Example 10, aberrations can be properly corrected.

Example 11

The basic lens data is shown below in Table 21.

TABLE 21

| | | r | d | | | |
|---|---|---|---|---|---|---|
| | i | ∞ | ∞ | nd | vd | [mm] |
| L1 | 1* | 3.670 | 0.286 | 1.6707 | 19.2 | f1 = |
| | 2* | 3.053 | 1.091 | | | −33.254 |
| | 3 (ST) | ∞ | −0.842 | | | |
| L2 | 4* | 2.842 | 1.415 | 1.5348 | 55.7 | f2 = |
| | 5* | −16.587 | 0.030 | | | 4.656 |
| L3 | 6* | 2.451 | 0.250 | 1.6707 | 19.2 | f3 = |
| | 7* | 2.033 | 0.921 | | | −23.382 |
| L4 | 8* | −7.643 | 0.546 | 1.5348 | 55.7 | f4 = |
| | 9* | −9.140 | 0.049 | | | −99.963 |
| L5 | 10* | 86.547 | 0.290 | 1.6707 | 19.2 | f5 = |
| | 11* | −700.104 | 0.139 | | | 114.852 |
| L6 | 12* | −4.438 | 0.475 | 1.6707 | 19.2 | f6 = |
| | 13* | −6.782 | 0.020 | | | −20.838 |
| L7 | 14* | 1.991 | 0.422 | 1.5445 | 56.4 | f7 = |
| | 15* | 3.319 | 0.840 | | | 8.216 |
| L8 | 16* | 4.763 | 0.484 | 1.5348 | 55.7 | f8 = |
| | 17* | 1.997 | 0.210 | | | −6.844 |
| | 18 | ∞ | 0.210 | 1.5168 | 64.2 | |
| | 19 | ∞ | 0.975 | | | |
| (IM) | | ∞ | | | | | f45=−931.064 mm
f56=−25.377 mm
R1f=3.670 mm
R1r=3.053 mm
R4f=−7.643 mm
R7r=3.319 mm
R8f=4.763 mm
R8r=1.997 mm
D34=0.921 mm
D78=0.840 mm
T7=0.422 mm
T8=0.484 mm
L47=1.942 mm
TL=7.741 mm
Hmax=4.6 mm
Dep=3.864 mm

TABLE 22

Aspheric Surface Data

| i | k | A4 | A6 | A8 | A10 |
|---|---|---|---|---|---|
| 1 | 0.000E+00 | −1.813E−02 | −1.153E−02 | 6.115E−03 | −1.540E−03 |
| 2 | 0.000E+00 | −1.126E−02 | −2.793E−02 | 1.615E−02 | −5.246E−03 |
| 4 | −3.911E+00 | 3.846E−02 | −2.390E−02 | 1.531E−02 | −8.238E−03 |
| 5 | 0.000E+00 | 7.891E−03 | −1.516E−02 | 1.371E−02 | −8.466E−03 |
| 6 | −1.876E+01 | 1.147E−01 | −1.830E−01 | 1.841E−01 | −1.362E−01 |
| 7 | −1.167E+00 | −3.295E−02 | 1.298E−02 | −3.765E−02 | 5.167E−02 |
| 8 | 1.332E+01 | −2.924E−02 | 4.851E−02 | −7.481E−02 | 5.487E−02 |
| 9 | 0.000E+00 | −5.999E−02 | −1.375E−02 | 3.337E−03 | 2.949E−02 |
| 10 | 0.000E+00 | −4.505E−01 | −1.455E−01 | 1.352E−01 | −2.662E−02 |
| 11 | 0.000E+00 | 9.575E−02 | −1.903E−01 | 1.607E−01 | −7.510E−02 |
| 12 | 0.000E+00 | 1.580E−01 | −1.245E−01 | 6.842E−02 | −2.526E−02 |
| 13 | 0.000E+00 | 7.238E−03 | −5.061E−04 | 6.509E−03 | −6.225E−03 |
| 14 | −3.789E+00 | −1.877E−02 | 1.123E−02 | −1.530E−02 | 8.174E−03 |
| 15 | 0.000E+00 | 2.020E−02 | −3.259E−02 | 1.111E−02 | −2.378E−03 |
| 16 | −2.320E+00 | −1.274E−01 | 3.966E−02 | −8.829E−03 | 1.422E−03 |
| 17 | −6.129E+00 | −6.912E−02 | 2.208E−02 | −5.355E−03 | 9.134E−04 |

| i | A12 | A14 | A16 | A18 | A20 |
|---|---|---|---|---|---|
| 1 | 1.287E−04 | 4.539E−05 | −1.586E−05 | 1.952E−06 | −8.896E−08 |
| 2 | 1.059E−03 | −1.039E−04 | −3.385E−06 | 1.759E−06 | −1.175E−07 |
| 4 | 3.558E−03 | −1.076E−03 | 2.064E−04 | −2.188E−05 | 9.633E−07 |
| 5 | 3.640E−03 | −9.782E−04 | 1.466E−04 | −6.966E−06 | −5.685E−07 |
| 6 | 6.985E−02 | −2.310E−02 | 4.574E−03 | −4.573E−04 | 1.224E−05 |
| 7 | −3.894E−02 | 1.727E−02 | −4.283E−03 | 5.479E−04 | −3.057E−05 |
| 8 | −1.967E−02 | 2.139E−03 | 5.304E−04 | −4.543E−05 | −2.157E−05 |
| 9 | −2.866E−02 | 1.205E−02 | −2.603E−03 | 2.864E−04 | −1.299E−05 |
| 10 | −2.626E−02 | 1.980E−02 | −5.936E−03 | 8.647E−04 | −5.047E−05 |
| 11 | 1.925E−02 | −2.077E−03 | −1.280E−04 | 5.172E−05 | −3.526E−06 |
| 12 | 5.117E−03 | −2.933E−04 | −7.125E−05 | 1.251E−05 | −5.637E−07 |
| 13 | 2.554E−03 | −5.854E−04 | 8.075E−05 | −6.404E−06 | 2.249E−07 |
| 14 | −2.527E−03 | 4.826E−04 | −5.502E−05 | 3.315E−06 | −7.653E−08 |
| 15 | 3.236E−04 | −2.554E−05 | 8.326E−07 | 1.704E−08 | −1.428E−09 |
| 16 | −1.580E−04 | 1.165E−05 | −5.533E−07 | 1.797E−08 | −4.204E−10 |
| 17 | −1.061E−04 | 8.233E−06 | −4.108E−07 | 1.185E−08 | −1.463E−10 |

The values of the respective conditional expressions are as follows:

$R1f/R1r=1.20$ $f1/f2=-7.14$ $f3/f=-3.78$ $f1/f3=1.42$ $R4f/f=-1.24$ $|f5|/f=18.58$ $L47/f=0.31$ $R7r/R8f=0.70$ $T7/T8=0.87$ $D78/D34=0.91$ $f8/f=-1.11$ $R8r/f=0.32$ $TL/f=1.25$ $TL/H\mathrm{max}=1.68$ $f4/f=-16.17$ $f7/f8=-1.20$ $f/\mathrm{Dep}=1.60$ Accordingly, the imaging lens according to the Example 11 satisfies the above-described conditional expressions.

Figure 32:
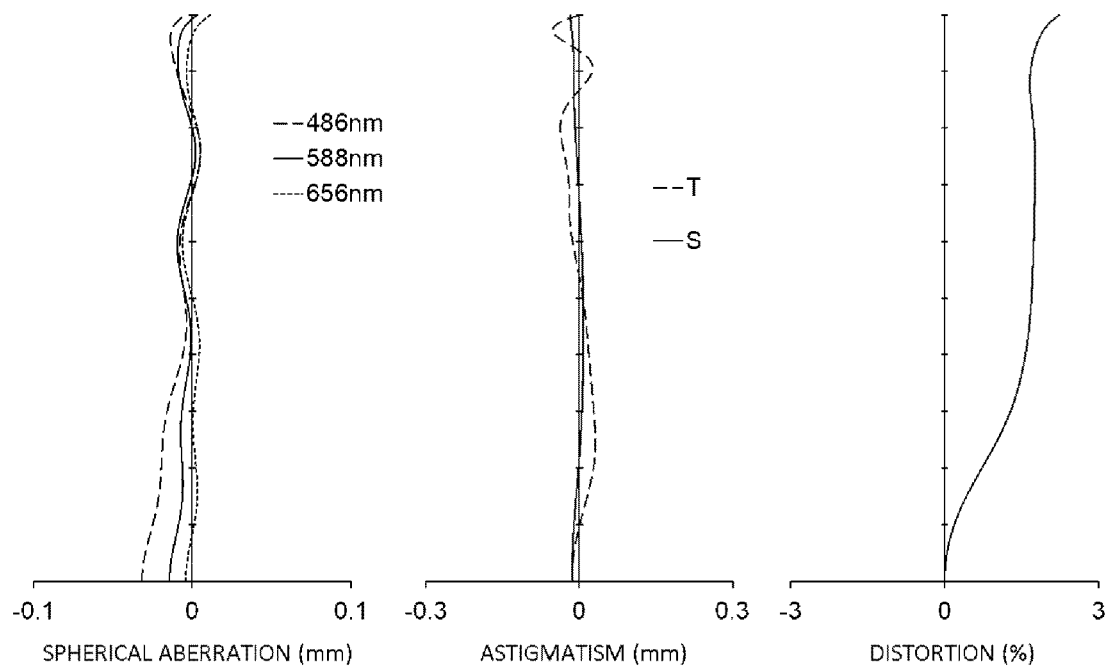
FIG. 32 is an aberration diagram showing spherical aberration, astigmatism, and distortion of the imaging lens of FIG. 31.
Figure 33:
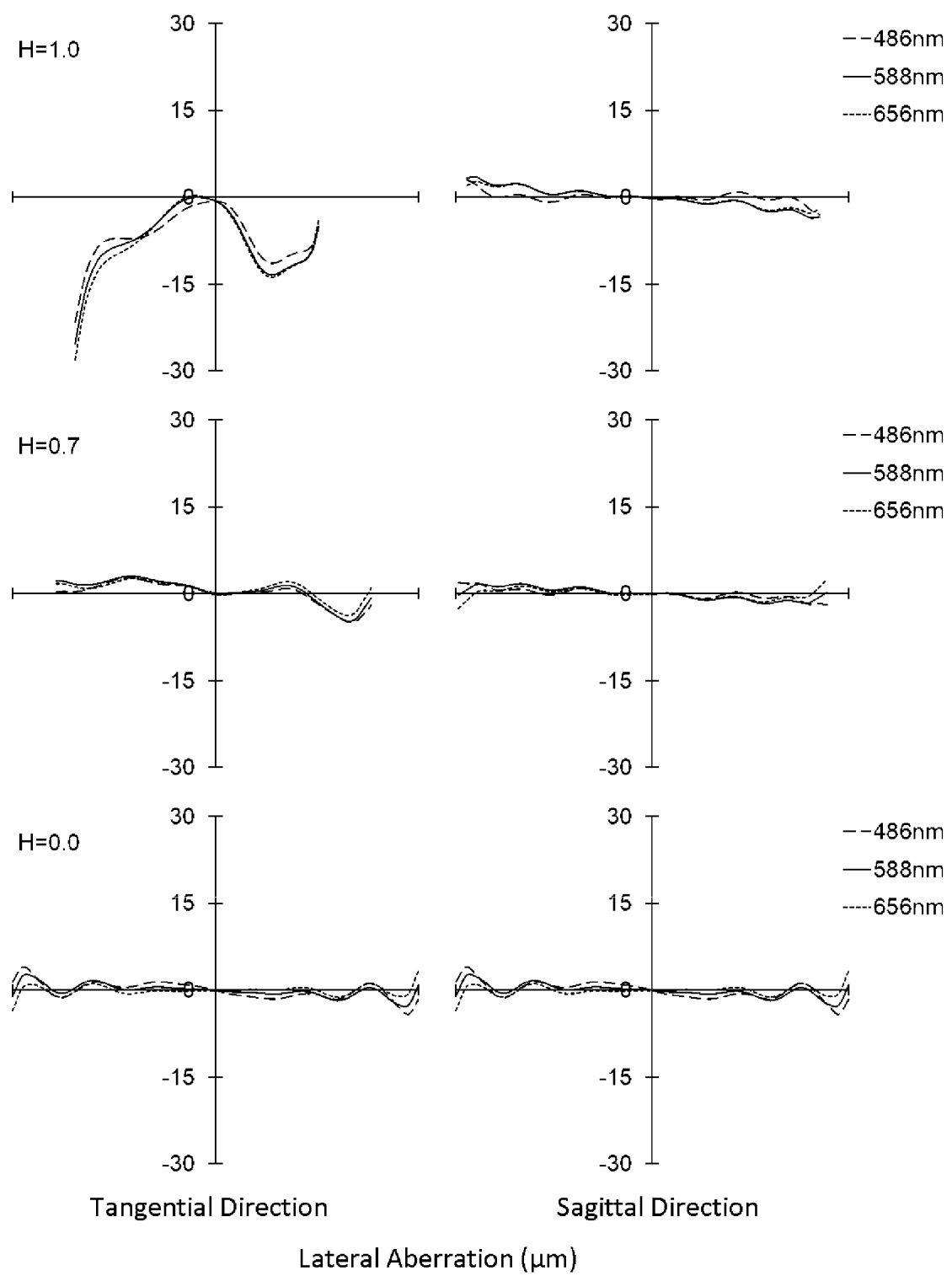
FIG. 33 is an aberration diagram showing a lateral aberration of the imaging lens of FIG. 31.
Figure 34:
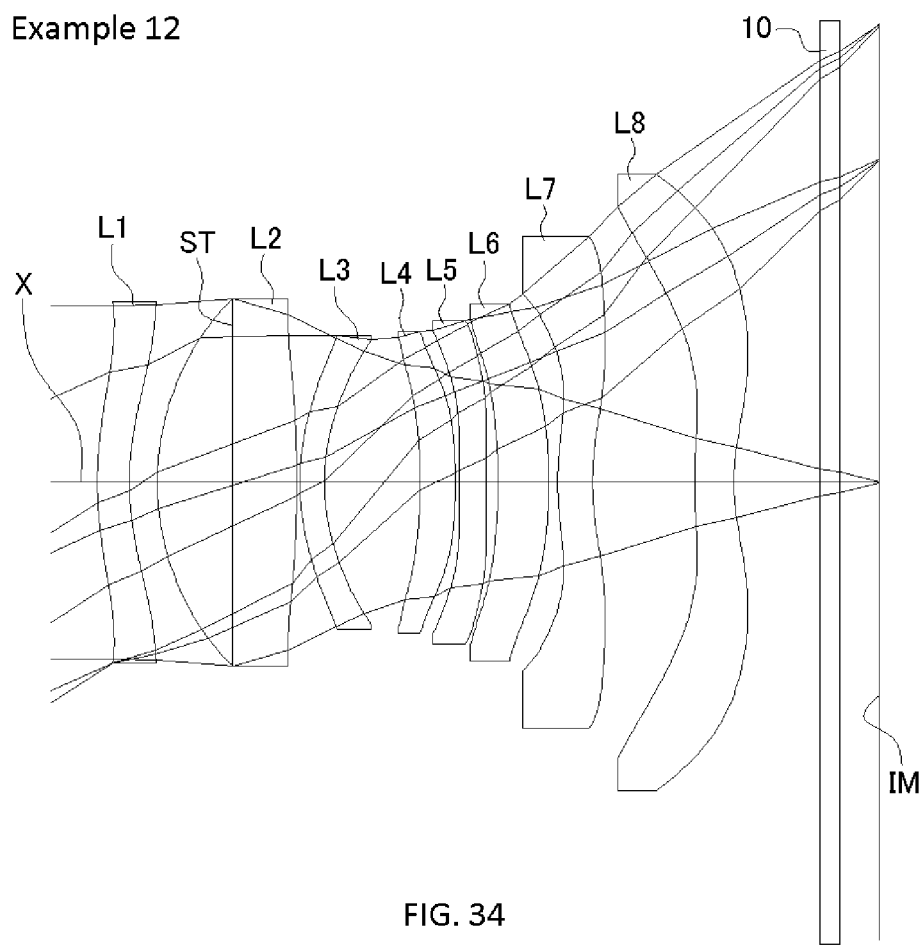
FIG. 34 is a sectional view of a schematic configuration of an imaging lens in Example 12 of the present invention.

FIG. 32 shows spherical aberration (mm), astigmatism (mm), and distortion (%), respectively. FIG. 33 shows a lateral aberration corresponding to the image height ratio H. As shown in FIGS. 32 and 33, according to the imaging lens of the Example 11, aberrations can be properly corrected.

Example 12

The basic lens data is shown below in Table 23.

TABLE 23 f = 7.15 mm Fno = 1.9 ω = 32.7°

| | i | r | d | nd | vd | [mm] |
|---|---|---|---|---|---|---|
| L1 | 1* | 3.708 | 0.327 | 1.6707 | 19.2 | f1 = −29.307 |
| | 2* | 3.009 | 1.051 | | | |
| | 3 (ST) | ∞ | −0.766 | | | |
| L2 | 4* | 2.781 | 1.420 | 1.5348 | 55.7 | f2 = 4.487 |
| | 5* | −14.408 | 0.030 | | | |
| L3 | 6* | 2.357 | 0.250 | 1.6707 | 19.2 | f3 = −44.664 |
| | 7* | 2.092 | 0.976 | | | |
| L4 | 8* | −5.932 | 0.356 | 1.5348 | 55.7 | f4 = −100.841 |
| | 9* | −6.805 | 0.042 | | | |
| L5 | 10* | 113.868 | 0.271 | 1.670 | 19.2 | f5 = 108.223 |
| | 11* | −200.056 | 0.127 | | | |
| L6 | 12* | −4.351 | 0.514 | 1.670 | 19.2 | f6 = −92.259 |
| | 13* | −4.902 | 0.090 | | | |
| L7 | 14* | 3.102 | 0.354 | 1.5445 | 56.4 | f7 = −89.382 |
| | 15* | 2.799 | 1.039 | | | |
| L8 | 16* | 4.278 | 0.399 | 1.5348 | 55.7 | f8 = −8.083 |
| | 17* | 2.080 | 0.870 | | | |
| | 18 | ∞ | 0.210 | 1.5168 | 64.2 | |
| | 19 | ∞ | 0.401 | | | |
| (IM) | | ∞ | | | | | f45=−2109.748 mm
f56=−509.015 mm
R1f=3.708 mm
R1r=3.009 mm
R4f=−5.932 mm
R7r=2.799 mm
R8f=4.278 mm
R8r=2.080 mm
D34=0.976 mm
D78=1.039 mm
T7=0.354 mm
T8=0.399 mm
L47=1.754 mm
TL=7.889 mm
Hmax=4.6 mm
Dep=3.738 mm

TABLE 24

Aspheric Surface Data

| i | k | A4 | A6 | A8 | A10 |
|---|---|---|---|---|---|
| 1 | 0.000E+00 | −1.988E-02 | −1.174E-02 | 6.065E-03 | −1.558E-03 |
| 2 | 0.000E+00 | −1.048E-02 | −2.818E-02 | 1.609E-02 | −5.261E-03 |
| 4 | −1.729E+00 | 2.802E-02 | −1.859E-02 | 1.303E-02 | −7.794E-03 |
| 5 | 0.000E+00 | −9.587E-03 | −2.558E-03 | 1.077E-02 | −8.314E-03 |
| 6 | −1.641E+01 | 1.143E-01 | −1.581E-01 | 1.601E-01 | −1.210E-01 |
| 7 | −6.517E-01 | −2.077E-02 | 1.265E-02 | −3.679E-02 | 5.077E-02 |
| 8 | 1.439E+01 | −1.726E-02 | 3.370E-02 | −4.052E-02 | 1.381E-02 |
| 9 | 0.000E+00 | −5.972E-02 | −3.205E-02 | 7.860E-03 | 3.471E-02 |
| 10 | 0.000E+00 | −7.391E-03 | −1.773E-01 | 1.500E-01 | −2.478E-02 |
| 11 | 0.000E+00 | 6.989E-02 | −2.066E-01 | 1.749E-01 | −8.009E-02 |
| 12 | 0.000E+00 | 9.567E-02 | −1.254E-01 | 7.329E-02 | −2.621E-02 |
| 13 | 0.000E+00 | −3.863E-03 | −1.369E-02 | 6.215E-03 | −3.118E-03 |
| 14 | −2.097E+00 | −1.113E-01 | 8.670E-03 | −1.967E-03 | 3.462E-03 |
| 15 | 0.000E+00 | −8.260E-02 | 2.474E-03 | 7.452E-03 | −2.690E-03 |
| 16 | 4.605E-01 | −1.459E-01 | 5.083E-02 | −1.165E-02 | 1.674E-03 |
| 17 | −8.546E+00 | −7.399E-02 | 2.450E-02 | −5.606E-03 | 8.782E-04 |

| i | A12 | A14 | A16 | A18 | A20 |
|---|---|---|---|---|---|
| 1 | 1.320E-04 | 4.480E-05 | −1.552E-05 | 1.949E-06 | −1.023E-07 |
| 2 | 1.058E-03 | −1.042E-04 | −3.388E-06 | 1.751E-06 | −1.143E-07 |
| 4 | 3.698E-03 | −1.122E-03 | 1.903E-04 | −1.382E-05 | 1.969E-08 |
| 5 | 3.702E-03 | −9.618E-04 | 1.398E-04 | −1.053E-05 | 2.176E-07 |
| 6 | 6.696E-02 | −2.412E-02 | 4.854E-03 | −3.963E-04 | −8.123E-06 |
| 7 | −3.641E-02 | 1.683E-02 | −4.725E-03 | 6.120E-04 | −2.619E-05 |
| 8 | 6.658E-03 | −9.516E-04 | −3.120E-03 | 1.500E-03 | −2.152E-04 |
| 9 | −2.805E-02 | 1.045E-02 | −2.115E-03 | 2.313E-04 | −2.187E-05 |
| 10 | −2.691E-02 | 1.906E-02 | −5.993E-03 | 1.022E-03 | −7.849E-05 |
| 11 | 2.088E-02 | −2.320E-03 | −1.480E-04 | 4.098E-05 | −2.681E-07 |
| 12 | 5.724E-03 | −2.153E-04 | −8.858E-05 | −3.148E-05 | 8.535E-06 |
| 13 | 2.288E-03 | −7.620E-04 | 8.041E-05 | 8.440E-06 | −1.706E-06 |
| 14 | −9.698E-04 | 1.345E-04 | −6.456E-05 | 1.938E-05 | −1.854E-06 |
| 15 | 4.303E-04 | −3.239E-05 | 3.640E-08 | 1.809E-07 | −1.056E-08 |
| 16 | −1.536E-04 | 1.091E-05 | −7.403E-07 | 3.393E-08 | −5.030E-10 |
| 17 | −9.804E-05 | 7.679E-06 | −4.023E-07 | 1.249E-08 | −1.603E-10 |

The values of the respective conditional expressions are as follows:

$R1f/R1r=1.23$ $f1/f2=-6.53$ $f3/f=-6.24$ $f1/f3=0.66$ $R4f/f=-0.83$ $|f51|/f=15.13$ $L47/f=0.25$ $R7r/R8f=0.65$ $T7/T8=0.89$ $D78/D34=1.06$ $f8/f=-1.13$ $R8r/f=0.29$ $TL/f=1.10$ $TL/H\mathrm{max}=1.72$ $f4/f=-14.09$ $f7/f8=11.06$ $f/\mathrm{Dep}=1.91$ Accordingly, the imaging lens according to the Example 12 satisfies the above-described conditional expressions.

Figure 35:
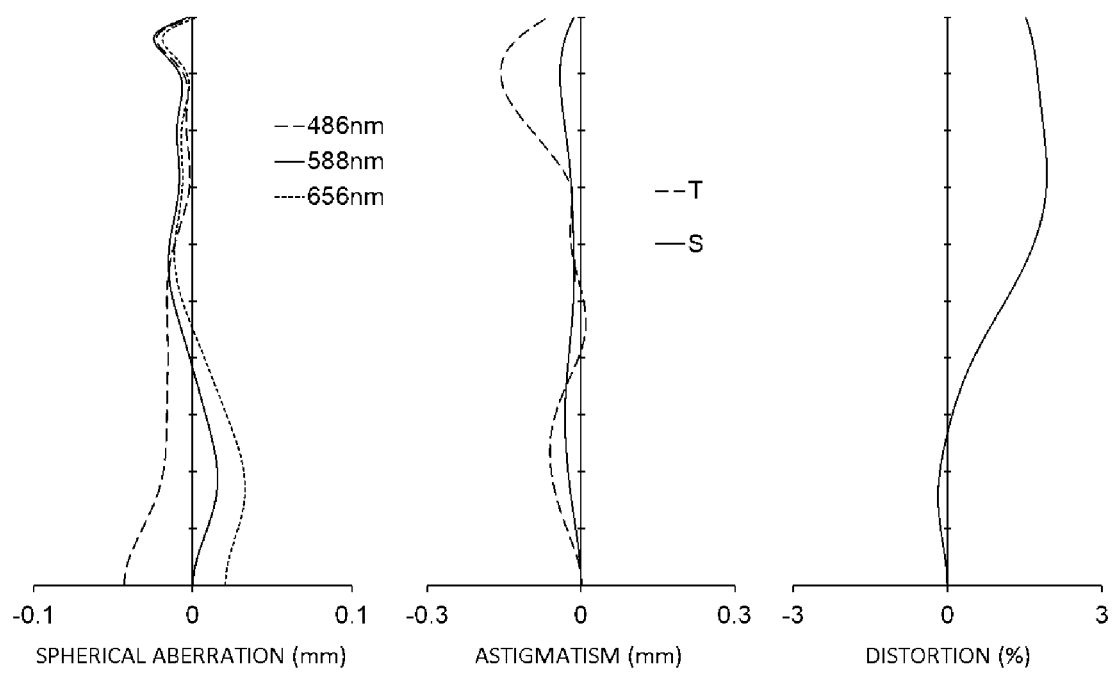
FIG. 35 is an aberration diagram showing spherical aberration, astigmatism, and distortion of the imaging lens of FIG. 34.
Figure 36:
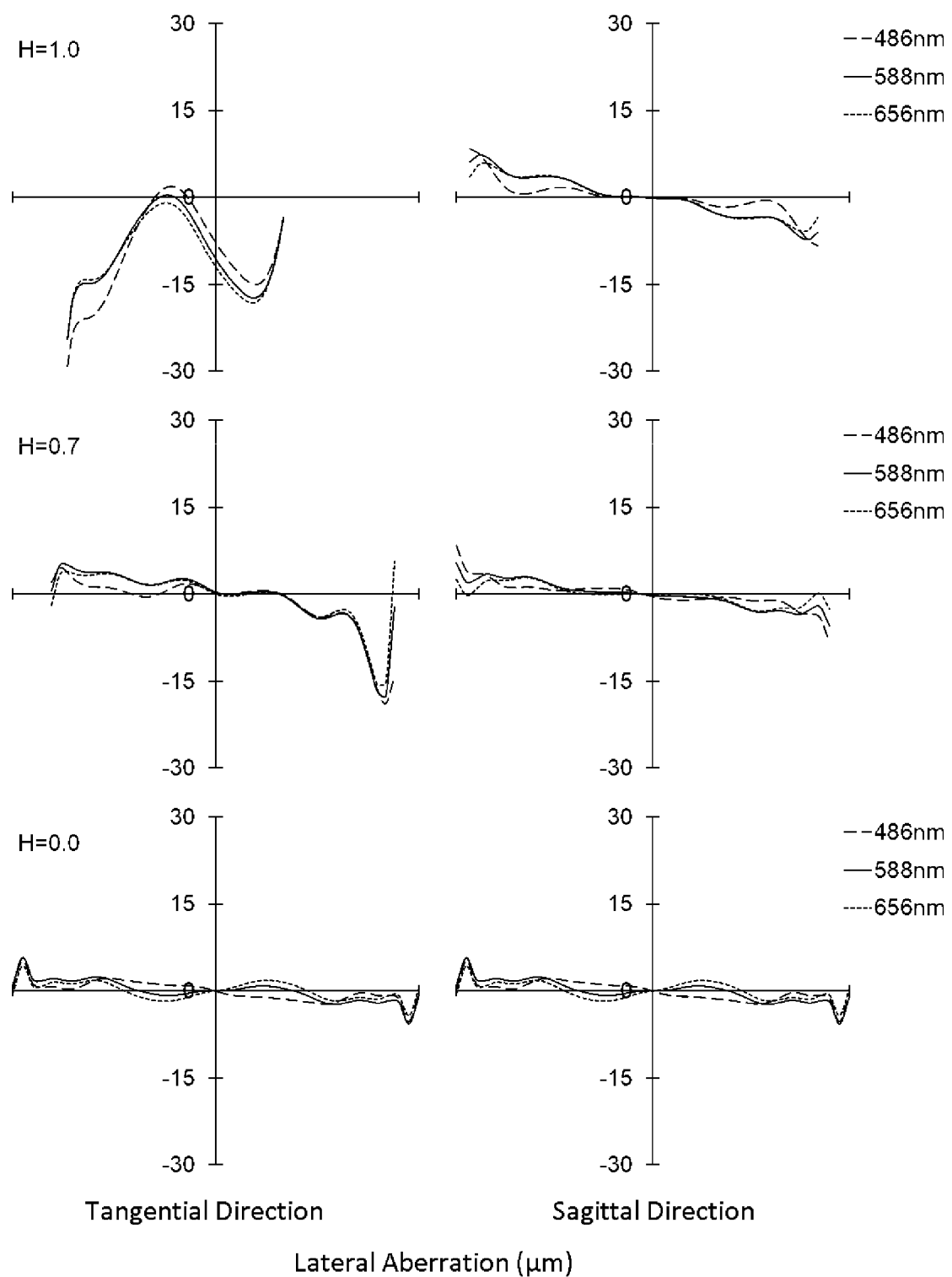
FIG. 36 is an aberration diagram showing a lateral aberration of the imaging lens of FIG. 34.
Figure 37:
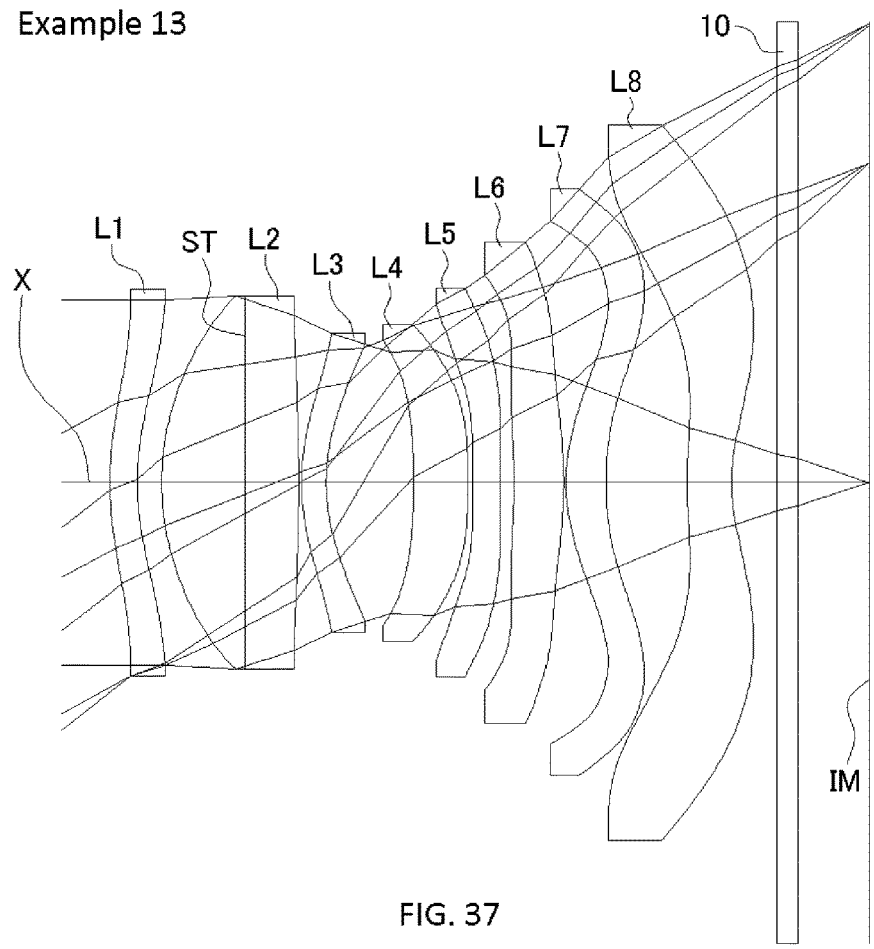
FIG. 37 is a sectional view of a schematic configuration of an imaging lens in Example 13 of the present invention.

FIG. 35 shows spherical aberration (mm), astigmatism (mm), and distortion (%), respectively. FIG. 36 shows a lateral aberration corresponding to the image height ratio H. As shown in FIGS. 35 and 36, according to the imaging lens of the Example 12, aberrations can be properly corrected.

Example 13

The basic lens data is shown below in Table 25.

TABLE 25

$f = 5.86$ mm Fno = 1.5 ω = 38.1°

|  | i | r | d | n d | υ d | [mm] |
|---|---|---|---|---|---|---|
|  |  | ∞ | ∞ |  |  |  |
| L1 | 1* | 3.655 | 0.281 | 1.6707 | 19.2 | f1 = −31.339 |
|  | 2* | 3.018 | 1.103 |  |  |  |
|  | 3 (ST) | ∞ | −0.858 |  |  |  |
| L2 | 4* | 2.829 | 1.396 | 1.5348 | 55.7 | f2 = 4.634 |
|  | 5* | −16.559 | 0.030 |  |  |  |
| L3 | 6* | 2.452 | 0.250 | 1.6707 | 19.2 | f3 = −19.790 |
|  | 7* | 1.985 | 0.894 |  |  |  |
| L4 | 8* | −7.516 | 0.554 | 1.5348 | 55.7 | f4 = −85.640 |
|  | 9* | −9.222 | 0.049 |  |  |  |
| L5 | 10* | 237317.073 | 0.280 | 1.6707 | 19.2 | f5 = −111.684 |
|  | 11* | 74.888 | 0.143 |  |  |  |
| L6 | 12* | −4.907 | 0.500 | 1.6707 | 19.2 | f6 = 93.363 |
|  | 13* | −4.736 | 0.025 |  |  |  |
| L7 | 14* | 2.002 | 0.408 | 1.5445 | 56.4 | f7 = 8.422 |
|  | 15* | 3.298 | 0.831 |  |  |  |
| L8 | 16* | 4.855 | 0.453 | 1.5348 | 55.7 | f8 = −6.334 |
|  | 17* | 1.930 | 0.461 |  |  |  |
|  | 18 | ∞ | 0.210 | 1.5168 | 64.2 |  |
|  | 19 | ∞ | 0.726 |  |  |  |
| (IM) |  | ∞ |  |  |  |  | f45=−47.885 mm
f56=465.095 mm
R1f=3.655 mm
R1r=3.018 mm
R4f=−7.516 mm
R7r=3.298 mm
R8f=4.855 mm
R8r=1.930 mm
D34=0.894 mm
D78=0.831 mm
T7=0.408 mm
T8=0.453 mm
L47=1.959 mm
TL=7.665 mm
Hmax=4.6 mm
Dep=3.793 mm

TABLE 26

Aspheric Surface Data

| i | k | A4 | A6 | A8 | A10 |
|---|---|---|---|---|---|
| 1 | 0.000E+00 | −1.752E−02 | −1.154E−02 | 6.101E−03 | −1.540E−03 |
| 2 | 0.000E+00 | −1.150E−02 | −2.804E−02 | 1.615E−02 | −5.247E−03 |
| 4 | −4.374E+00 | 4.247E−02 | −2.677E−02 | 1.706E−02 | −8.816E−03 |
| 5 | 0.000E+00 | 2.827E−02 | −3.320E−02 | 2.271E−02 | −1.040E−02 |
| 6 | −2.017E+01 | 1.424E−01 | −2.063E−01 | 1.968E−01 | −1.397E−01 |
| 7 | −9.821E−01 | −3.570E−02 | 3.120E−02 | −5.888E−02 | 6.122E−02 |
| 8 | 1.633E+01 | −4.481E−02 | 6.030E−02 | −8.188E−02 | 5.249E−02 |
| 9 | 0.000E+00 | −1.086E−01 | 6.776E−03 | −1.575E−03 | 2.946E−02 |

TABLE 26-continued

Aspheric Surface Data

| 10 | 0.000E+00 | −7.543E−02 | −1.088E−01 | 1.281E−01 | −2.276E−02 |
|---|---|---|---|---|---|
| 11 | 0.000E+00 | 3.872E−02 | −1.755E−01 | 1.662E−01 | −7.902E−02 |
| 12 | 0.000E+00 | 1.508E−01 | −1.280E−01 | 7.316E−02 | −2.626E−02 |
| 13 | 0.000E+00 | 2.826E−02 | −4.793E−04 | 5.647E−03 | −6.506E−03 |
| 14 | −7.663E−01 | −4.647E−02 | 1.931E−02 | −1.765E−02 | 8.474E−03 |
| 15 | 0.000E+00 | 3.631E−02 | −3.561E−02 | 1.102E−02 | −2.295E−03 |

TABLE 26-continued

Aspheric Surface Data

| 16 | 7.027E−01 | −1.121E−01 | 3.509E−02 | −8.325E−03 | 1.395E−03 |
|---|---|---|---|---|---|
| 17 | −5.673E+00 | −6.175E−02 | 2.019E−02 | −5.114E−03 | 8.947E−04 |

| i | A12 | A14 | A16 | A18 | A20 |
|---|---|---|---|---|---|
| 1 | 1.286E−04 | 4.549E−05 | −1.586E−05 | 1.952E−06 | −8.875E−08 |
| 2 | 1.059E−03 | −1.038E−04 | −3.388E−06 | 1.765E−06 | −1.188E−07 |
| 4 | 3.635E−03 | −1.062E−03 | 2.000E−04 | −2.137E−05 | 9.914E−07 |
| 5 | 3.402E−03 | −8.284E−04 | 1.570E−04 | −1.886E−05 | 8.746E−07 |
| 6 | 6.926E−02 | −2.278E−02 | 4.655E−03 | −5.034E−04 | 1.716E−05 |
| 7 | −3.871E−02 | 1.581E−02 | −4.330E−03 | 7.993E−04 | −7.816E−05 |
| 8 | −1.625E−02 | 1.884E−03 | −4.484E−05 | 3.935E−05 | −1.803E−06 |
| 9 | −2.788E−02 | 1.173E−02 | −2.675E−03 | 3.213E−04 | −1.413E−05 |
| 10 | −2.894E−02 | 2.023E−02 | −5.831E−03 | 8.357E−04 | −4.915E−05 |
| 11 | 1.991E−02 | −2.112E−03 | −1.397E−04 | 5.850E−05 | −4.329E−06 |
| 12 | 4.887E−03 | −2.649E−04 | −6.026E−05 | 1.242E−05 | −7.952E−07 |
| 13 | 2.683E−03 | −6.000E−04 | 8.025E−05 | −6.119E−06 | 2.038E−07 |
| 14 | −2.526E−03 | 4.791E−04 | −5.509E−05 | 3.405E−06 | −8.420E−08 |
| 15 | 3.205E−04 | −2.625E−05 | 8.326E−07 | 2.237E−08 | −1.498E−09 |
| 16 | −1.566E−04 | 1.168E−05 | −5.708E−07 | 1.685E−08 | −2.304E−10 |
| 17 | −1.051E−04 | 8.098E−06 | −3.916E−07 | 1.073E−08 | −1.260E−10 |

The values of the respective conditional expressions are as follows:

R1f/R1r=1.21 f1/f2=−6.76 f3/f=−3.38 f1/f3=1.58

R4f/f=−1.28

|f5|/f=19.07

L47/f=0.33

R7r/R8f=0.68

T7/T8=0.90

D78/D34=0.93 f8/f=−1.08

R8r/f=0.33

TL/f=1.31

TL/Hmax=1.67 f4/f=−14.62 f6/f=15.94 f7/f8=−1.33 f/Dep=1.54

Accordingly, the imaging lens according to the Example 13 satisfies the above-described conditional expressions.

Figure 38:
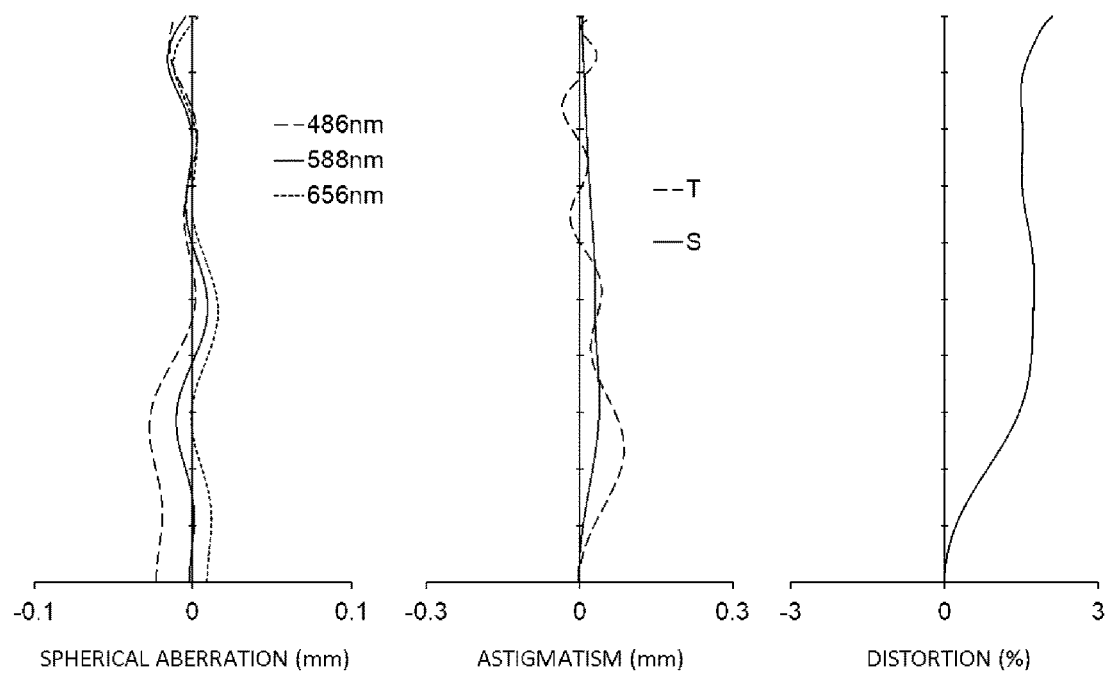
FIG. 38 is an aberration diagram showing spherical aberration, astigmatism, and distortion of the imaging lens of FIG. 37.
Figure 39:
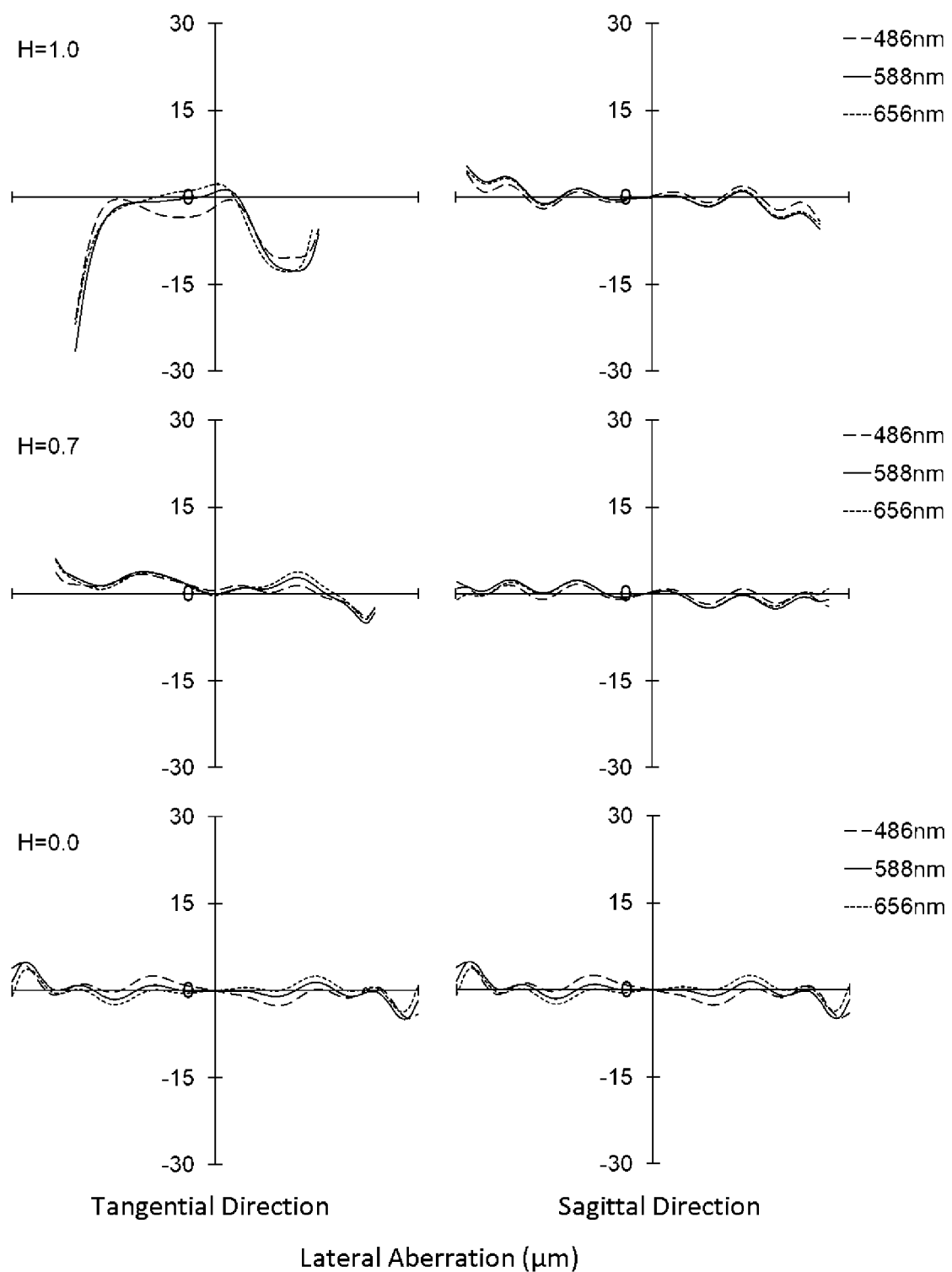
FIG. 39 is an aberration diagram showing a lateral aberration of the imaging lens of FIG. 37.
Figure 40:
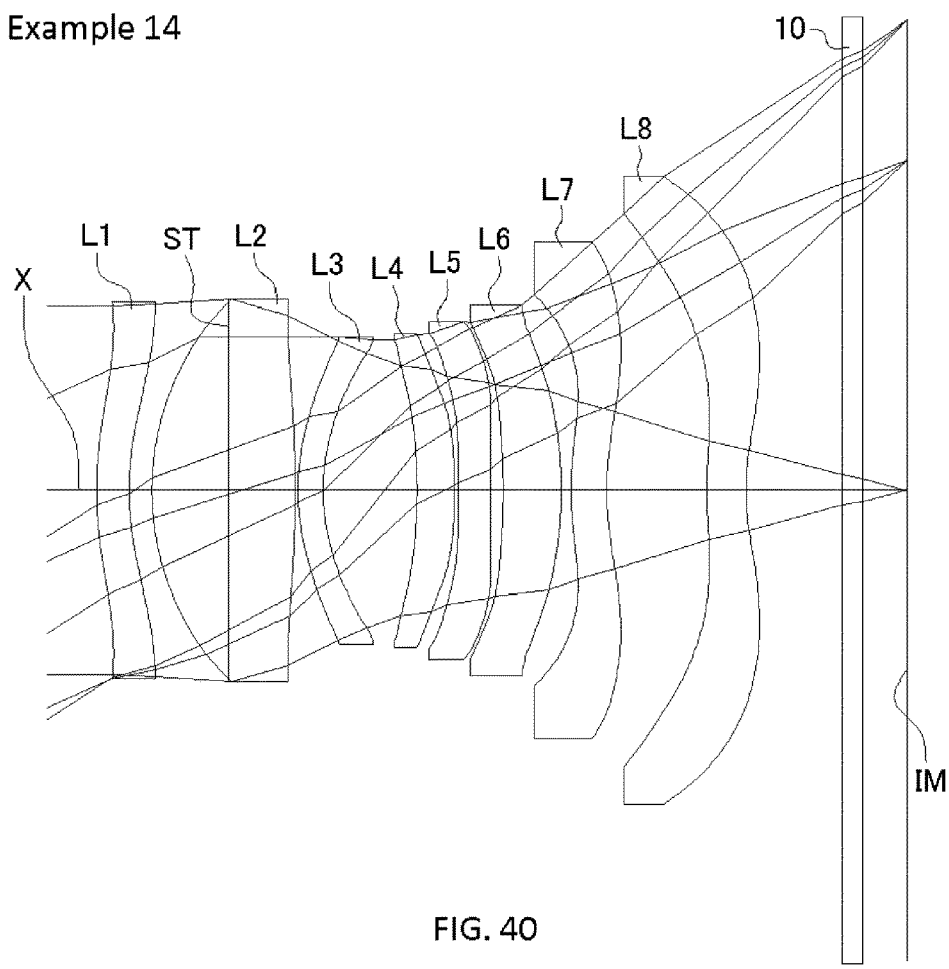
FIG. 40 is a sectional view of a schematic configuration of an imaging lens in Example 14 of the present invention.

FIG. 38 shows spherical aberration (mm), astigmatism (mm), and distortion (%), respectively. FIG. 39 shows a lateral aberration corresponding to the image height ratio H. As shown in FIGS. 38 and 39, according to the imaging lens of the Example 13, aberrations can be properly corrected.

Example 14

The basic lens data is shown below in Table 27.

TABLE 27

| | | | f = 7.17 mm Fno = 1.9 ω = 32.7° | | | |
|---|---|---|---|---|---|---|
| | i | r | d | nd | vd | [mm] |
| | | ∞ | ∞ | | | |
| L1 | 1* | 3.764 | 0.326 | 1.6707 | 19.2 | f1 = −29.180 |
| | 2* | 3.047 | 0.992 | | | |
| | 3 (ST) | ∞ | −0.764 | | | |
| L2 | 4* | 2.815 | 1.417 | 1.5348 | 55.7 | f2 = 4.526 |
| | 5* | −14.238 | 0.030 | | | |
| L3 | 6* | 2.360 | 0.250 | 1.6707 | 19.2 | f3 = −44.059 |
| | 7* | 2.093 | 0.935 | | | |
| L4 | 8* | −5.998 | 0.372 | 1.5348 | 55.7 | f4 = −99.911 |
| | 9* | −6.903 | 0.035 | | | |
| L5 | 10* | −110.466 | 0.318 | 1.6707 | 19.2 | f5 = −94.810 |
| | 11* | 150.047 | 0.133 | | | |
| L6 | 12* | −4.754 | 0.569 | 1.6707 | 19.2 | f6 = 54.131 |
| | 13* | −4.406 | 0.098 | | | |
| L7 | 14* | 3.129 | 0.352 | 1.5445 | 56.4 | f7 = −100.166 |
| | 15* | 2.842 | 0.999 | | | |
| L8 | 16* | 4.750 | 0.390 | 1.5348 | 55.7 | f8 = −8.580 |
| | 17* | 2.267 | 0.948 | | | |
| | 18 | ∞ | 0.210 | 1.5168 | 64.2 | |
| | 19 | ∞ | 0.442 | | | |
| (IM) | | ∞ | | | | | f45=−48.086 mm
f56=117.365 mm
R1f=3.764 mm
R1r=3.047 mm
R4f=−5.998 mm
R7r=2.842 mm
R8f=4.750 mm
R8r=2.267 mm
D34=0.935 mm
D78=0.999 mm
T7=0.352 mm
T8=0.390 mm
L47=1.877 mm
TL=7.979 mm
Hmax=4.6 mm
Dep=3.803 mm

TABLE 28

| Aspheric Surface Data | | | | | |
|---|---|---|---|---|---|
| i | k | A4 | A6 | A8 | A10 |
| 1 | 0.000E+00 | −1.917E−02 | −1.179E−02 | 6.046E−03 | −1.546E−03 |
| 2 | 0.000E+00 | −1.063E−02 | −2.818E−02 | 1.612E−02 | −5.267E−03 |
| 4 | −2.855E+00 | 3.303E−02 | −1.959E−02 | 1.365E−02 | −8.183E−03 |
| 5 | 0.000E+00 | −6.461E−04 | −9.147E−03 | 1.386E−02 | −8.713E−03 |
| 6 | −1.586E+01 | 1.236E−01 | −1.609E−01 | 1.602E−01 | −1.215E−01 |
| 7 | −7.386E−01 | −1.131E−02 | 6.189E−03 | −3.193E−02 | 4.802E−02 |
| 8 | 1.448E+01 | −1.931E−02 | 4.290E−02 | −6.588E−02 | 4.441E−02 |
| 9 | 0.000E+00 | −1.017E−01 | 2.977E−02 | −2.774E−02 | 4.687E−02 |
| 10 | 0.000E+00 | −4.207E−02 | −1.221E−01 | 1.355E−01 | −3.398E−02 |
| 11 | 0.000E+00 | 1.034E−01 | −2.182E−01 | 1.642E−01 | −7.487E−02 |
| 12 | 0.000E+00 | 1.346E−01 | −1.521E−01 | 6.628E−02 | −1.911E−02 |
| 13 | 0.000E+00 | 8.716E−03 | −2.416E−02 | 1.278E−02 | −4.599E−03 |
| 14 | −4.622E+00 | −8.520E−02 | 2.240E−03 | 3.075E−03 | 3.114E−04 |
| 15 | 0.000E+00 | −7.309E−02 | 4.981E−03 | 3.310E−03 | −1.697E−03 |
| 16 | 1.648E+00 | −1.343E−01 | 4.919E−02 | −1.211E−02 | 1.788E−03 |
| 17 | −8.682E+00 | −7.222E−02 | 2.544E−02 | −6.315E−03 | 1.032E−03 |

| i | A12 | A14 | A16 | A18 | A20 |
|---|---|---|---|---|---|
| 1 | 1.317E−04 | 4.485E−05 | −1.570E−05 | 1.960E−06 | −9.654E−08 |
| 2 | 1.061E−03 | −1.053E−04 | −3.258E−06 | 1.779E−06 | −1.192E−07 |
| 4 | 3.863E−03 | −1.141E−03 | 1.773E−04 | −8.853E−06 | −4.906E−07 |
| 5 | 3.412E−03 | −8.798E−04 | 1.651E−04 | −2.368E−05 | 1.685E−06 |
| 6 | 6.752E−02 | −2.428E−02 | 4.722E−03 | −3.059E−04 | −2.337E−05 |
| 7 | −3.555E−02 | 1.670E−02 | −4.910E−03 | 7.600E−04 | −5.512E−05 |
| 8 | −7.448E−03 | −1.629E−03 | −4.167E−04 | 6.540E−04 | −1.279E−04 |
| 9 | −3.019E−02 | 9.984E−03 | −2.119E−03 | 3.695E−04 | −4.523E−05 |
| 10 | −2.272E−02 | 1.957E−03 | −6.403E−03 | 1.030E−03 | −6.815E−05 |
| 11 | 1.995E−02 | −2.081E−03 | −1.136E−04 | −1.508E−05 | 9.678E−06 |
| 12 | 4.763E−03 | −4.052E−04 | −3.272E−05 | −4.762E−05 | 1.186E−05 |
| 13 | 2.122E−03 | −6.629E−04 | 8.529E−05 | 2.242E−06 | −1.013E−06 |
| 14 | −7.166E−04 | 2.766E−04 | −5.730E−05 | 6.542E−06 | −3.553E−07 |
| 15 | 3.878E−04 | −4.295E−05 | 6.797E−07 | 2.937E−07 | −2.065E−08 |
| 16 | −1.630E−04 | 1.096E−05 | −6.458E−07 | 2.308E−08 | −2.960E−10 |
| 17 | −1.126E−04 | 7.966E−06 | −3.416E−07 | 8.051E−09 | −9.747E−11 |

The values of the respective conditional expressions are as follows:

R1f/R1r=1.24 f1/f2=−6.45 f3/f=−6.14 f1/f3=0.66

R4f/f=−0.84

|f5|/f=13.22

L47/f=0.26

R7r/R8f=0.60

T7/T8=0.90

D78/D34=1.07 f8/f=−1.20

R8r/f=0.32

TL/f=1.11

TL/Hmax=1.73 f4/f=−13.93 f6/f=7.55 f7/f8=11.67 f/Dep=1.89

Accordingly, the imaging lens according to the Example 14 satisfies the above-described conditional expressions.

Figure 41:
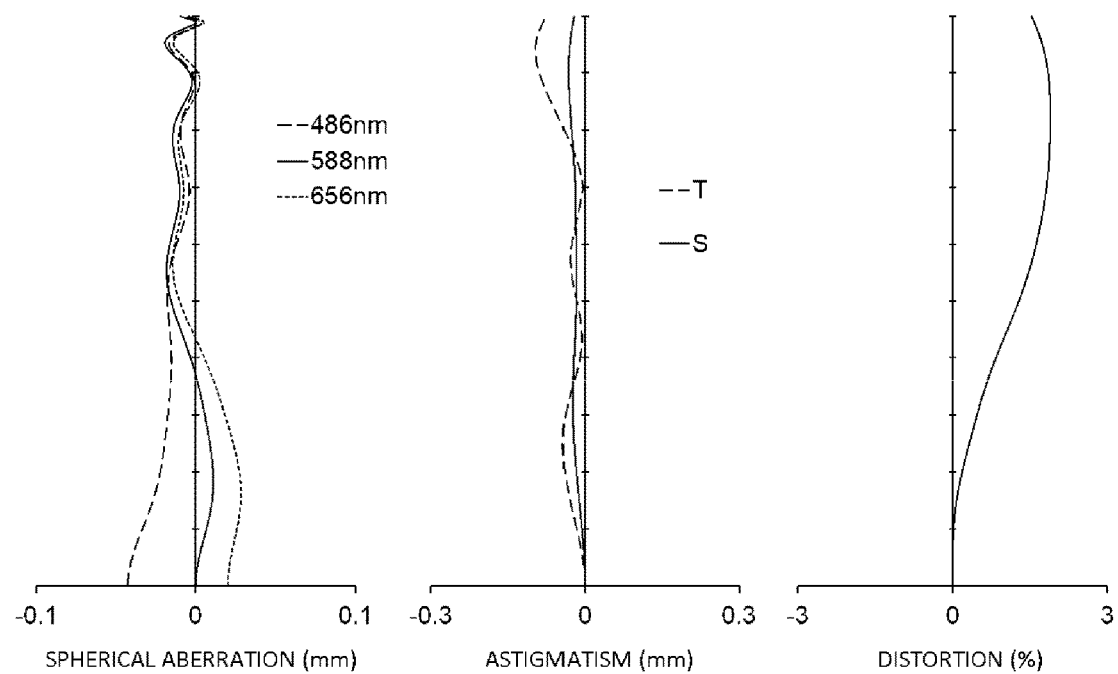
FIG. 41 is an aberration diagram showing spherical aberration, astigmatism, and distortion of the imaging lens of FIG. 40.
Figure 42:
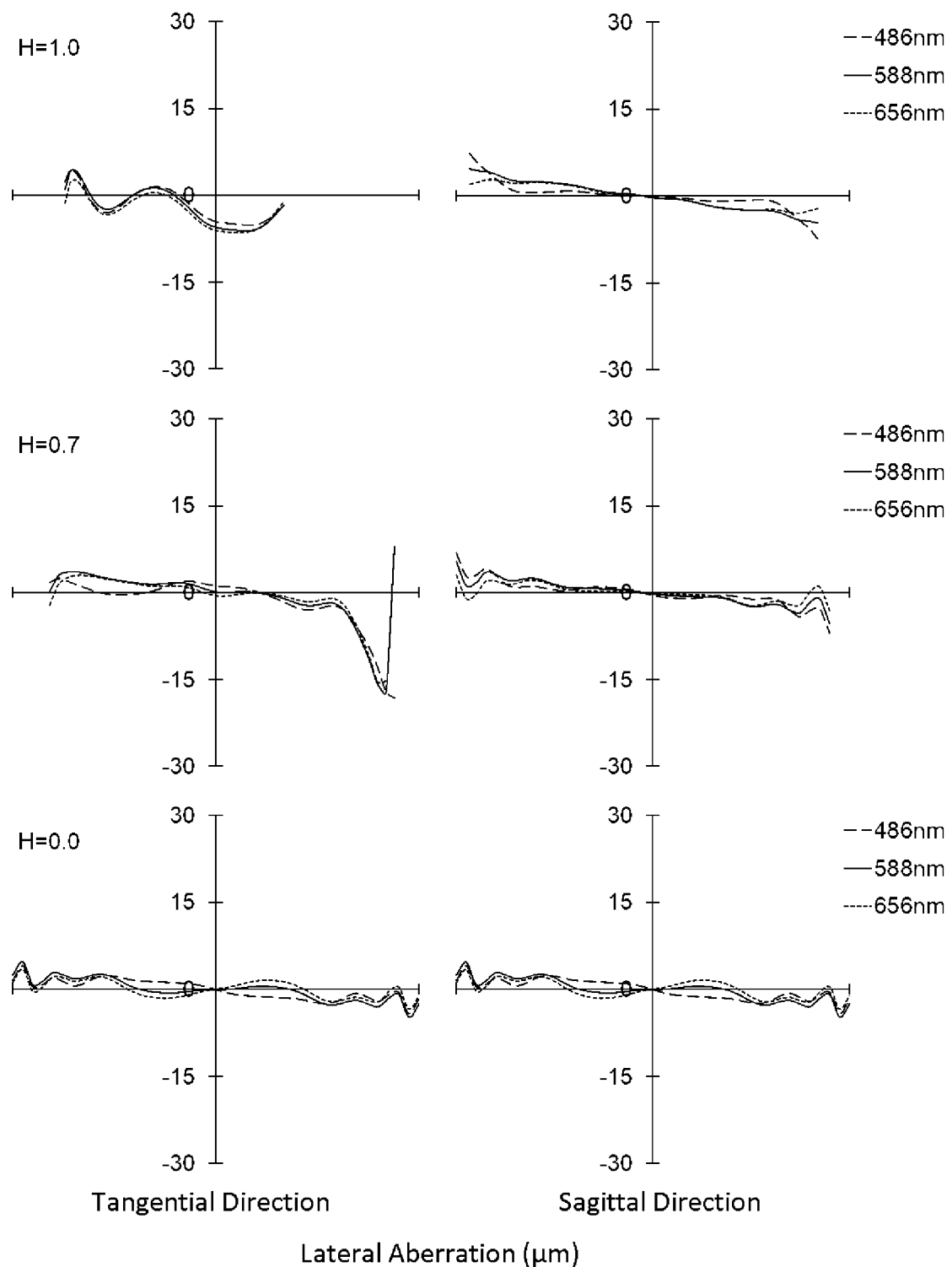
FIG. 42 is an aberration diagram showing a lateral aberration of the imaging lens of FIG. 40.
Figure 43:
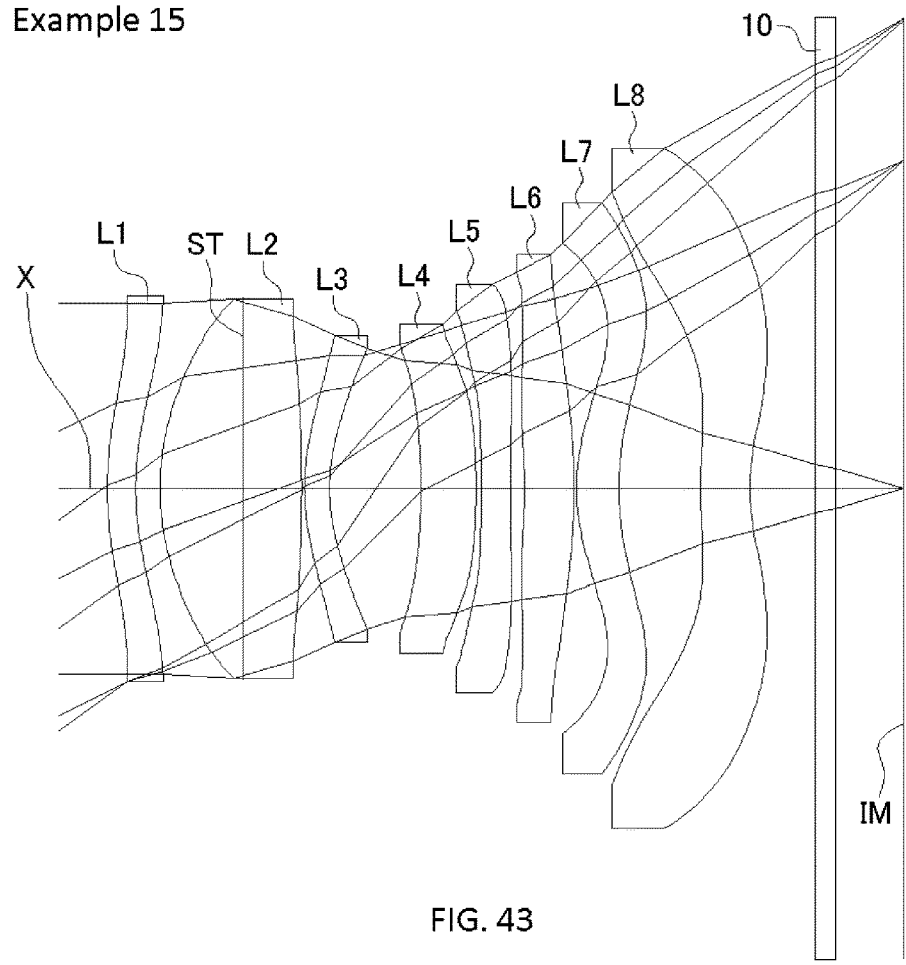
FIG. 43 is a sectional view of a schematic configuration of an imaging lens in Example 15 of the present invention.

FIG. 41 shows spherical aberration (mm), astigmatism (mm), and distortion (%), respectively. FIG. 42 shows a lateral aberration corresponding to the image height ratio H. As shown in FIGS. 41 and 42, according to the imaging lens of the Example 14, aberrations can be properly corrected.

Example 15

The basic lens data is shown below in Table 29.

TABLE 29

| | | f = 6.43 mm Fno = 1.7 ω = 35.6° | | | | |
|---|---|---|---|---|---|---|
| | i | r | d | n d | ν d | [mm] |
| | | ∞ | ∞ | | | |
| L1 | 1* | 3.689 | 0.284 | 1.6707 | 19.2 | f1 = −31.982 |
| | 2* | 3.050 | 1.078 | | | |
| | 3 (ST) | ∞ | −0.832 | | | |
| L2 | 4* | 2.814 | 1.406 | 1.5348 | 55.7 | f2 = 4.621 |
| | 5* | −16.759 | 0.030 | | | |
| L3 | 6* | 2.424 | 0.250 | 1.6707 | 19.2 | f3 = −23.785 |
| | 7* | 2.017 | 0.912 | | | |
| L4 | 8* | −7.575 | 0.552 | 1.5348 | 55.7 | f4 = −100.611 |
| | 9* | −9.039 | 0.049 | | | |
| L5 | 10* | 264.095 | 0.293 | 1.6707 | 19.2 | f5 = −105.124 |
| | 11* | 55.628 | 0.144 | | | |
| L6 | 12* | −4.477 | 0.487 | 1.6707 | 19.2 | f6 = −22.647 |
| | 13* | −6.626 | 0.024 | | | |
| L7 | 14* | 1.979 | 0.425 | 1.5445 | 56.4 | f7 = 8.085 |
| | 15* | 3.324 | 0.815 | | | |
| L8 | 16* | 4.643 | 0.494 | 1.5348 | 55.7 | f8 = −7.214 |
| | 17* | 2.029 | 0.650 | | | |
| | 18 | ∞ | 0.210 | 1.5168 | 64.2 | |
| | 19 | ∞ | 0.671 | | | |
| (IM) | | ∞ | | | | | f45=−50.713 mm
f56=−18.717 mm
R1f=3.689 mm
R1r=3.050 mm
R4f=−7.575 mm
R7r=3.324 mm
R8f=4.643 mm
R8r=2.029 mm
D34=0.912 mm
D78=0.815 mm
T7=0.425 mm
T8=0.494 mm
L47=1.975 mm
TL=7.872 mm
Hmax=4.6 mm
Dep=3.790 mm

TABLE 30

| Aspheric Surface Data | | | | | |
|---|---|---|---|---|---|
| i | k | A4 | A6 | A8 | A10 |
| 1 | 0.000E+00 | −1.777E−02 | −1.158E−02 | 6.099E−03 | −1.534E−03 |
| 2 | 0.000E+00 | −1.181E−02 | −2.790E−02 | 1.616E−02 | −5.249E−03 |
| 4 | −3.033E+00 | 3.362E−02 | −2.405E−02 | 1.629E−02 | −8.729E−03 |
| 5 | 0.000E+00 | 5.791E−03 | −1.610E−02 | 1.495E−02 | −8.823E−03 |
| 6 | −1.946E+01 | 1.238E−01 | −1.985E−01 | 1.962E−01 | −1.399E−01 |
| 7 | −1.167E+00 | −3.018E−02 | 9.488E−03 | −3.682E−02 | 5.330E−02 |
| 8 | 6.403E+00 | −2.088E−02 | 3.367E−02 | −5.755E−02 | 4.370E−02 |
| 9 | 0.000E+00 | −3.487E−02 | −3.394E−02 | 1.102E−02 | 2.819E−02 |
| 10 | 0.000E+00 | 3.106E−04 | −1.515E−01 | 1.363E−01 | −2.528E−02 |
| 11 | 0.000E+00 | 8.815E−02 | −1.857E−01 | 1.599E−01 | −7.530E−02 |
| 12 | 0.000E+00 | 1.627E−01 | −1.282E−01 | 6.990E−02 | −2.515E−02 |
| 13 | 0.000E+00 | 5.394E−03 | −8.505E−04 | 6.931E−03 | −6.267E−03 |
| 14 | −2.252E+00 | −4.381E−02 | 1.898E−02 | −1.723E−02 | 8.384E−03 |
| 15 | 0.000E+00 | 1.885E−02 | −3.369E−02 | 1.142E−02 | −2.407E−03 |
| 16 | −3.253E−01 | −1.305E−01 | 3.932E−02 | −8.653E−03 | 1.404E−03 |
| 17 | −6.508E+00 | −6.934E−02 | 2.177E−02 | −5.226E−03 | 8.962E−04 |

| i | A12 | A14 | A16 | A18 | A20 |
|---|---|---|---|---|---|
| 1 | 1.273E−04 | 4.552E−05 | −1.581E−05 | 1.936E−06 | −8.780E−08 |
| 2 | 1.059E−03 | −1.038E−04 | −3.384E−06 | 1.744E−06 | −1.155E−07 |
| 4 | 3.643E−03 | −1.070E−03 | 2.033E−04 | −2.182E−05 | 9.928E−07 |
| 5 | 3.581E−03 | −9.380E−04 | 1.514E−04 | −1.192E−05 | 9.955E−08 |
| 6 | 6.948E−02 | −2.269E−02 | 4.628E−03 | −5.252E−04 | 2.287E−05 |
| 7 | −3.999E−02 | 1.727E−02 | −4.115E−03 | 5.142E−04 | −3.286E−05 |
| 8 | −1.687E−02 | 2.683E−03 | 1.977E−04 | −4.686E−05 | −1.081E−05 |
| 9 | −2.832E−02 | 1.195E−02 | −2.624E−03 | 3.026E−04 | −1.543E−05 |
| 10 | −2.701E−02 | 1.991E−02 | −5.915E−03 | 8.555E−04 | −4.961E−05 |
| 11 | 1.939E−02 | −2.104E−03 | −1.318E−04 | 5.357E−05 | −3.691E−06 |
| 12 | 5.006E−03 | −2.897E−04 | −6.893E−05 | 1.246E−05 | −5.796E−07 |
| 13 | 2.556E−03 | −5.859E−04 | 8.069E−05 | −6.409E−06 | 2.277E−07 |
| 14 | −2.517E−03 | 4.804E−04 | −5.517E−05 | 3.310E−06 | −7.219E−08 |
| 15 | 3.245E−04 | −2.542E−05 | 8.476E−07 | 1.562E−08 | −1.556E−09 |
| 16 | −1.564E−04 | 1.165E−05 | −5.695E−07 | 1.701E−08 | −2.577E−10 |
| 17 | −1.049E−04 | 8.091E−06 | −3.924E−07 | 1.063E−08 | −1.162E−10 |

The values of the respective conditional expressions are as follows:

R1f/R1r=1.21 f1/f2=−6.92 f3/f=−3.70 f1/f3=1.34

R4f/f=−1.18

|f5|/f=16.36

L47/f=0.31

R7r/R8f=0.72

T7/T8=0.86

D78/D34=0.89 f8/f=−1.12

R8r/f=0.32

TL/f=1.23

TL/Hmax=1.71 f4/f=−15.66 f7/f8=−1.12 f/Dep=1.70

Accordingly, the imaging lens according to the Example 15 satisfies the above-described conditional expressions.

Figure 44:
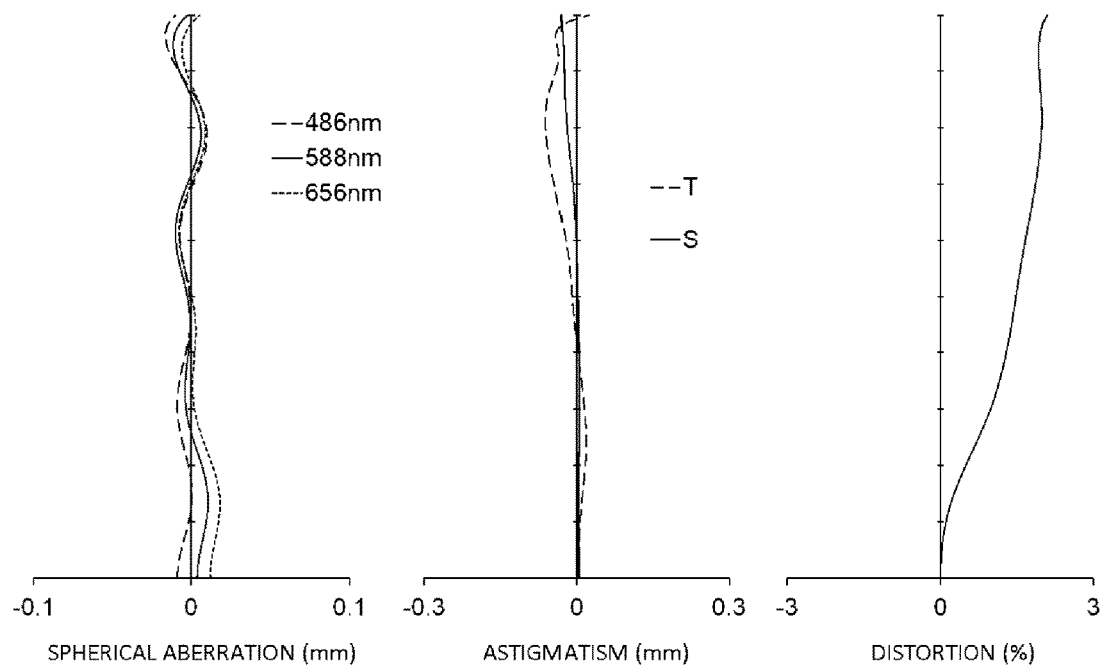
FIG. 44 is an aberration diagram showing spherical aberration, astigmatism, and distortion of the imaging lens of FIG. 43.
Figure 45:
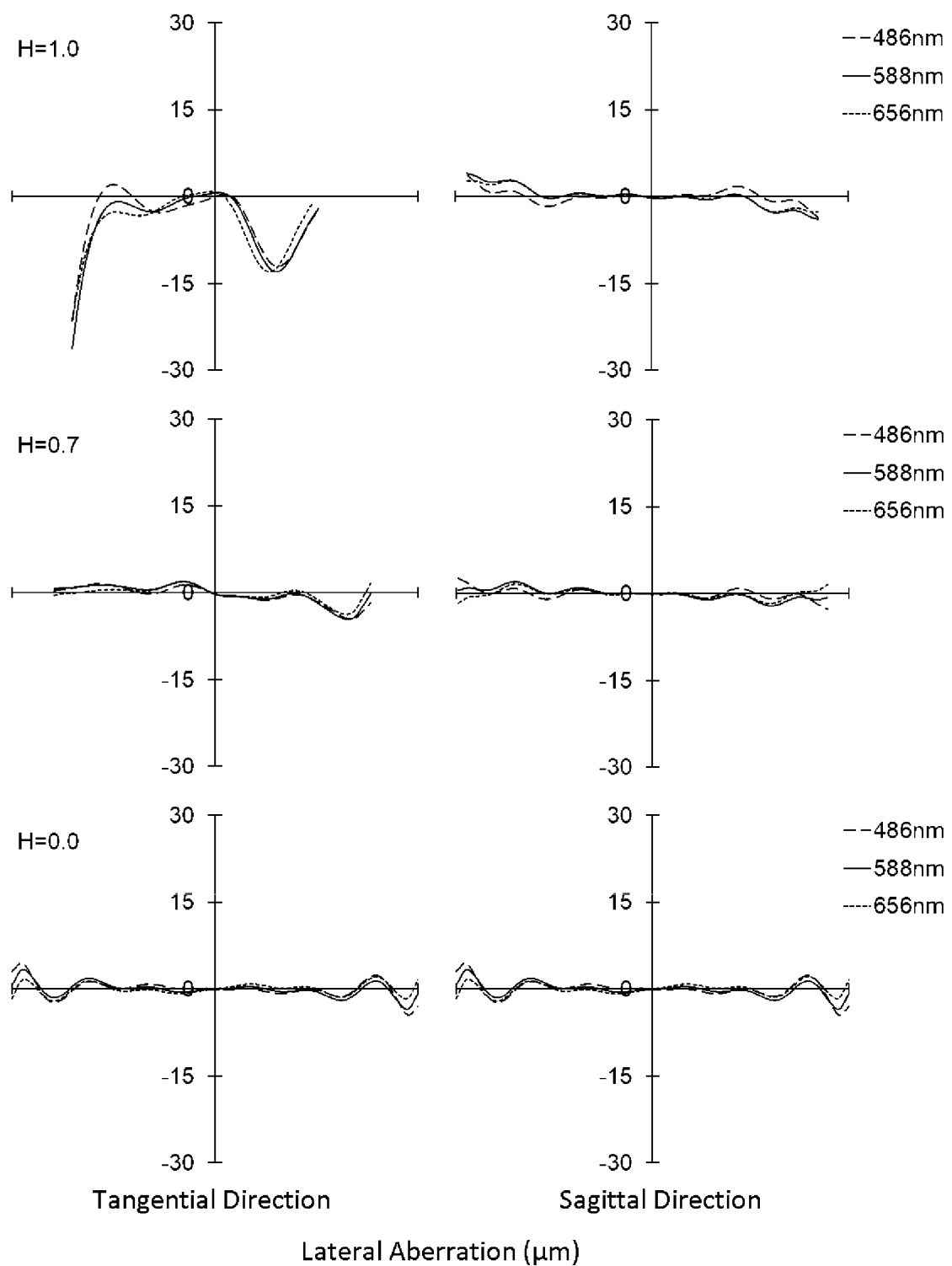
FIG. 45 is an aberration diagram showing a lateral aberration of the imaging lens of FIG. 43.
Figure 46:
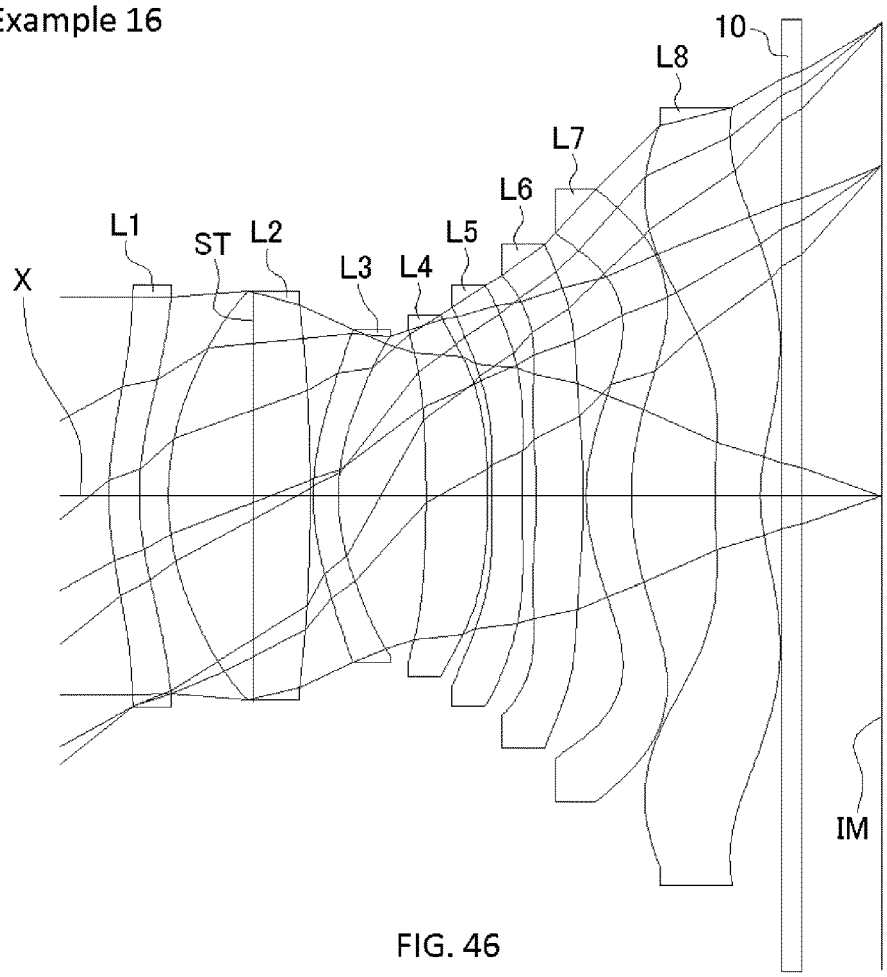
FIG. 46 is a sectional view of a schematic configuration of an imaging lens in Example 16 of the present invention.

FIG. 44 shows spherical aberration (mm), astigmatism (mm), and distortion (%), respectively. FIG. 45 shows a lateral aberration corresponding to the image height ratio H. As shown in FIGS. 44 and 45, according to the imaging lens of the Example 15, aberrations can be properly corrected.

Example 16

The basic lens data is shown below in Table 31.

TABLE 31

| | i | r | d | nd | vd | [mm] |
|---|---|---|---|---|---|---|
| L1 | 1* | 3.579 | 0.298 | 1.6707 | 19.2 | f1 = −31.289 |
| | 2* | 2.955 | 1.127 | | | |
| | 3 (ST) | ∞ | −0.837 | | | |
| L2 | 4* | 2.877 | 1.395 | 1.5348 | 55.7 | f2 = 4.703 |
| | 5* | −16.616 | 0.030 | | | |
| L3 | 6* | 2.420 | 0.250 | 1.6707 | 19.2 | f3 = −24.772 |
| | 7* | 2.025 | 0.867 | | | |
| L4 | 8* | −13.420 | 0.612 | 1.5348 | 55.7 | f4 = 28.080 |
| | 9* | −7.199 | 0.039 | | | |
| L5 | 10* | ∞ | 0.304 | 1.6707 | 19.2 | f5 = ∞ |
| | 11* | ∞ | 0.132 | | | |
| L6 | 12* | −4.096 | 0.463 | 1.6707 | 19.2 | f6 = −16.004 |
| | 13* | −6.924 | 0.029 | | | |
| L7 | 14* | 1.990 | 0.447 | 1.5445 | 56.4 | f7 = 8.264 |
| | 15* | 3.287 | 0.827 | | | |
| L8 | 16* | 5.059 | 0.451 | 1.5348 | 55.7 | f8 = −6.291 |
| | 17* | 1.958 | 0.202 | | | |
| | 18 | ∞ | 0.210 | 1.5168 | 64.2 | |
| | 19 | ∞ | 0.782 | | | |
| (IM) | | ∞ | | | | | f = 5.75 mm Fno = 1.4 ω = 38.7° f45=28.080 mm
f56=−16.004 mm
R1f=3.579 mm
R1r=2.955 mm
R4f=−13.420 mm
R7r=3.287 mm
R8f=5.059 mm
R8r=1.958 mm
D34=0.867 mm
D78=0.827 mm
T7=0.447 mm
T8=0.451 mm
L47=2.027 mm
TL=7.558 mm
Hmax=4.6 mm
Dep=4.030 mm

TABLE 32

Aspheric Surface Data

| i | k | A4 | A6 | A8 | A10 |
|---|---|---|---|---|---|
| 1 | 0.000E+00 | −1.778E−02 | −1.146E−02 | 6.125E−03 | −1.540E−03 |
| 2 | 0.000E+00 | −1.134E−02 | −2.801E−02 | 1.616E−02 | −5.246E−03 |
| 4 | −2.140E+00 | 2.850E−02 | −2.382E−02 | 1.679E−02 | −9.336E−03 |
| 5 | 0.000E+00 | 1.640E−02 | −2.279E−02 | 1.731E−02 | −9.356E−03 |
| 6 | −2.109E+01 | 1.451E−01 | −2.074E−01 | 2.010E−01 | −1.411E−01 |
| 7 | −9.151E−01 | −3.243E−02 | 2.385E−02 | −4.508E−02 | 5.224E−02 |
| 8 | −7.879E+00 | −9.805E−03 | 1.817E−02 | −3.493E−02 | 2.999E−02 |
| 9 | 0.000E+00 | −1.857E−02 | −3.631E−02 | 9.846E−03 | 2.730E−02 |
| 10 | 0.000E+00 | −1.194E−02 | −1.491E−01 | 1.303E−01 | −2.166E−02 |
| 11 | 0.000E+00 | 7.709E−02 | −1.944E−01 | 1.654E−01 | −7.677E−02 |
| 12 | 0.000E+00 | 1.757E−01 | −1.325E−01 | 6.864E−02 | −2.383E−02 |
| 13 | 0.000E+00 | 2.101E−02 | −2.241E−03 | 5.939E−03 | −6.221E−03 |
| 14 | −1.103E+00 | −4.345E−02 | 1.286E−02 | −1.346E−02 | 6.913E−03 |
| 15 | 0.000E+00 | 3.577E−02 | −3.842E−02 | 1.203E−02 | −2.415E−03 |
| 16 | −6.008E−01 | −1.256E−01 | 3.745E−02 | −8.042E−03 | 1.338E−03 |
| 17 | −5.838E+00 | −6.758E−09 | 2.120E−02 | −5.171E−03 | 8.970E−04 |

| i | A12 | A14 | A16 | A18 | A20 |
|---|---|---|---|---|---|
| 1 | 1.285E−04 | 4.560E−05 | −1.586E−05 | 1.950E−06 | −8.864E−08 |
| 2 | 1.060E−03 | −1.038E−04 | −3.378E−06 | 1.764E−06 | −1.186E−07 |
| 4 | 3.872E−03 | −1.089E−03 | 1.931E−04 | −1.931E−05 | 8.215E−07 |
| 5 | 3.565E−03 | −9.063E−04 | 1.469E−04 | −1.392E−05 | 5.877E−07 |
| 6 | 6.913E−02 | −2.250E−02 | 4.611E−03 | −5.375E−04 | 2.704E−05 |
| 7 | −3.686E−02 | 1.664E−02 | −4.629E−03 | 7.194E−04 | −4.769E−05 |
| 8 | −1.452E−02 | 3.627E−03 | −2.415E−04 | −6.922E−05 | 1.126E−05 |
| 9 | −2.799E−02 | 1.206E−02 | −2.665E−03 | 2.879E−04 | −1.107E−05 |
| 10 | −2.792E−02 | 1.991E−02 | −5.844E−03 | 8.403E−04 | −4.866E−05 |
| 11 | 1.950E−02 | −2.092E−03 | −1.311E−04 | 5.379E−05 | −3.771E−06 |
| 12 | 4.492E−03 | −2.561E−04 | −5.020E−05 | 8.985E−06 | −4.244E−07 |
| 13 | 2.564E−03 | −5.850E−04 | 8.078E−05 | −6.407E−06 | 2.240E−07 |
| 14 | −2.207E−03 | 4.554E−04 | −5.843E−05 | 4.169E−06 | −1.239E−07 |
| 15 | 3.186E−04 | −2.540E−05 | 8.718E−07 | 1.734E−08 | −1.611E−09 |
| 16 | −1.559E−04 | 1.193E−05 | −5.675E−07 | 1.525E−08 | −1.768E−10 |
| 17 | −1.049E−04 | 8.086E−06 | −3.918E−07 | 1.077E−08 | −1.276E−10 |

The values of the respective conditional expressions are as follows:

$R1f/R1r=1.21$ $f1/f2=-6.65$ $f3/f=-4.31$ $f1/f3=1.26$ $R4f/f=-2.33$ $|f51|/f=\infty$ $L47/f=0.35$ $R7r/R8f=0.65$ $T7/T8=0.99$ $D78/D34=0.95$ $f8/f=-1.09$ $R8r/f=0.34$ $TL/f=1.31$ $TL/Hmax=1.64$ $f4/f=4.88$ $f45/f=4.88$ $f7/f8=-1.31$ $f/Dep=1.43$ Accordingly, the imaging lens according to the Example 16 satisfies the above-described conditional expressions.

Figure 47:
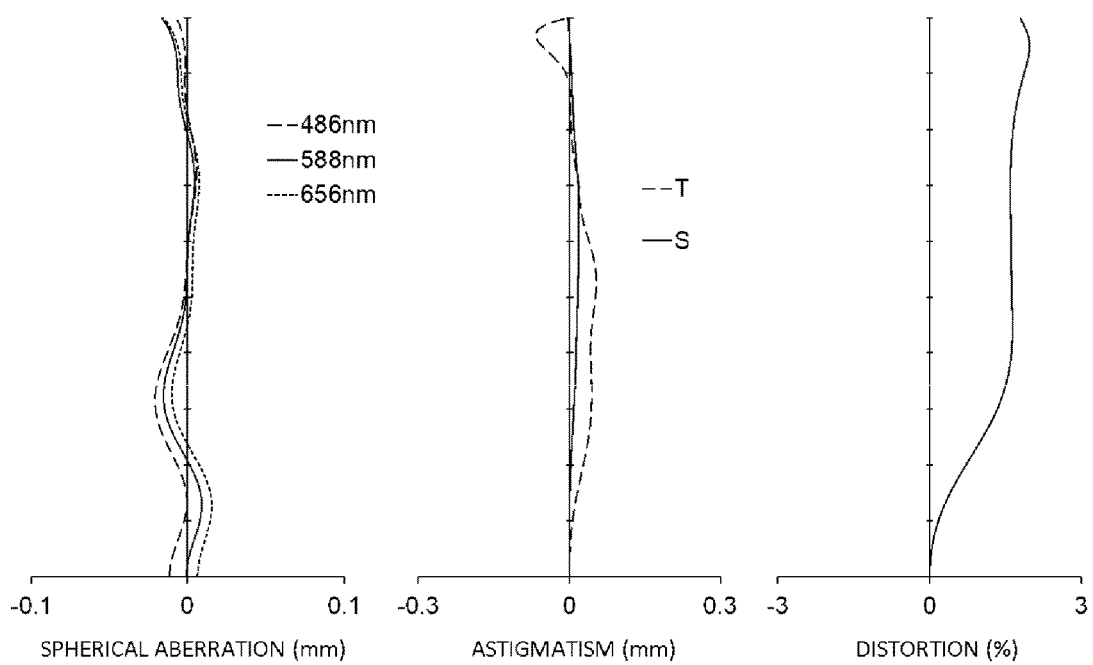
FIG. 47 is an aberration diagram showing spherical aberration, astigmatism, and distortion of the imaging lens of FIG. 46.
Figure 48:
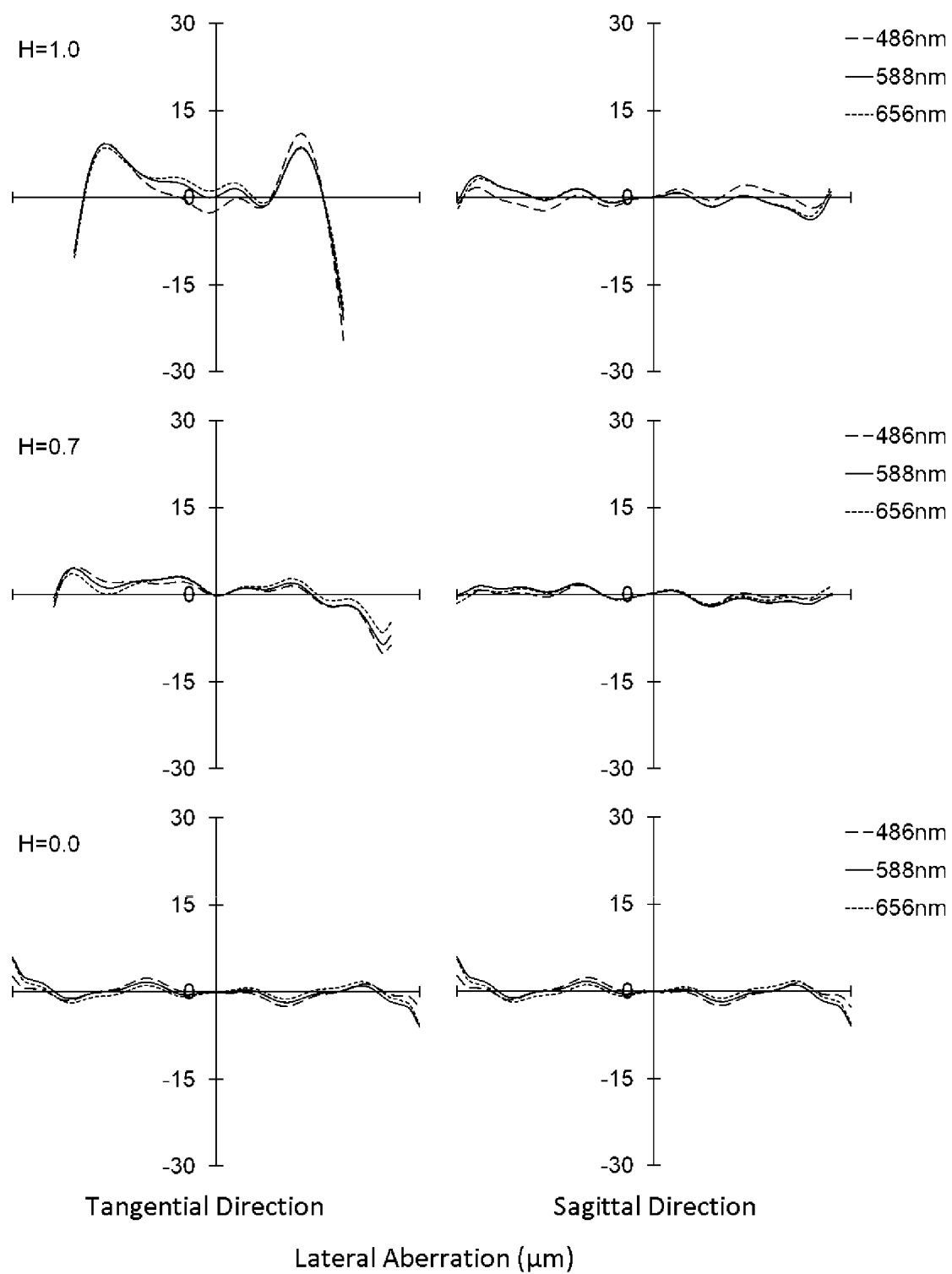
FIG. 48 is an aberration diagram showing a lateral aberration of the imaging lens of FIG. 46.

FIG. 47 shows spherical aberration (mm), astigmatism (mm), and distortion (%), respectively. FIG. 48 shows a lateral aberration corresponding to the image height ratio H. As shown in FIGS. 47 and 48, according to the imaging lens of the Example 16, aberrations can be properly corrected.

As described above, the imaging lens according to the present examples has a very wide field of view (2ω) of 60° or more. More specifically, the imaging lenses of Examples 1 to 16 have fields of view (2ω) of 65.4° to 77.3°. According to the imaging lens of the present embodiments, it is possible to take an image over a wider range than that taken by a conventional imaging lens.

In recent years, with advancement in digital-zoom technology to enlarge any range of an image obtained through an imaging lens by image processing, an image sensor with higher pixel count has been often applied in combination with an imaging lens of higher resolution. In the case of the image sensor with the higher pixel count, a light-receiving area per pixel often decreases, so that an image tends to be dark. The imaging lenses of Examples 1 to 16 have Fnos as small as 1.4 to 1.9. According to the imaging lenses of the present embodiments, it is possible to take a sufficiently bright image responding to the image sensor with the higher pixel count as mentioned above.

Therefore, when the imaging lens of the above-described embodiment is applied in an imaging optical system such as cameras built in mobile devices, namely, smartphones, cellular phones and mobile information terminals, digital still cameras, security cameras, onboard cameras, and network cameras, it is possible to attain both high performance and downsizing of the cameras.

The present invention is applicable in an imaging lens that is mounted in a relatively small-sized camera, such as cameras built in mobile devices, namely smartphones, cellular phones and mobile information terminals, digital still cameras, security cameras, onboard cameras, and network cameras.

DESCRIPTION OF REFERENCE NUMERALS

X: optical axis
ST: aperture stop
L1: first lens
L2: second lens
L3: third lens
L4: fourth lens
L5: fifth lens
L6: sixth lens
L7: seventh lens
L8: eighth lens
10: filter
IM: image plane

What is claimed is:

1. An imaging lens forming an image of an object on an image sensor and comprising, in order from an object side to an image side,
a first lens having negative refractive power,
a second lens having positive refractive power,
a third lens having negative refractive power,
a fourth lens,
a fifth lens,
a sixth lens,
a seventh lens, and
an eighth lens having negative refractive power,
wherein said eighth lens has an aspheric image-side surface having at least one inflection point, and
the following conditional expression is satisfied:

$$-4.0 < R4f/f < -0.4$$

where f: a focal length of the overall optical system of the imaging lens, and
R4f: a curvature radius of an object-side surface of the fourth lens.

2. The imaging lens according to claim 1, wherein the following conditional expression is satisfied:

$$-10.0 < f1/f2 < -2.0$$

where
f1: a focal length of the first lens, and
f2: a focal length of the second lens.

3. The imaging lens according to claim 1, wherein the following conditional expression is satisfied:

$$-10.0 < f3/f < -2.0$$

where
f: a focal length of the overall optical system of the imaging lens, and
f3: a focal length of the third lens.

4. The imaging lens according to claim 1, wherein the following conditional expression is satisfied:

$$12 < |f5|/f$$

where
f: a focal length of the overall optical system of the imaging lens, and
f5: a focal length of the fifth lens.

* * * * *